US009773264B2

United States Patent
Brown et al.

(10) Patent No.: US 9,773,264 B2
(45) Date of Patent: Sep. 26, 2017

(54) METHOD FOR PROVIDING COMPOSITE USER INTERFACE CONTROLS AND AN ONLINE STOREFRONT FOR SAME

(71) Applicant: Research In Motion Limited, Waterloo (CA)

(72) Inventors: Michael Stephen Brown, Kitchener (CA); Terrill Mark Dent, Waterloo (CA); Kalu Onuka Kalu, Ottawa (CA); Ryan Gregory Wood, Richmond (CA); Spencer William Bloom, Toronto (CA); Sandra Marcela Kupfer, Kitchener (CA)

(73) Assignee: BlackBerry Limited, Waterloo (CA)

( * ) Notice: Subject to any disclaimer, the term of this patent is extended or adjusted under 35 U.S.C. 154(b) by 1189 days.

(21) Appl. No.: 13/850,819

(22) Filed: Mar. 26, 2013

(65) Prior Publication Data

US 2014/0297516 A1    Oct. 2, 2014

(51) Int. Cl.
| | | |
|---|---|---|
| G06Q 30/00 | (2012.01) | |
| G06Q 30/06 | (2012.01) | |
| G06F 3/0481 | (2013.01) | |
| G06Q 20/00 | (2012.01) | |
| G06F 9/44 | (2006.01) | |
| G06F 9/455 | (2006.01) | |

(52) U.S. Cl.
CPC ..... *G06Q 30/0601* (2013.01); *G06F 3/04817* (2013.01); *G06F 9/4443* (2013.01); *G06Q 20/00* (2013.01); *G06F 9/45529* (2013.01)

(58) Field of Classification Search
None
See application file for complete search history.

(56) References Cited

U.S. PATENT DOCUMENTS

| | | |
|---|---|---|
| 5,649,200 A | 7/1997 | Leblang et al. |
| 6,173,445 B1 | 1/2001 | Robins et al. |
| 6,615,199 B1 * | 9/2003 | Bowman-Amuah ... G06F 9/443 706/50 |
| 6,698,013 B1 | 2/2004 | Bertero et al. |
| 6,721,696 B1 | 4/2004 | Askins et al. |

(Continued)

FOREIGN PATENT DOCUMENTS

WO    WO2011130286 A1    10/2011

OTHER PUBLICATIONS

Website, "Cloud9 IDE—Online IDE", as accessed on or before Feb. 7, 2013, from <https://c9.io/site/code-smarter-code-together>.
Gerald M. Karam, Visualization using timelines, Proceedings of the 1994 ACM SIGSOFT international symposium on Software testing and analysis, p. 125-137, Aug. 17-19, 1994, Seattle, Washington, USA ("Karam").

(Continued)

*Primary Examiner* — John Hayes
*Assistant Examiner* — John M Winter
(74) *Attorney, Agent, or Firm* — Ridout and Maybee LLP

(57) ABSTRACT

The present disclosure provides a method for providing composite user interface controls and a library or online storefront for same. In one aspect, there is provided a method for a client computer of sharing a custom control, comprising: receiving by a browser an encrypted custom control comprising a number of user interface elements which are positioned in a specified manner with respect to each other, wherein each of the user interface elements has one or more properties; receiving by the browser a decryption key; and decrypting by the browser the encrypted custom control using the decryption key.

12 Claims, 23 Drawing Sheets

(56) References Cited

U.S. PATENT DOCUMENTS

| | | | | |
|---|---|---|---|---|
| 7,493,499 | B1* | 2/2009 | Deaver | G06F 17/30864 |
| | | | | 713/193 |
| 7,620,948 | B1 | 11/2009 | Rowe et al. | |
| 8,584,095 | B2 | 11/2013 | Bhandari et al. | |
| 8,605,034 | B1 | 12/2013 | Roy | |
| 8,677,315 | B1 | 3/2014 | Anderson et al. | |
| 2003/0160779 | A1 | 8/2003 | Rabinovich et al. | |
| 2004/0125130 | A1* | 7/2004 | Flamini | G06F 17/3089 |
| | | | | 715/738 |
| 2004/0189675 | A1 | 9/2004 | Pretlove | |
| 2005/0149922 | A1 | 7/2005 | Vincent | |
| 2006/0282815 | A1 | 12/2006 | Yodaiken et al. | |
| 2007/0025342 | A1 | 2/2007 | Obata | |
| 2007/0271283 | A1 | 11/2007 | Maryka et al. | |
| 2007/0283323 | A1 | 12/2007 | Boden | |
| 2007/0300057 | A1* | 12/2007 | Corcoran | G06F 21/34 |
| | | | | 713/154 |
| 2008/0016176 | A1 | 1/2008 | Leitner | |
| 2008/0250394 | A1 | 10/2008 | Jones et al. | |
| 2009/0144712 | A1 | 6/2009 | Steensgaard et al. | |
| 2009/0150872 | A1 | 6/2009 | Russell | |
| 2009/0245747 | A1 | 10/2009 | Beyabani | |
| 2009/0300578 | A1 | 12/2009 | Neil | |
| 2009/0300580 | A1 | 12/2009 | HeyHoe et al. | |
| 2010/0037209 | A1 | 2/2010 | Sasaki | |
| 2010/0070842 | A1 | 3/2010 | Aymeloglu | |
| 2010/0185954 | A1 | 7/2010 | Simernitski et al. | |
| 2010/0287525 | A1 | 11/2010 | Wagner | |
| 2010/0325601 | A1 | 12/2010 | Turner | |
| 2011/0035740 | A1 | 2/2011 | Powell et al. | |
| 2011/0055209 | A1 | 3/2011 | Novac et al. | |
| 2011/0067004 | A1 | 3/2011 | Birsan et al. | |
| 2011/0113348 | A1 | 5/2011 | Twiss | |
| 2011/0115612 | A1 | 5/2011 | Kulinets et al. | |
| 2011/0141293 | A1 | 6/2011 | Yoneyama et al. | |
| 2011/0154300 | A1 | 6/2011 | Rao et al. | |
| 2011/0161840 | A1* | 6/2011 | Wong | G06F 8/35 |
| | | | | 715/760 |
| 2011/0296179 | A1* | 12/2011 | Templin | H04L 9/0869 |
| | | | | 713/168 |
| 2011/0314343 | A1 | 12/2011 | Hoke et al. | |
| 2012/0047130 | A1 | 2/2012 | Perez et al. | |
| 2012/0265742 | A1 | 10/2012 | Burckhardt et al. | |
| 2012/0272192 | A1 | 10/2012 | Grossman | |
| 2013/0104113 | A1 | 4/2013 | Gupta et al. | |
| 2013/0110978 | A1 | 5/2013 | Gordon et al. | |
| 2013/0212556 | A1 | 8/2013 | HeyHoe et al. | |
| 2013/0212568 | A1 | 8/2013 | Huang | |
| 2014/0047413 | A1 | 2/2014 | Sheive et al. | |
| 2014/0258894 | A1 | 9/2014 | Brown et al. | |
| 2014/0324779 | A1 | 10/2014 | Forbes et al. | |

OTHER PUBLICATIONS

Website, "Overview of Google Slides", as accessed on or before Feb. 7, 2013, from <https://support.google.com/docs/bin/answer.py?hl=en&answer=126127&topic=19431&rd=1>.
Website, "TitanPad", as accessed on or before Feb. 7, 2013, from <http://titanpad.com>.
Website, "Devices Organizer Help: Comparing iOS Screenshots", as accessed on or before Feb. 7, 2013, from <http://developer.apple.com/library/mac/#recipes/xcode_help-devices_organizer/articles/compare_screenshots.html>.
Website, "Gundo—Visualize your Vim Undo Tree", as accessed on or before Feb. 7, 2013, from <http://sjl.bitbucket.org/gundo.vim>.
Website, "Undo Architecture: Undo Manager", as accessed on or before Feb. 7, 2013, from <https://developer.apple.com/library/mac/#documentation/Cocoa/Conceptual/UndoArchitecture/Articles/UndoManager.html>.
D'Ambros et al., "Fractal Figures: Visualizing Development Effort for CVS Entities", as accessed on or before Feb. 7, 2013, from <http://www.inf.usi.ch/faculty/lanza/Downloads/DAmb05b.pdf>.
Website, "EMCO Remote Screenshot 2", as accessed on or before Feb. 7, 2013, from <http://www.kirpisoft.com/products/EMCO-Remote-Screenshot-2.html>.
Website, "How to Take Screenshots of Andriod Device", as accessed on or before Feb. 7, 2013, from <http://www.addictivetips.com/mobile/how-to-take-screenshots-of-android-device>.
Website, "Make a Splash", TheAppBuilder Blog, as accessed on or before Feb. 7, 2013, from <http://theappbuilderblog.wordpress.com/tag/splash-screen>.
Website, "Palm debuts GUI builder for WebOS", Dec. 22, 2009, <http://www.linuxfordevices.com/c/a/News/Palm-Ares-and-2Q-earnings-report/>.
Rex Bryan Kline and Ahmed Seffah, Evaluation of integrated software development environments: Challenges and results from three empirical studies, Int. J. Human-Computer Studies, 2005, vol. 63, p. 607-627.
Website, "Drag and Drop Everything With 30 Handy jQuery Plugins", as accessed on or before Aug. 24, 2012, <http://www.1stwebdesigner.com/freebies/drag-drop-jquery-plugins/>.
Website, "Xcode 4 User Guide", as accessed on or before Aug. 24, 2012, <https://developer.apple.com/technologies/tools/>.
Website, "Xcode 4 User Guide: Edit User Interfaces", as accessed on or before Aug. 24, 2012, <https://developer.apple.com/library/ios/#documentation/ToolsLanguages/Conceptual/Xcode4UserGuide/030-Edit_User_Interfaces/edit_user_interface.html#//apple_ref/doc/uid/TP40010215-CH6-SW41>.
Website, "Build your web presence on Wix.com—Websites are just the beginging—Wix.com", as accessed on or before Aug. 24, 2012,<http://www.wix.com/about/features>.
Website, "Website builder, website development software—Adobe Dreamweaver CS 6—Features", as accessed on or before Aug. 24, 2012, <http://www.adobe.com/ca/products/dreamweaver/features.html>.
Website, "Phonegap—Home", as accessed on or before Aug. 24, 2012, <http://www.phonegap.com/>.
Website, "Remote Application Debug on Android OS", Jun. 13, 2012, <http://software.intel.com/en-us/articles/application-debug-android/>.
Website, "How to debug on a real device (using Eclipse/ADT)", at least as early as Mar. 5, 2013, <http://stackoverflow.com/questions/2714400/how-to-debug-on-a-real-device-using-eclipse-adt>.
Website, "Production Debugging for .NET Framework Applications", Nov. 2012, <http://msdn.microsoft.com/en-us/library/ee817659.aspx>.
Website, "Developing a Composite Control", at least as early as Mar. 5, 2013, <http://msdn.microsoft.com/en-us/library/aa719968(v=vs.71).aspx>.
Website, "Developing a Templated Control", at least as early as Mar. 5, 2013, <http://msdn.microsoft.com/en-us/library/aa719862(v=vs.71).aspx>.
Website, "what is composite control in asp.net?How we create composite control?", at least as early as Mar. 5, 2013, <http://stackoverflow.com/questions/1152032/what-is-composite-control-in-asp-nethow-we-create-composite-control>.
Website, "A Crash Course on asp.net Control Development: Building Composite Controls", Feb. 2006, <http://msdn.microsoft.com/en-us/library/aa479016.aspx>.
Mustafa Zaidi, Najmi Haider Yousuf Hasan, "Smart Phones Application development using HTML5 and related technologies: A tradeoff between cost and quality," International Journal of Computer Science Issues, 2012 ("Hasan").
A Comparative Study and Critical Analysis of Various Integrated Development Environments of C, C++, and Java Languages for Optimum Development, Sampada K Satav et al UNIASCIT, vol. 1 (1) (Mar. 2011) ("Satav").
Final Office Action; U.S. Appl. No. 13/785,309; dated Aug. 12, 2015.
Andrew J. Ko, Brad A. Myers, Designing the whyline: a debugging interface for asking questions about program behavior, Proceedings of the SIGCHI Conference on Human Factors in Computing Systems, p. 151-158, Apr. 24-29, 2004, Vienna, Austria ("Ko").

(56) References Cited

OTHER PUBLICATIONS

Rischpater, Ray, and Daniel Zucker. "Introducing Qt Quick." Beginning Nokia Apps Development. Apress, 2010. 139-158, ("Rischpater").
Kang G. Shin et al.; Fault-Tolerant Clock Synchronization in Distributed Systems; 1990 IEEE; pp. 33-42; <http://ieeexplore.ieee.org/stamp/stamp.jsp?tp=&arnumber=58235>.
P. P Ramanathan et al.; Hardware-Assisted Software Clock Synchronization for Homogeneous Distributed Systems; 1990 IEEE; pp. 514-524; <http://ieeexplore.ieee.org/stamp/stamp.jsp?tp=&amumber=54844>.
Aiying Yang et al.; A Chirp-z-Transform-Based Software Synchronization Method for Optical Performance Monitoring; 2011 IEEE; pp. 1739-1741; <http://ieeexplore.ieee.org/stamp/stamp.jsp?tp=&arnumber=6033052>.
Darryl Veitch et al.; Robust synchronization of software clocks across the internet; 2004 ACM; pp. 219-232; <http://dl.acm.org/citation.cfm?id=1028817>.
Igor Ivicovic et al.; Tracing Evolution Changes of Software Artifacts through Model Synchronization; 2004 IEEE: 10 pages; <http://ieeexplore.ieee.org/stamp/stamp.jsp?tp=&arnumber=1357809>.
Hongliang Duan et al.; A Time Synchronization Mechanism Based on Software Defined Radio of General-Purpose Processor; 2012 ICST; pp. 772-777; <http://ieeexplore.ieee.org/stamp/stamp.jsp?tp=& amumber=6417588>.
Jonathan's Blog, "My Thoughts on QML and the Desktop" [online] May 2012, [retrieved on Oct. 2, 2015], retrieved from Internet <http://jontheechidna.wordpress.com/2012/05/19/my_thoughts_on_qml_and_the_desktp/>.

\* cited by examiner

| Custom controls | | | | | | |
|---|---|---|---|---|---|---|
| 2050 — Search | | | | | | |
| | Name | Description | Category | Date | Author | Price |
| 2010a | Button 1 | - Summary<br>- Documentation<br>- Applications/Uses | Buttons | 3-12-2013 | Vesper | $2.99 |
| 2010b | Label 1 | - Summary<br>- Documentation<br>- Applications/Uses | Labels | 1-12-2011 | Bridget | Free |
| 2010c | Slider 1 | - Summary<br>- Documentation<br>- Applications/Uses | Sliders | 3-08-2013 | Heather | $1.99 |
| 2010d | Slider 2 | - Summary<br>- Documentation<br>- Applications/Uses | Sliders | 3-08-2013 | Vesper | $0.99 |

FIG. 20

METHOD FOR PROVIDING COMPOSITE USER INTERFACE CONTROLS AND AN ONLINE STOREFRONT FOR SAME

RELATED APPLICATION DATA

The present disclosure is related to U.S. patent application Ser. No. 13/785,026, filed Mar. 5, 2013, U.S. patent application Ser. No. 13/785,073, filed Mar. 5, 2013, U.S. patent application Ser. No. 13/785,309, filed Mar. 5, 2013, and U.S. patent application Ser. No. 13/785,093, filed Mar. 5, 2013, U.S. patent application Ser. No. 13/792,873, filed Mar. 11, 2013, the contents of which are incorporated herein by reference.

TECHNICAL FIELD

The present disclosure relates to integrated development environments, and particularly to a Web-based integrated development environment and graphical user interface for real-time collaborative application development, and more particularly to a method for providing composite user interface controls and an online storefront for same.

BACKGROUND

Integrated development environments (IDEs) provide an interface through which developers can author, modify, compile and deploy software. With the growth of application development for mobile devices, there remains a need for improved methods and devices for developing software in an IDE.

BRIEF DESCRIPTION OF THE DRAWINGS

FIG. 20 is a user interface screen of a custom control storefront in accordance with an example embodiment of the present disclosure.

DETAILED DESCRIPTION

Figure 1:
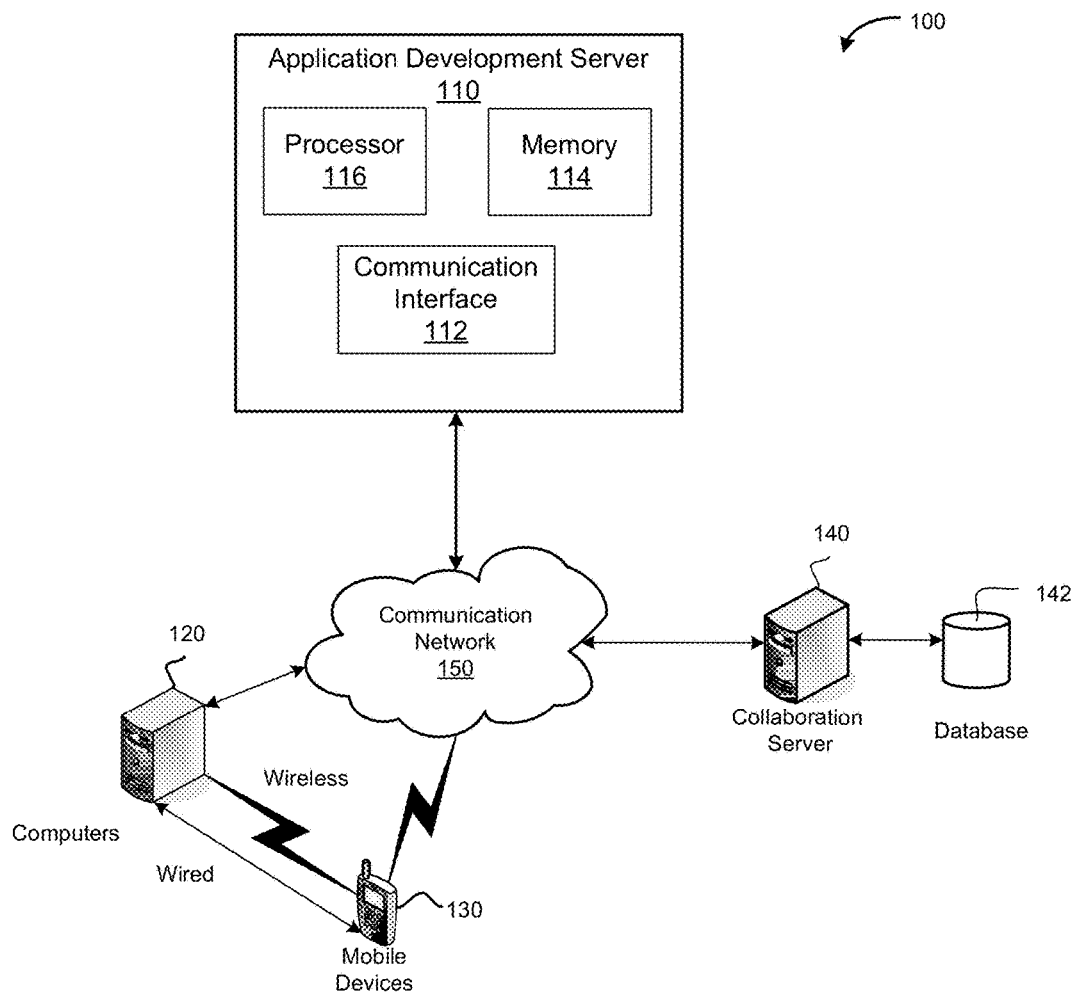
FIG. 1 is a block diagram illustrating a network environment including a computer and a mobile communication device for interacting in accordance with example embodiments of the present disclosure.

Reference will now be made to the accompanying drawings which show example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practised without some of these details. In other instances, well-known methods, procedures, and components have not been described in detail to avoid obscuring the example embodiments described. The description is not to be considered as limited to the scope of the example embodiments described herein.

Any reference to direction or orientation stated herein is for convenience and is not intended to be limiting unless explicitly stated herein. Any directional references in relation to the graphical user interface (GUI) are relative to the screen orientation of the GUI rather than a fixed point or reference on the host electronic device. The term "user interface" is sometimes used herein to refer to the GUI for convenience. For the purpose of the present disclosure, the terms device orientation and device position are treated equivalently. The term "collaborating devices" means client devices, such as computers or mobile devices, which are currently connected to a server and accessing the same application under development unless otherwise indicated either explicitly or implicitly. The terms "client device" and "client" are used interchangeable within the present disclosure.

The present disclosure provides methods and devices for real-time collaboration on an application under development among two or more collaborating devices, which may be at the same or different locations. A server stores the application code for the application. Changes to the application, which may be additions, deletions or modifications, made by the collaborating devices are sent to the server. The server then distributes the changes to other collaborating devices in real-time or near real-time, which update the current state of the application to reflect the changes.

The present disclosure provides a web-based integrated development environment (IDE) tool which may allow multiple users to collaborate on a coding project, such as the development of an application for a mobile device. Typically, collaborative application development involves multiple users making independent changes in a separate copy of the application, and later merging the changes together in some manner. This can be a cumbersome task and some external co-ordination of tasks may be required since the tasks need to be carried out independently before the tasks CaO be combined. This can be especially problematic if two users want to collaborate on aspects of a user interface which are highly "visual". Code changes made by one user may have a direct and notable effect on another user. For example, if a designer wishes to change the visual assets of an application, a developer may also have to change the positioning or behaviour of certain user interface elements to reflect the changes, but it may not be apparent that such changes are required until the changes of the developer are combined with the changes of the designer.

The web-based IDE tool of the present disclosure allows real-time collaborative application development and optionally "always-save" functionality. An application may be shared between two or more users using the web-based tool. Each user runs the tool in a Web browser on a computer with a persistent connection (e.g., HTTP connection, HTTPS connection, etc.) to a central server. If any user makes a change to the application, the change is sent to the devices of other users in the group which are online and the displayed application is automatically updated to reflect the change. As a result, all of the collaborating users have the current state of the application at all times and there is no need to perform manual synchronization to bring individual changes by the users together. Rather than working independently, the users work truly collaboratively.

The types of changes may include: (1) object creation (i.e., a new user interface control may be dropped onto a page)—this change includes information about the active page, the parent object that received the new object, the index/position within the parent where the new object was placed, etc.; (2) object deletion (i.e., an existing user interface control is dragged from a page)—this change includes information about the active page, and the object that was removed from the page; and (3) object change (i.e., some property of an existing user interface control is modified)—this change includes information about the active page, the object that was modified, the specific property that was modified, and the new property value. Other changes CaO include, for example, page creation and page deletion, etc.

For every change, enough information is provided to apply the change, and optionally enough information to reverse (i.e., rewind/undo) the change. This information may be used in conjunction with a visual timeline to move back and forth through a series of changes to the application.

Each collaborating device which is connected to the server may receive changes to the application state stored from the server which stores the application code at various states and incremental changes between such states. When the application state is updated in response to a change made by a collaborating device, the server may notify all of the other collaborating devices with the details of the change so that the other collaborating devices can all apply the change in real-time or near real-time. As a result, the displayed application on each collaborating device may be updated to reflect the current state of the application in real-time or near real-time. Thus, for example, if a first user is viewing a page that a second user is editing, the first user can see any changes to that made to the page by the second user in real-time or near real-time, regardless of whether the first user is working on the page being viewed. The first user and second user could even be manipulating different properties of the same user interface element. It is contemplated that the first user and second user could possibly even be manipulating the same properties of the same user interface element. While this could cause conflicts in some instances, one or more conflict resolution techniques could be used to resolve such conflicts. For example, a last change wins rules could be implemented which means whichever change was made last will be implemented. Other approaches could be used.

In one embodiment, the server also saves the entire list of incremental changes so that the application can be rebuilt from any previous save point by starting at the save point and then applying all of the subsequent incremental changes. This results in an effect similar to "autosave", thereby providing "always-save" functionality. If a user forgets to save the changes to the application before exiting the Web browser, or if the Web browser terminates unexpectedly, the state of the application CaO be restored using the list of incremental changes.

In some embodiments, the user never has to explicitly save the application. Rather, the server saves all incremental changes, and the server or one or more of the clients may periodically and automatically select points at which to create a save point without the user being aware that it has happened. For example, after changes that are particularly computationally expensive to apply, the server may automatically save the application so that the expensive change does not have to be applied the next time the application is opened.

Similarly, a visual timeline or "undo history" for the application can actually extend back in time to the beginning of the application even if there have been save points in between. This may allow a user to reverse (i.e., rewind/undo changes) the application to the very beginning, regardless of whether or when the application was last explicitly saved.

The web-based tool of the present disclosure may also facilitate working with image assets by providing automatic propagation of updated images, in an attempt to obviate at least some of the shortcomings conventionally experienced during collaborative application development. When working in code, image assets can be difficult to visualize. In particular, if a user makes a change to an image asset, viewing the updated asset in context in the editor may require a "refresh" of the editor user interface screen. Viewing the image asset in context on a test device may require a compilation and deployment step. This can introduce considerable waiting time each time an image is updated, and if several iterations are required, then this can be a time-consuming process. If multiple users are collaborating on the same application, one user such as a designer may be updating image assets while another user such as a developer may be updating other aspects of the application. In such cases, it is important for the developer to have up to date visual assets in order to work effectively. Avoiding a manual "refresh" is advantageous since it is time consuming and requires the developer to remember to periodically perform the refresh.

The web-based tool of the present disclosure allows image objects in an editor user interface screen to maintain a dynamic link to the image that the image objects. If a user adds replaces an existing image, for example by dragging a new image into the editor user interface screen, all instances of the existing image are automatically and instantly replaced with the new image without requiring a manual refresh. If a test device is connected for live publishing, then the updated image is automatically pushed to the test device as well. The images may be updated immediately without the need to restart the running application on the connected test device, and without a manual refresh or compilation. If multiple users are collaborating on the same application and one user updates an image asset, the client collaborating devices of the other users may be notified that the image has changed and the client collaborating devices all pick up the new image asset automatically. The client collaborating devices may then automatically update all instances of the existing image without a manual refresh or compilation. As a result, the images are kept "in synch" between all live instances of the application, in the local editor, in remote editors, and on any connected test devices.

It will be appreciated that there may be multiple instances of a single image (e.g., multiple controls that share the same background image) and that all instances are updated immediately as soon as the new image asset changes. The web-based tool also cooperates with a "connected device" that is actually executing the code from the editor in real-time. It is also contemplated that the automatic propagation of the web-based tool could be applied to other types of assets such as XML, text, etc.

The web-based tool of the present disclosure may also allow multiple users, such as a community of developers and designers, to collaborate on a number of projects, such as applications for mobile devices. Users can see the active applications and the changes in those applications.

In one embodiment, one or more pages from one or more applications which a user has access to are presented. The pages may show a number of applications at one time, show the changes being made as the changes happen in the same fashion as changes to a particular application the user is working on is shown, and may also show who is working on which applications in real-time or near real-time. A user has access to applications created by the user, applications explicitly shared with the user, and public applications that all users can access.

For each of the applications that a user has access to, the collaborating device may request the current state and render the current state of the application. All or a subset of the pages of the application can be rendered. The rendered applications can be sorted according to most recently created, or most recently edited, or other criteria. When a persistent connection to the server is established, each collaborating device receives changes to the each application a respective user has access to. When a change is made to one of the applications, the server will return the details for the change and it can be applied to the corresponding page of the corresponding application. Optionally, the page of the application may move or "bubble" of the top of the displayed pages of the applications to bring the application in view if it was below the page scroll, or otherwise bring the changed application to the attention of the user. A description or note describing who is working in the application may be displayed in association with the page. Because the server knows the last incremental change for each user, and how long ago the change happened, the collaborating device can accurately place user avatars in association with the applications which users are working on.

Referring first to FIG. 1, a communication system 100 in accordance with example embodiments of the present disclosure is shown. The architecture includes an application development server (ADS) 110, one or more general purpose computers 120 (only one of which is shown in FIG. 1), one or more mobile communication devices 130 (only one of which is shown in FIG. 1) optionally connected to a computer 120 via a wired link (e.g., Universal Serial Bus (USB)) and/or wireless link (e.g., Wi-Fi or possibly Bluetooth™), and one or more collaboration servers 140 (only one of which is shown in FIG. 1) each having an application database 142, each of the devices having access to a communication network 150, e.g., the Internet. The mobile communication devices 130 may also directly connect to the ADS 110 over a wireless network via wireless link.

The communication network 150 may include a number of wired and/or wireless networks. The communication network 150 may include public and/or private networks, for example, the communication network 150 may comprise a private local area network (LAN), metropolitan area network (MAN), wide area network (WAN), the public Internet or combinations thereof and may include virtual networks constructed using any of these, alone, or in combination. Computers 120 may be connected to the communication network 150 directly or indirectly via an intermediate communication network such as the Internet. A VPN or other mechanism for securely connecting to the communication network 150 may be required when computers 120 connect to the communication network 150 indirectly, e.g. via the Internet.

The wireless networks may comprise one or more of a Wireless Wide Area Network (WWAN) and a Wireless Local Area Network (WLAN) or other suitable network arrangements. The computers 120 and mobile communication devices 130 may be configured to communicate over both the WWAN and WLAN, and to roam between these networks. The wireless network may comprise multiple WWANs and WLANs.

The mobile communication devices 130 may interface with a computer 120 connected to the communication network 150 via one or both of a physical interface and short-range wireless communication interface to provide a direct connection. The physical interface may comprise one or combinations of an Ethernet connection, USB connection, Firewire™ (also known as an IEEE 1394 interface) connection, or other serial or parallel data connection, via respective ports or interfaces of the connecting devices. The short-range wireless communication interface may be a personal area network (PAN) interface. A personal area network is a wireless point-to-point connection meaning no physical cables are required to connect the two end points.

Alternatively, in embodiments, in which the ADS 110 is able to contact the mobile communication device 130 directly, then the direct connection between the computer 120 and the mobile communication device 130 may be omitted.

In the shown example, the communication system 100 includes one or more separate collaboration servers 140 each having an application database 142. The collaboration servers 140 may be located at the same or different locations. The collaboration servers 140 may each be restricted to a set of users/devices, such as those of a particular enterprise (e.g., business or organization), or may be open to all users/devices connected to the ADS 110. The databases 142 are used to store applications and applications under development including application source code, application machine code/compiled source code, application data, user information, change logs, images, libraries, and other application data. A collaboration server 140 could be hosted on a computer 120 in some embodiments. In other embodiments, the functions of the collaboration servers 140 may be performed by the ADS 110 rather than having separate collaboration servers 140, and the contents of the application database 142 may be stored in local or remote storage of the ADS 110.

It will be appreciated that the above-described communication system is provided for the purpose of illustration only, and that the above-described communication system comprises one possible communication network configuration of a multitude of possible configurations. Suitable variations of the communication system will be understood to a person of skill in the art and are intended to fall within the scope of the present disclosure.

Each of the computers 120 has client software which allows the computers to connect to server software on the ADS 110 for operating the IDE application development tool. In the described embodiment, the computers 120 include an Internet browser and connect to a Web server provided by the ADS 110. The majority of the logical of the ADS 110 is located on the ADS 110. The ADS 110 is a Web server and can be any one or more general purpose computing systems providing sufficient processing resources and interfaces to interact with an anticipated number of devices. The application development tool will be described in more detail below.

Figure 2:
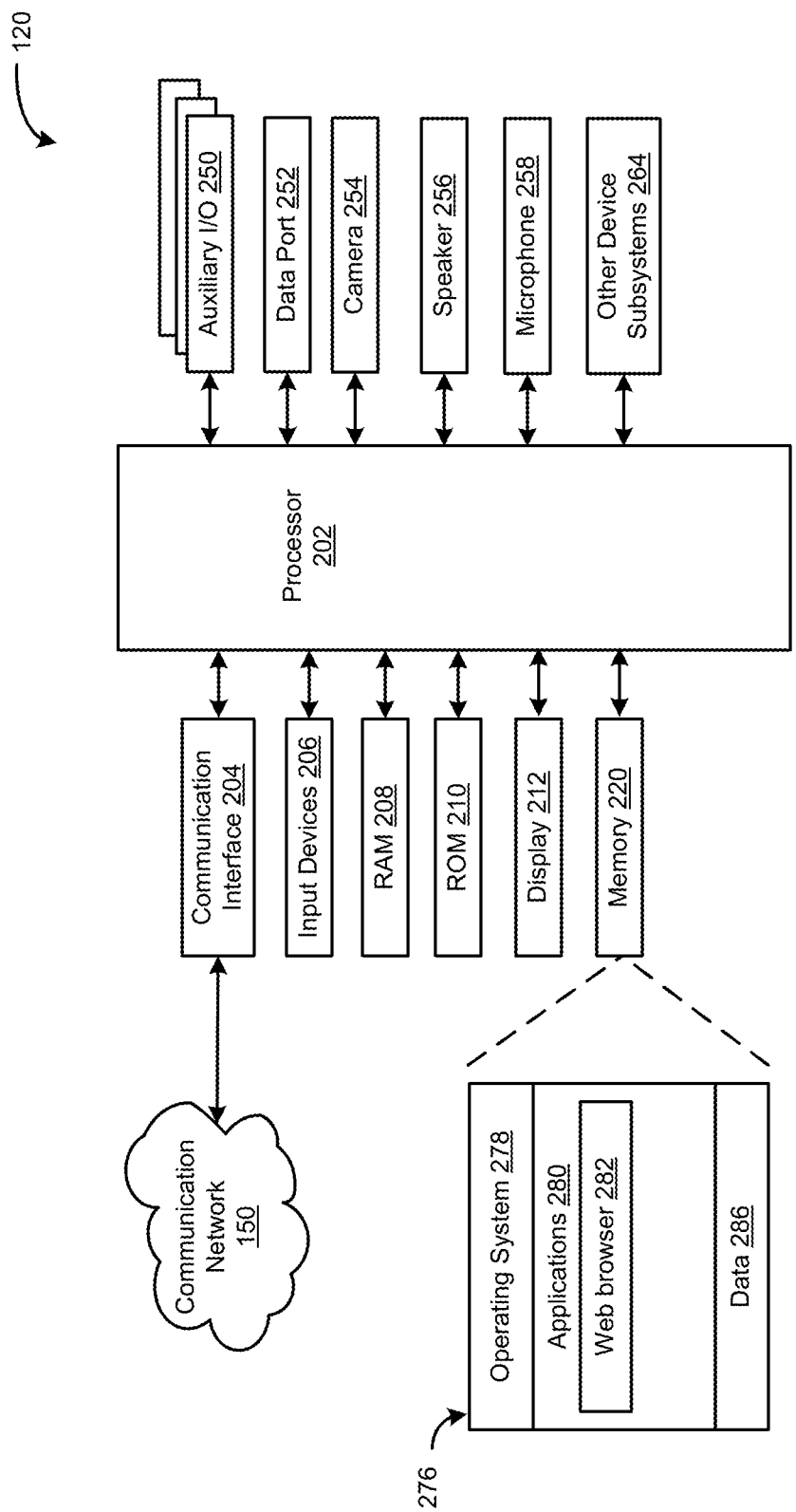
FIG. 2 is a block diagram illustrating a computer or computer suitable for executing an application development tool in accordance with example embodiments of the present disclosure.

Reference is next made to FIG. 2 which shows a computer 120 suitable for executing an IDE application development tool in accordance with example embodiments of the present disclosure. The computer 120 includes a rigid case (not shown) housing the electronic components of the computer 120 computer 120. The electronic components of the computer 120 are mounted on a printed circuit board (not shown). The computer 120 includes a processor 202 which controls the overall operation of the computer 120 and a communication interface 204 for communicating with other devices via the communication network 150.

The processor 202 interacts with other components, such as one or more input devices 206 such as a keyboard and mouse, Random Access Memory (RAM) 208, Read Only Memory (ROM) 210, a display 212, persistent (non-volatile) memory 220 which may be flash erasable programmable read only memory (EPROM) memory ("flash memory") or any other suitable form of memory, auxiliary input/output (I/O) subsystems 250, data port 252 such as a serial data port (e.g., Universal Serial Bus (USB) data port), camera 254 such as video and/or still camera, speaker 256, microphone 258 and other device subsystems generally designated as 264. The components of the computer 120 are coupled via a communications bus (not shown) which provides a communication path between the various components.

The display 212 may be provided as part of a touchscreen which provides an input device 206. The display 212 which together with a touch-sensitive overlay (not shown) operably coupled to an electronic controller (not shown) comprise the touchscreen. User-interaction with the GUI is performed through the input devices 206. Information, such as text, characters, symbols, images, icons, and other items are rendered and displayed on the display 212 via the processor 202.

The processor 202 operates under stored program control and executes software modules 276 stored in memory, for example, in the persistent memory 220. The persistent memory 220 also stores data 386 such as user data. As illustrated in FIG. 2, the software modules 276 comprise operating system software 278 and software applications 280. The software applications 280 include a Web browser 282. The software modules 276 or parts thereof may be temporarily loaded into volatile memory such as the RAM 208. The RAM 208 is used for storing runtime data variables and other types of data or information. Although specific functions are described for various types of memory, this is merely one example, and a different assignment of functions to types of memory could also be used.

Application data associated with an application under development and the IDE is provided by the Web browser 282 such that no application data or IDE software is stored on the computer 120 with the exception of data stored temporarily in cache or the like. Accordingly, the computer 120 provides a thin client with little or no processing logic. The IDE and application data, such as source code and other data associated with applications under development, digital media such as images, and change logs, is stored in a remote database, such as the memory 114 of the ADS 110. In other embodiments, the local storage of the Web browser 282 may be used to save some application data (also referred to as project data).

The communication interface 204 may include a short-range wireless communication subsystem (not shown) which provides a short-range wireless communication interface. The short-range wireless communication interface is typically Bluetooth® interface but may be another type of short-range wireless communication interface including, but not limited to, an infrared (IR) interface such as an Infrared Data Association (IrDA) interface, an IEEE 802.15.3a interface (also referred to as UltraWideband (UWB)), Z-Wave interface, ZigBee interface or other suitable short-range wireless communication interface.

Figure 3:
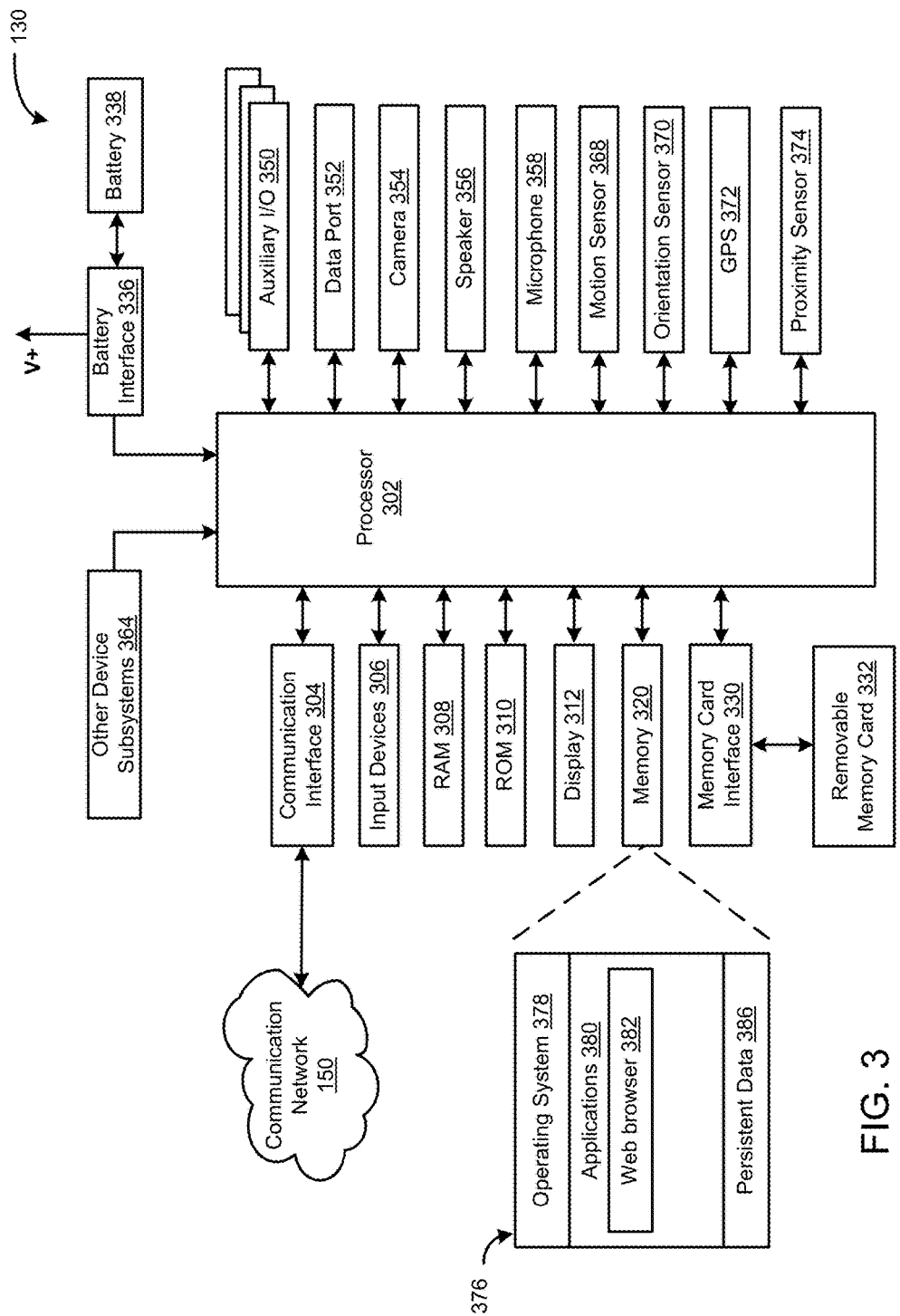
FIG. 3 is a block diagram illustrating a mobile communication device suitable for interacting with a computer operating an application development tool in accordance with example embodiments of the present disclosure and for operating as a device under test.

Reference is next made to FIG. 3 which illustrates a mobile communication device 130 (referred to hereinafter as merely mobile device 130 for convenience) suitable for interacting with a computer operating an IDE application development tool in accordance with example embodiments of the present disclosure and for operating as a device under test. Examples of the mobile device 130 include, but are not limited to, a mobile phone, smartphone or superphone, tablet computer, notebook computer (also known as a laptop, netbook or ultrabook computer depending on the device capabilities), wireless organizer, personal digital assistant (PDA), electronic gaming device, and special purpose digital camera.

The mobile device 130 includes a rigid case (not shown) housing the electronic components of the mobile device 130. The electronic components of the mobile device 130 are mounted on a printed circuit board (not shown). The mobile device 130 includes a processor 302 which controls the overall operation of the mobile device 130. Communication functions, including data and voice communication, are performed through a communication interface 304. The communication interface 304 receives messages from and sends messages via the communication network 150. The communication interface 304 typically includes a WWAN interface for communication over cellular networks and a WLAN interface for communication over Wi-Fi networks.

The processor 302 interacts with other components, such as one or more input devices 306, RAM 308, ROM 310, a display 312, persistent (non-volatile) memory 320 which may be flash memory or any other suitable form of memory, auxiliary I/O subsystems 350, data port 352 such as serial data port (e.g., Universal Serial Bus (USB) data port), camera 354 such as video and/or still camera, speaker 356, microphone 358, a motion sensor 368 which enables to processor 302 to determine whether the mobile device 130 is in motion and the nature of any sensed motion at any appropriate time, an orientation sensor 370 which enables the processor 302 to determine which direction the mobile device 130 is pointed at any appropriate time, a global positioning system (GPS) device 372 which enables the processor 302 to determine GPS coordinates (i.e., location) of the mobile device 130 at any appropriate time, proximity sensor 374 which enables the processor 302 to determine the distance between the mobile device 130 and an object at any appropriate time, and other device subsystems generally designated as 364. The components of the mobile device 130 are coupled via a communications bus (not shown) which provides a communication path between the various components.

The display 312 may be provided as part of a touchscreen which provides an input device 306. The display 312 which together with a touch-sensitive overlay (not shown) operably coupled to an electronic controller (not shown) comprise the touchscreen. User-interaction with the GUI is performed through the input devices 306. Information, such as text, characters, symbols, images, icons, and other items are rendered and displayed on the display 312 via the processor 302. The processor 302 may interact with the orientation sensor 370 to detect direction of gravitational forces or gravity-induced reaction forces so as to determine, for example, the orientation of the mobile device 130 in order to determine a screen orientation for the GUI.

The input devices 306 may include a keyboard, control buttons (not shown) such as a power toggle (on/off) button, volume buttons, camera buttons, general purpose or context specific buttons, 'back' or 'home' buttons, phone function buttons, and/or a navigation device. When the display 312 is provided as part of a touchscreen, the various buttons or controls may be provided by onscreen user interface elements displayed on the display 312 instead of, or in addition to, physical interface components. The keyboard may be provided instead of, or in addition to, a touchscreen depending on the embodiment. At least some of the control buttons may be multi-purpose buttons rather than special purpose or dedicated buttons.

The mobile device 130 also includes a memory card interface 330 for receiving a removable memory card 332 comprising persistent memory, such as flash memory. A removable memory card 332 can be inserted in or coupled to the memory card interface 330 for storing and reading data by the processor 302 including, but not limited to still images and optionally video images captured the image capture assembly 200. Other types of user data may also be stored on the removable memory card 332. Other types of removable digital image storage media, such as magnetic hard drives, magnetic tape, or optical disks, may be used in addition to, or instead of, the removable memory card 332.

The processor 302 operates under stored program control and executes software modules 375 stored in memory, for example, in the persistent memory 320. The persistent memory 320 also stores data 386 such as user data, user information and information regarding the components and technical capabilities of the mobile device 130. As illustrated in FIG. 3, the software modules 376 comprise operating system software 378 and software applications 380. The software applications 380 may include a Web browser 382. The software modules 376 or parts thereof may be temporarily loaded into volatile memory such as the RAM 308. The RAM 308 is used for storing runtime data variables and other types of data or information. Although specific functions are described for various types of memory, this is merely one example, and a different assignment of functions to types of memory could also be used.

One or more mobile devices 130 may be configured as a test device for testing applications under development, hereinafter referred to as test devices. The test devices may have differing device properties, such as technical capabilities, which may include one or any combination of different display sizes, display shapes (e.g., aspect ratio), and display resolutions, as well as different primary input devices 306 (e.g., touchscreen only, touchscreen and keyboard, keyboard and conventional non-touchscreen display 312). The test devices include communication modules for communicating with the ADS 110 and/or computer 120, depending on the embodiment.

The communication interface 304 may include a short-range wireless communication subsystem (not shown) which provides a short-range wireless communication interface. The short-range wireless communication interface is typically Bluetooth® interface but may be another type of short-range wireless communication interface including, but not limited to, an IR interface such as an rDA interface, an IEEE 802.15.3a interface (also referred to as UWB), Z-Wave interface, ZigBee interface or other suitable short-range wireless communication interface.

The mobile device 130 also includes a battery 338 as a power source, which is typically one or more rechargeable batteries that may be charged, for example, through charging circuitry coupled to a battery interface such as the serial data port 352. The battery 338 provides electrical power to at least some of the electrical circuitry in the mobile device 130, and the battery interface 336 provides a mechanical and electrical connection for the battery 338. The battery interface 336 is coupled to a regulator (not shown) which provides power V+ to the circuitry of the mobile device 130.

A received signal, such as a text message, an e-mail message, or web page download, is processed by the communication subsystem 304 and input to the processor 302. The processor 302 processes the received signal for output to the display 312 and/or to the auxiliary I/O subsystem 350. A subscriber may generate data items, for example e-mail messages, which may be transmitted over the communication network 150 through the communication subsystem 304, for example.

The motion sensor 368 may comprise an accelerometer (such as a three-axis accelerometer) or other suitable motion sensor. The orientation sensor 382 may comprise an accelerometer (such as a three-axis accelerometer), electronic compass, gyroscope, or a combination thereof. Other suitable orientation sensors could be used instead of, or in addition to, the accelerometer, electronic compass and gyroscope. The motion sensor 368 and orientation sensor 382, or parts thereof, may be combined or shared, for example, within an integrated component. The processor 302, or controller (not shown) of a three-axis accelerometer, can convert acceleration measurements into device orientations.

The proximity sensor 374 may comprise a sensor that transmits a field or signals (such as electromagnetic) to detect the presence of nearby objects (i.e. the sensor's target). The maximum distance that the proximity sensor 374 can detect is may be predetermined or adjustable. The processor 302 can utilize this information to determine the distance between the mobile device 130 and the target object to be captured in an image.

The mobile device 130 may connect to a computer 120 via the data port 352, such as a USB connection or Firewire™ connection, or a short-range communication interface, such as a Bluetooth™ connection.

Application Framework

The IDE and application development tool of the present disclosure, in at least some embodiments, may be configured to develop applications for use with, for example, the Cascades™ application framework for the BlackBerry™ 10 operating system. The Cascades™ application framework includes Cascades™ application programming interfaces (APIs), Qt APIs, Cascades™ libraries, Qt libraries for developing applications for mobile devices 130 and optionally native C/C++ APIs. In other embodiments, the Cascades™ application framework could support one or more operating systems in addition to, or instead of, the BlackBerry™ 10 operating system. In yet other embodiments, the IDE and application development tool could use a different application framework for developing applications for mobile devices 130 using one or more different operating systems, or could use a cross-platform application framework for developing applications for mobile devices 130 using one of a number of different operating systems.

As will be appreciated to persons skilled in the art, Qt is a cross-platform application framework commonly used for developing applications with a GUI (in which cases Qt is classified as a widget toolkit). Qt is based on C++ but uses a special code generator called the Meta Object Compiler (MOC) together with several macros to extend the language. The Cascades™ application framework leverages the Qt object model, event model and threading model. The slots and signals mechanism in Qt allows for useful and flexible inter-object communication. The Cascades™ application framework incorporates features of fundamental Qt classes (such as QtCore, QtNetwork, QtXml, and QtSql, and others) and builds on these Qt classes.

The Cascades™ application framework separates application logic and user interface elements. Application logic is handled by an interpreter and user interface elements are rendered by a user interface (UI) rendering engine. The type of each UI control in an application, its properties and behavior are declared. When the application is run, the UI rendering engine displays the UI controls and applies any transitions which have been specified. In contrast, in a traditional, window-based UI framework, a simple animation or transition might require hundreds of lines of code. To create a sophisticated UI within a window-based UT framework, a lot of code may be required to locate UI controls where and when the UI controls are needed. Additionally, the graphics code for a UI can be difficult to maintain using a window-based UI framework especially for multiple screen sizes.

The application logic (or business logic) and the UT rendering engine run on separate execution threads that communicate asynchronously. The separation of application and rendering logic means that the UI rendering engine does not need to wait for a long running computation to complete before updating the UI. This makes the Cascades™ application framework both fast and easy to use, and helps applications present a UI at a consistently high frame rate which keeps the UI smooth and responsive.

Within the Cascades™ application framework, each application comprises as a number of interconnected pages in which each page is configured to be displayed on the display of a mobile device 130. Each page is written in Qt Modeling Language (QML) and comprises one or more QML document files. It is contemplated that the QML code in a page could interact with native (C++) code as noted below. The application logic defines how the pages interact with each other and input and output data, whereas the user interface elements define how the appearance of the pages. Typically, each page is configured to be displayed full screen on the display of a mobile device 130. The screen orientation in which each page is displayed is defined by the application and reflected in the orientation of the user interface elements. The page size and aspect ratio of each page is also defined by the application and reflected in the page size and aspect ratio of the user interface elements of each page. It will be appreciated; however, that more than one page size and/or aspect ratio may be supported by an application, in which case the page size and aspect ratio are defined on per device configuration basis. Each page typically has its own unique identifier (ID) such as the file name of the page.

Each QML document includes one or more QML objects each having a number of properties which depend on the type of object. The QML objects within each QML document are linked in a hierarchical relationship. Each QML object has a unique ID. The unique ID, in at least some embodiments, is automatically assigned when the object is created in accordance with a predefined algorithm, and typically consists of a prefix which specifies the object type and a suffix which specifies the object's number in the total number of objects of that type. The unique ID which is assigned may be changed by the user.

The application development tool of the present disclosure utilizes a UI rendering engine for rendering UI elements of an application on client devices, such as computers 120, connected to the ADS 110 via the Internet. The client devices include a QML parser written in JavaScript which parses the QML of the application pages. The QML parser may be downloaded as part of the content downloaded by the Web browser 282 on the computer 120 when accessing the website where the application development server is hosted. When the application is published to a supported mobile device 130, a QML parser is provided as part of the Cascades™ UI rendering engine on the mobile device 130, for example, as part of the operating system 378 or application 380.

The Cascades™ application framework supports applications written in C++, QML, or a combination of C++ and QML. QML is a declarative language that is based on JavaScript which was developed to create user interfaces using a powerful but simple language. QML can be used to describe the structure and behavior of a set of UI controls. QML uses concepts such as objects, properties, and signals and slots to let objects communicate with each other.

The Cascades™ application framework uses a modified form of QML for creating UIs in applications. QML makes it easy to identify the relationships between the various components in an application, as described in more detail below. QML allows developers to more easily see how UI controls are related to each other and how the controls may be laid out visually in an application. One control can belong to another control (that is, being owned by another control) using object ownership, discussed below.

Each Cascades™ UI control is represented by an underlying C++ class. For most properties of QML controls, there are associated C++ functions that can be used to retrieve or set the values of these properties. As noted above, applications can be made using QML, C++ or both. However, even if an application is entirely in QML, C++ code is typically used to load the QML and start the application started. This C++ code is provided by the IDE and application development tool when an application is created.

QML is typically used to define the look and feel of an application. Core UI controls, such as buttons, text fields, labels, sliders, and drop-down menus can be used, or custom controls can be created, and user interaction like button clicks can be responded to. Different layouts can be used to arrange the controls to obtain the desired look. With QML, visual designs can be created and tested quickly and easily.

C++ is typically used to take care of the business logic of the application. C++ classes can be created and used to perform calculations, handle data storage operations, and so on. The full capabilities of C++ can be used to supplement the UI-related features provided by QML.

By using QML for the UI and C++ for business logic, one aspect of an application CaO be changed without affecting another. For example, the appearance of a list of items can be changed without worrying about how the data for the list is stored or accessed. Or, a new sorting algorithm can be implemented in the application without affecting how the data is shown.

Controls and events are C++ objects that are exposed using QML. An application UI can be declared in QML and events can be processed using JavaScript in line with the QML. If an application has a computationally intensive process or a sophisticated user interaction scenario that cannot process in QML and JavaScript, C++ objects can be used instead.

The Cascades™ application framework includes a set of core UI components designed to have a consistent look and feel which are optimized for touchscreen interaction which can be used when developing an application. The core controls include:
  Button—a clickable button that can contain text, an image, or both;
  CheckBox—a check box that a user can check or clear;
  ToggleButton—an option button with only two states: on or off;
  Slider—a slider that lets a user select a value within a specified range of values;
  Label—a non-interactive label with a single line of text;
  TextField—a text box into which a user can type text;
  ImageView—a visual control for displaying an image.

Custom UI controls can be created from any two or more core UI controls by combining and extending core UI controls. For example, in an address book application, a custom control component for a contact may include an ImageView control for the contact's picture and a Label control for the contact's name. When a contact is displayed in the application, an instance of the custom control component is displayed instead of creating each control separately.

The Cascades™ application framework can also be used to add functionality to UI controls to create animations, handle touch events, apply text styles, and more.

The Cascades™ application framework also provides an event system which takes advantage of a slots and signals framework in Qt for inter-object communication. Objects can communicate with each other by emitting a signal. One object that wants to receive a message from another object can create a slot for a particular signal. Unlike the callback technique for inter-object communication, slots and signals are type-safe and loosely coupled. An object that implements a slot must match the method signature for the signal that it can receive. This approach allows the compiler to type-check the subscription. Apart from the data type in the signature, a slot implementation does not need to know anything about the signal implementation. The slot does not even need to receive the same number of arguments that a signal emits. Similarly, signals can be sent to objects if the slots which the signals implement are known. The Cascades™ application framework discards signal arguments that are not implemented by the slot. Accordingly, events in the Cascades™ application framework are implemented as signals. When a user interacts with the UI of an application, the Cascades™ application framework emits a signal. The Cascades™ application framework delivers the signal to each slot that is connected to the signal.

The Cascades™ application framework also animates any change in certain types of properties of a UI control by default. Properties which can be animated include:
  Position;
  Size;
  Scale;
  Rotation; and
  Opacity.

The UI of an application operates as a collection of containers with which a user can interact. For example, assume a user is allowed to inspect the contents of a container when it is tapped. The Cascades™ application framework monitors for a touch event in the screen area occupied by the container and, in response to detecting a touch event in the screen area occupied by the container, changes the x and y coordinates and the height and width of the container to enlarge the displayed size of the container. When the x and y coordinates of the container are changed, the Cascades™ application framework slides the container from its current position to the target position. A traditional UI framework may simply draw the container again in its new location, but the Cascades™ application framework animates the change in position automatically. Similarly, when the height and width of the container are changed, the container is enlarged from its current size to the target size.

The Cascades™ application framework also provides fine control over animation. Transitions between pages (screens) can be explicitly specified transitions using classes which include:
  FadeTransition—an animation that controls the opacity of a VisualNode;
  RotateTransition—an animation that rotates a VisualNode around its z-axis;
  ScaleTransition—an animation that scales the size of a VisualNode;
  TranslateTransition—an animation that controls the position of a VisualNode;
  EasingCurve—an abstract class for easing curves that are used with animations;
  SequentialAnimation—a group animation that plays its children animations sequentially;
  ParallelAnimation—a group animation that plays its children animations in parallel; and
  GroupAnimation—abstract class containing properties exposed to group animations.

The Cascades™ application framework also provides a flexible layout system which adjusts the size and position of UI controls automatically. When additional controls are added to a container with a layout, the size and positioning parameters of the control can be configured to change relative to other controls in the layout. The Cascades™ application framework provides layouts which include:

StackLayout—arranges child controls vertically or horizontally relative to each other. This is the default layout for containers.

DockLayout—arranges child controls along the edge, or in the center, of the container specified by the child control.

AbsoluteLayout—requires that x and y coordinates of each control be specified. The origin of the coordinate system is the top-left corner of the control's parent container.

Figure 4:
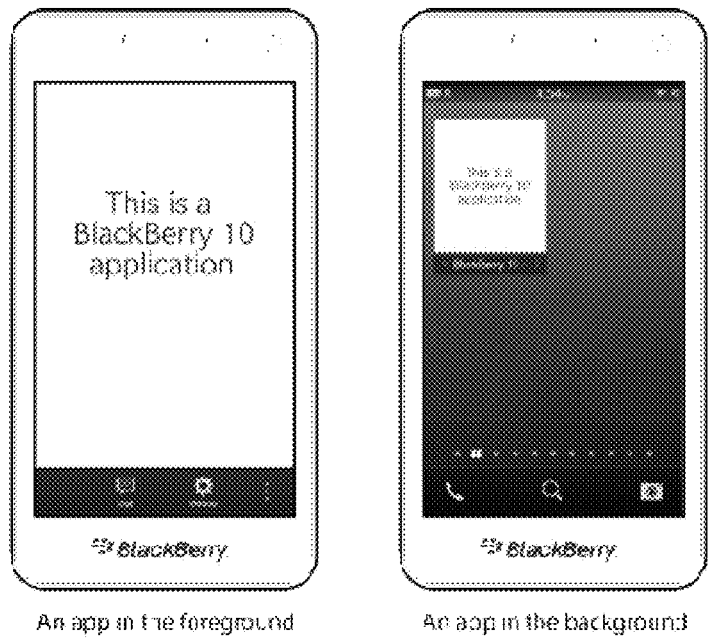
FIG. 4 illustrates an application running in the foreground and the same application running in the background.

Applications developed using the Cascades™ application framework have a similar lifecycle that includes three possible operational states: running in the foreground, running in the background and stopped. An application is running in the foreground if it is currently visible and is taking up the entire screen. An application is running in the background if it is visible and is running in a reduced size (e.g., as a thumbnail), such as when a user swipes up from the bottom of the screen to display a list of running applications. An application is also considered to be running in the background if it is not visible but has the appropriate permissions to run in the background. An application is stopped if it is not visible and does not have permission to run in the background. FIG. 4 illustrates an application running in the foreground and the same application running in the background.

The operational state of an application may vary depending on user input and other factors. While applications can allow a user to directly interact with the application while running, applications do not require user input while running. This type of application may monitor for a particular event to occur on the mobile device 130 and then respond by notifying the user at that time. This type of applications is suitable to run in the background until the application needs to alert the user that the event has occurred. By default, an application enters the stopped operational state when it is in the background and not visible. The application cannot perform any operations in this operational state. Processor time is not allocated to applications in this operational state, so this helps to minimize battery power consumption and maximize the performance of the mobile device 130. However, an application may be set to continue running while it is in the background and is not visible by setting the appropriate permission. The Application class includes several signals that are emitted when the operational state of the application changes.

Figure 5A:
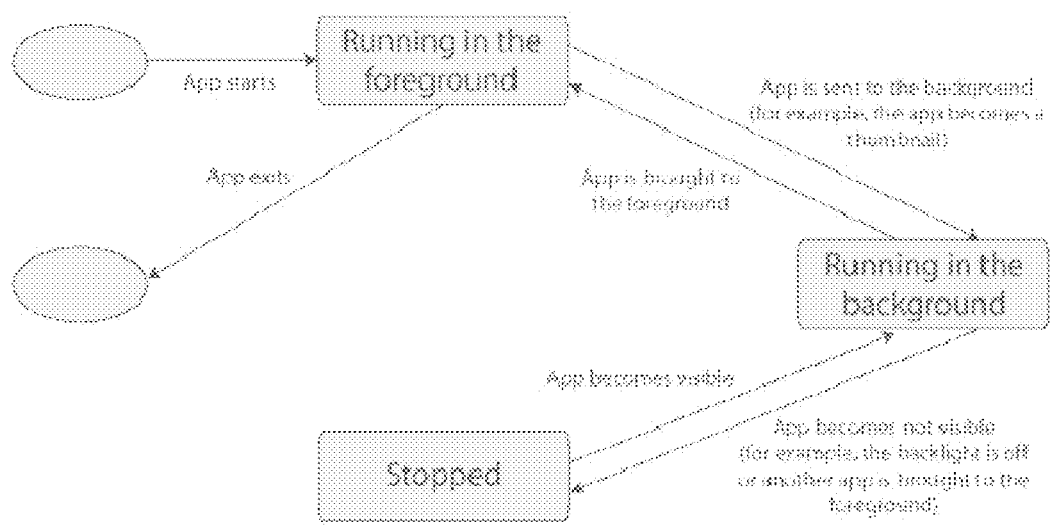
FIG. 5A illustrates changes in the operational state when an application does not have permission to run in the background and is not visible.

FIG. 5A illustrates an example of changes in the operational state of an application when an application does not have permission to run in the background and is not visible. The application lifecycle includes the stopped operational state. An application enters the stopped operational state, for example, when it is in the background and not visible—the application cannot perform any operations in this operational state.

Figure 5B:
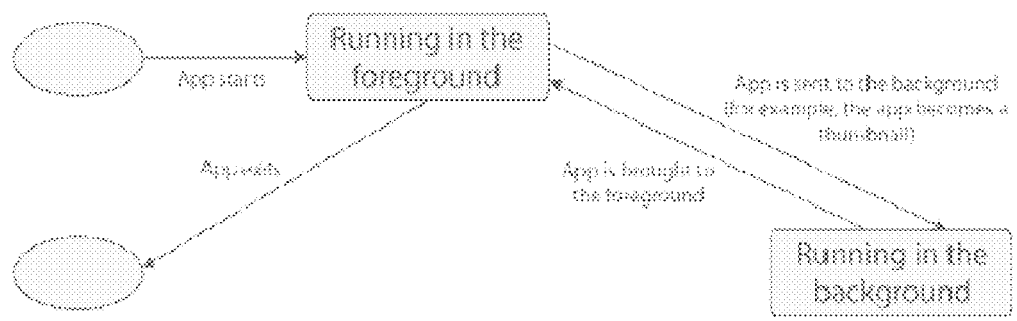
FIG. 5B illustrates changes in the operational state when an application has permission to run in the background and is not visible.

FIG. 5B illustrates an example of changes in the operational state of an application when an application has permission to run in the background and is not visible. The application lifecycle does not include the stopped operational state. The application continues to run when it is in the background and not visible, and the application can continue to perform operations and process events in this operational state.

QObject, the Qt Base Class

All objects in Cascades™ are derived from the QObject class. This class is the base class of all Qt objects and provides several important features. Most notably, QObject provides support for signals and slots, which is a mechanism that allows objects to communicate with each other. When something happens to an object in an application (for example, a user clicks a button), the object emits a signal. The application can respond to the emitted signal caused by the event by using a function called a slot.

This structure of a QObject subclass will now be briefly described by examining parts of a C++ header file to provide an understanding of the connection between QML elements (such as properties) and the C++ equivalents, which can be imported when custom control components are created used in conjunction with other QObject elements.

To illustrate some of the features and requirements of a QObject in Cascades™, consider the Button control. This control represents a clickable button that can be used in an application. The header file (button.h) for this control is located in the folder where the BlackBerry 10 Native SDK as installed, typically in the target\qnx6\usr\include\bb\cascades\controls subfolder.

Class Declaration class QT_CASCADES_EXPORT Button:public AbstractButton {

Figure 6:
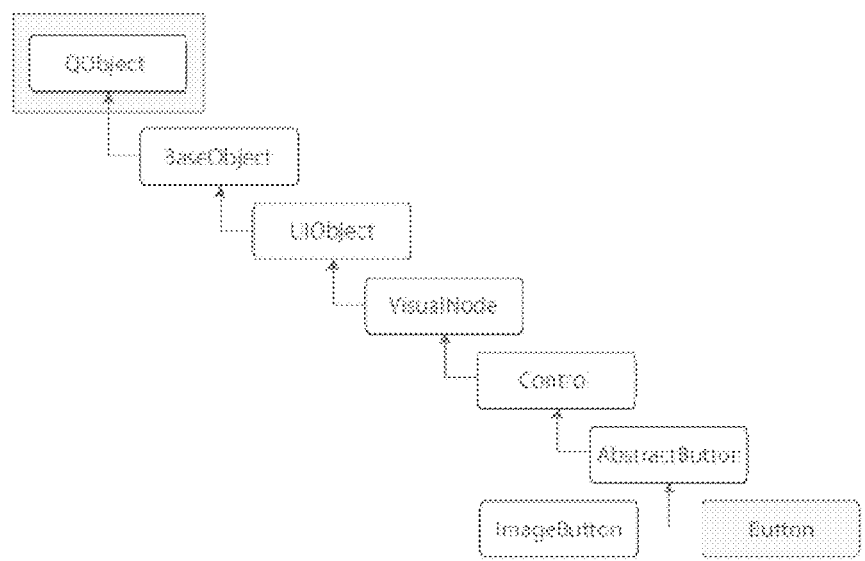
FIG. 6 is a block diagram illustrating the inheritance chain associated with the Button control for the purpose of illustration.

All Cascades™ controls inherit QObject, either directly or indirectly. FIG. 6 illustrates the inheritance chain associated with the Button control. The Button class inherits several intermediate classes, all of which eventually inherit QObject.

Q_OBJECT macro private: Q_OBJECT

To identify a class as a QObject, the Q_OBJECT macro needs to be used in the private: section of the class definition. This macro is processed by the Qt Meta Object Compiler and enables features such as properties, signals, and slots.

Property Declaration

Q_PROPERTY(QString text READ text WRITE setText RESET resetText NOTIFY textChanged FINAL)

A property is a single piece of information about an object, and is declared by using the Q_PROPERTY macro. This macro allows the property to be accessible in QML. Inside Q_PROPERTY, the name and type of the property can be specified. Keywords (such as READ and WRITE) can be used to specify the names of functions to manipulate the property value. Properties are declared in the private: section of the header file, along with the Q_OBJECT macro.

As shown above, the Button class includes the text property, which specifies the text to appear on the button. This property is a QString (the Qt representation of a text string) and has associated functions called text( ), setText( ), and resetText( ) to obtain, set, and reset the value of the property, respectively. These functions still need to be declared later; the Q_PROPERTY macro simply associates the functions with the property. A signal emitted when the value changes can be specified by using the NOTIFY keyword.

Function Declaration public: Q_SLOT void setText(const QString & text);

Functions for QObject classes can be created like any other C++ classes. However, the Q_SLOT macro is used before the function declaration. This macro is another special element of Qt and indicates that this function is a slot.

Slots can be connected to signals so that when a signal is emitted, the connected slot function is called automatically. As an alternative to the Q_SLOT macro, slot functions can be declared in a public slots: section in a header file. In the Cascades™ application framework, these approaches are equivalent.

Q_INVOKABLE is another useful macro which can be used in front of a function declaration (in the same place as Q_SLOT above) to indicate that a function can be called from QML. This approach can be useful for a complicated operation (for example, a custom transition for a UI control) implemented in C++. The UI-related portion (calling the function at the appropriate time) can be called in QML but the operation in C++ can be implemented any way.

Signal Declaration

Q_SIGNALS: void textChanged(QString text);

Q_SIGNALS: section CaO be used to declare signals that a QObject emits when certain events occur. A Button emits the textChanged( ) signal when its text changes, and this event can be handed within an application if needed. See signals may also be declared in a signals: section in a header file, which is equivalent in the Cascades™ application framework.

Object Ownership

Every QObject can be related to other objects in parent/child relationships. An object can have one parent, as well as zero or more children. A parent object is said to own its child objects. When an object is destroyed, its children are also destroyed, so it is important to keep in mind which objects are related to other objects within an application.

Scene Graphs

The Cascades™ application framework maintains the relationships between objects internally and automatically transfers ownership between objects when functions that change object ownership are called. To make it easier to visualize the parent/child relationships in an application, a structure called a scene graph is used. The scene graph illustrates nodes in an application, which are user interface control objects, and how the nodes are related to each other. The scene graph is a logical representation of user interface control objects which is typically not displayed to the designer. The scene graph makes it easier to visualize how the Cascades™ application framework internally keeps track of object relationships.

Figure 7:
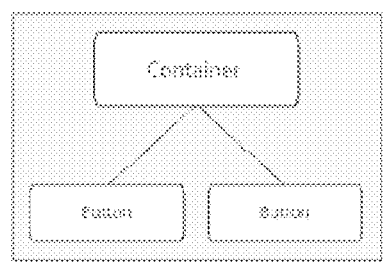
FIG. 7 is a block diagram illustrating a scene graph for the Button control for the purpose of illustration.

Scene graphs are common in many types of applications, such as complex UI applications and games and make it easier to manage complex arrangements of UI components. Using scene graphs can also increase the performance of applications. Finally, the hierarchical nature of scene graphs fits well with the parent/child relationship structure of Qt objects. For example, the code for a Container with two Button controls can be presented by the following and illustrated by the scene graph in FIG. 7.

```
Container {
    Button {
        text: "Button 1"
    }
    Button {
        text: "Button 2"
    }
}
```

Scene graphs can be useful to keep track of how object ownership might affect various aspects of an application. For example, a scene graph can be used to visualize how touch events are delivered to different controls on the screen.

Object Ownership in QML

In QML, object ownership is established automatically according to the structure of the QML code of the application. For example, consider the above-noted code sample which creates two Button controls and adds the controls to a Container. The Container is the parent of the buttons and the buttons are children of the Container. When the container is destroyed, both buttons are destroyed as well.

Object Ownership in C++

In C++, object ownership is a somewhat more complicated. Initial object ownership can be established either when controls are created or when the controls are added to other controls. Both approaches result in the same parent/child relationships, so either approach can be used in an application.

After object ownership has been established, the parent of an object can be changed by simply by adding the object to a different parent. The object is removed from the first parent and added to the new parent and the new parent then owns the object. An object can also be removed from a container without specifying a new parent for the object. However, this can present issues because even though the object has been removed from the container, the container is still the parent of the object and still owns the object. If the container is deleted, the object will be deleted as well. This can lead to errors in an application may be difficult to recognize.

When an object is removed from its parent, or when an object is replaced by a new object (in the case of certain setter functions, such as Page::setContent( ), it is removed from the visual hierarchy (i.e., it is not displayed on the screen anymore). The object's parent still owns the object, though an object can be re-parented or deleted at this point. If the object is not re-parented, it is still deleted when the parent object is deleted. However, an object cannot be re-parented if it is still part of the visual hierarchy of its parent. The object needs to be removed before it can be re-parented.

All QObject instances include a function called setParent( ) and this function can be used to re-parent an object when allowed, as described above. Using setParent( ) to re-parent an object does not add that object to the parent's visual hierarchy—it still needs to be added explicitly, for example, by calling Container::add( )). To prevent an object from being deleted when its former parent is deleted, a call to setParent(0) can be added after an object is removed from its parent.

There is an exception to the rules of object ownership. The top-level scene in an application, which is the AbstractPane object that is set as the root node using Application::setScene( ), behaves differently than other scenes/panes. The application takes ownership of the AbstractPane only if the pane does not already have a parent. If the AbstractPane does not have a parent when setScene( ) is called, the application will own the pane and will delete it if a new scene is set. However, if the AbstractPane already has a parent the application will not take ownership of the pane when setScene( ) is called.

This behavior lets an application switch between different scenes but still ensures that for the most basic use case (an application with just a single scene) the old scene is deleted when appropriate. If the application is to switch between two scenes, the parents of the AbstractPane objects should be set explicitly using setParent( ) before setScene( ) is called.

Many other functions of the Cascades™ application framework classes change the ownership of objects. The API reference for the classes and functions in application should be checked to ensure that object ownership is not altered in unexpected in ways Thread Support Qt provides support for threaded applications with the QThread class. The ability to create new threads is often necessary if an application contains resource-intensive processes that would otherwise block the UI thread. A QThread represents a separate thread of control within the application; it can share data with all the other threads within the application, but executes independently in the same way that a standalone application does. In order to facilitate communication between threads, signals and slots are fully supported.

To use the QThread class, it is recommended to create a worker object derived from QObject and implement a slot on that worker to handle the task. The worker should also specify a signal that is emitted when the task is finished and an optional signal that is emitted when in case of an error. Once the worker class is created, QThread CaO be given ownership of the worker, the appropriate signals and slots CaO be connected, and the thread CaO be started.

Application Development Tool

Figure 8:
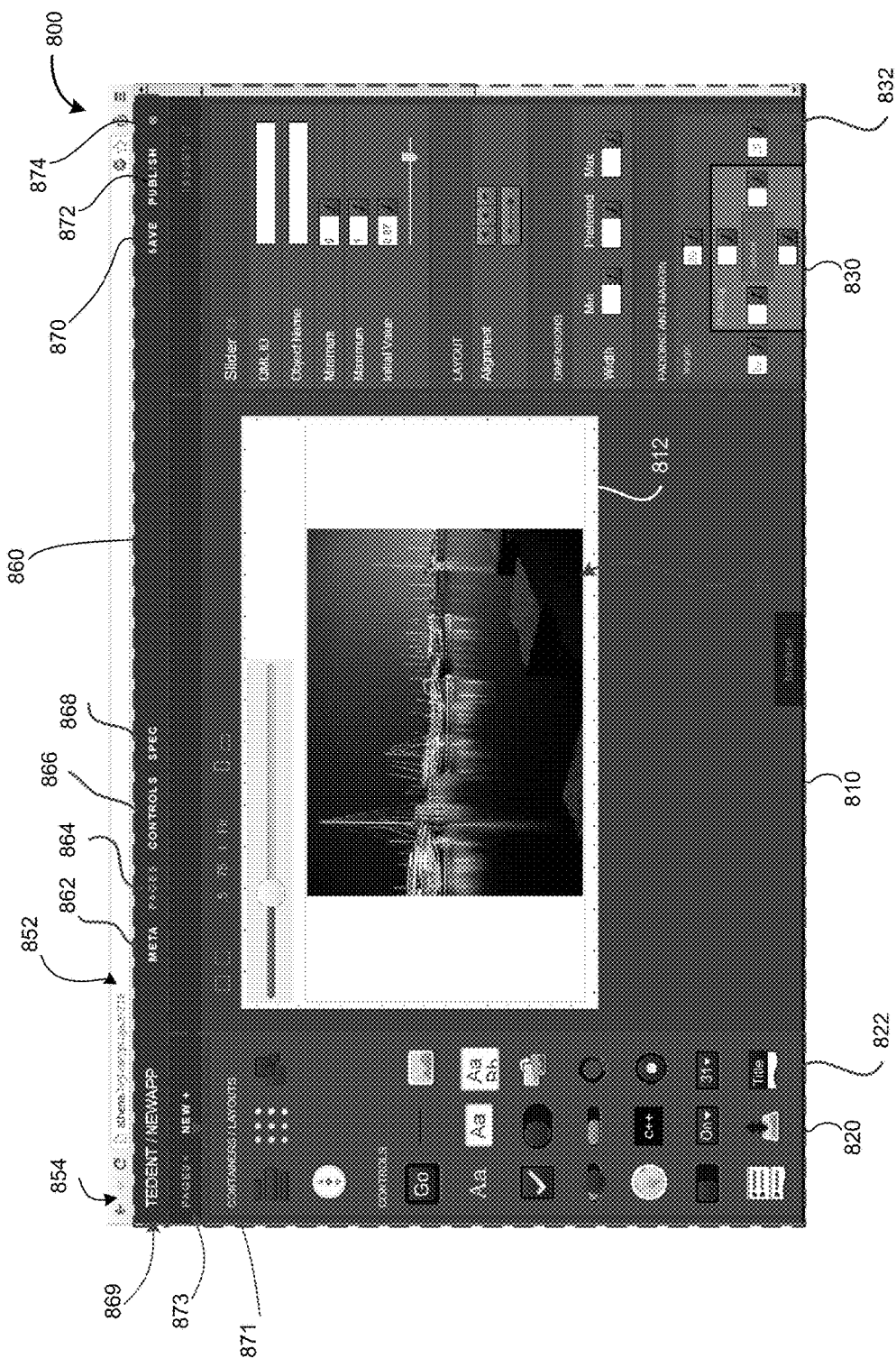
FIG. 8 is an example editor user interface screen of the application development tool for creating, editing and viewing an application page in accordance with an example embodiment of the present disclosure.
Figure 9A:
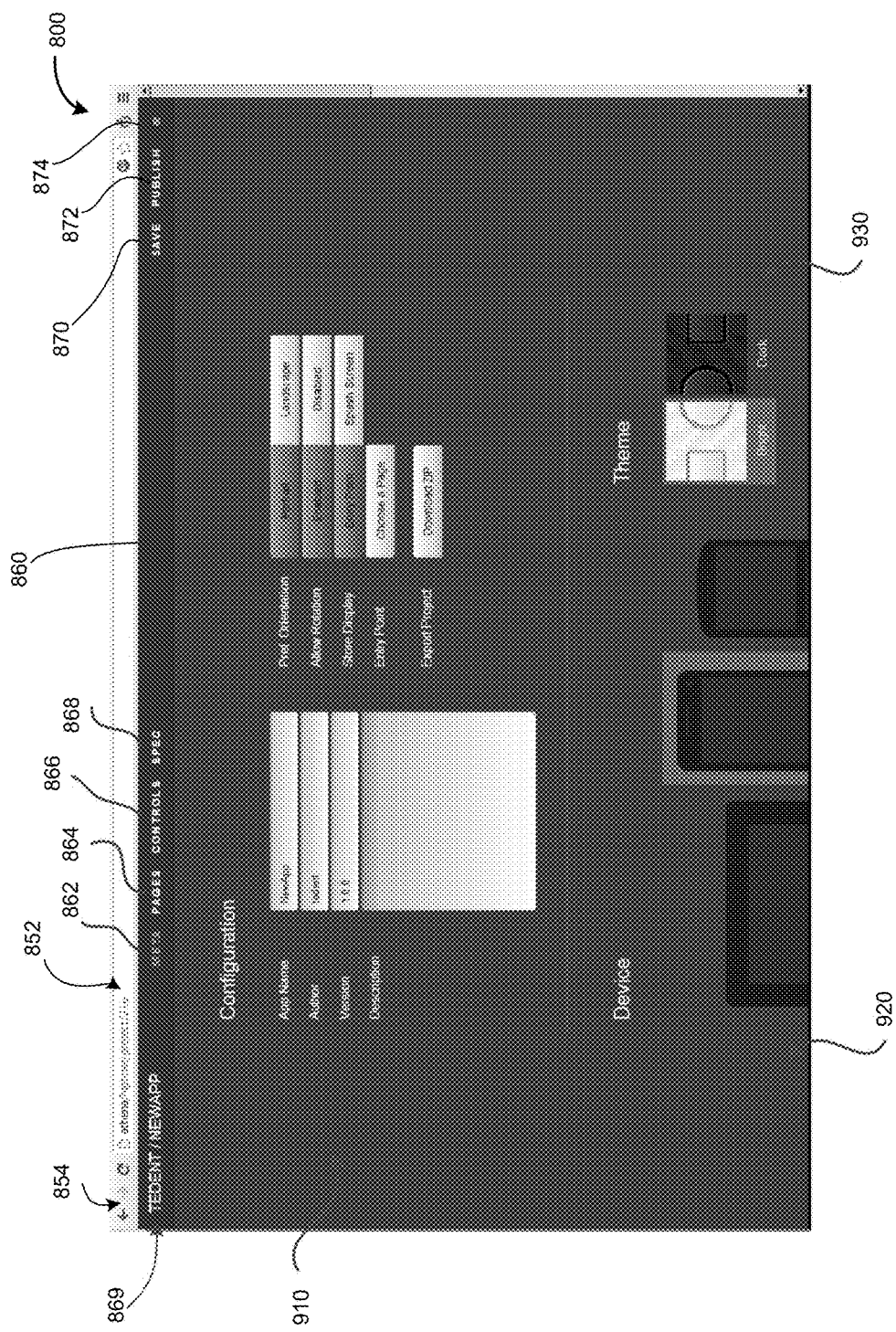
FIGS. 9A to 9D show a Metadata user interface screen of the application development tool for setting application properties in accordance with an example embodiment of the present disclosure.
Figure 9B:
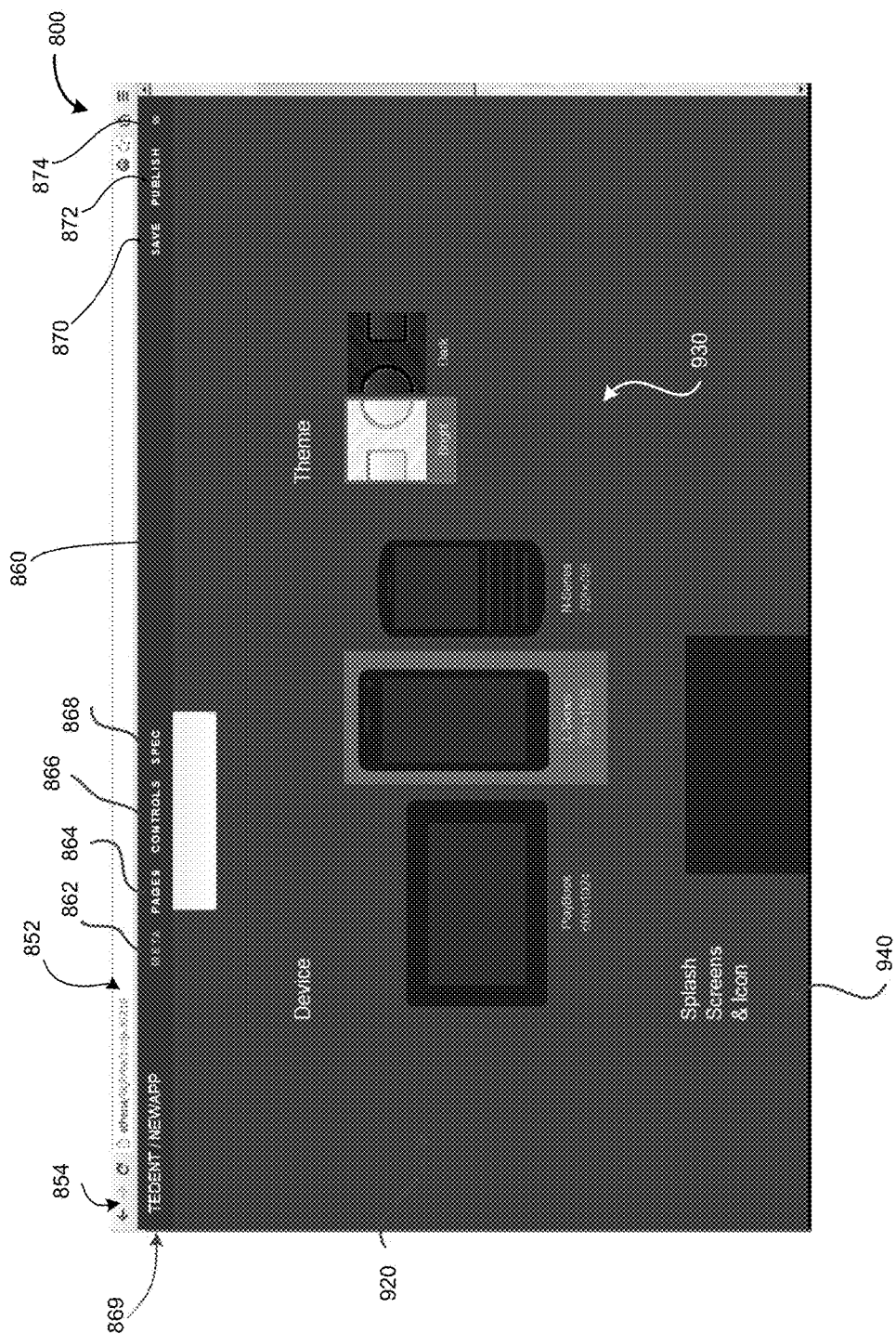
Figure 9C:
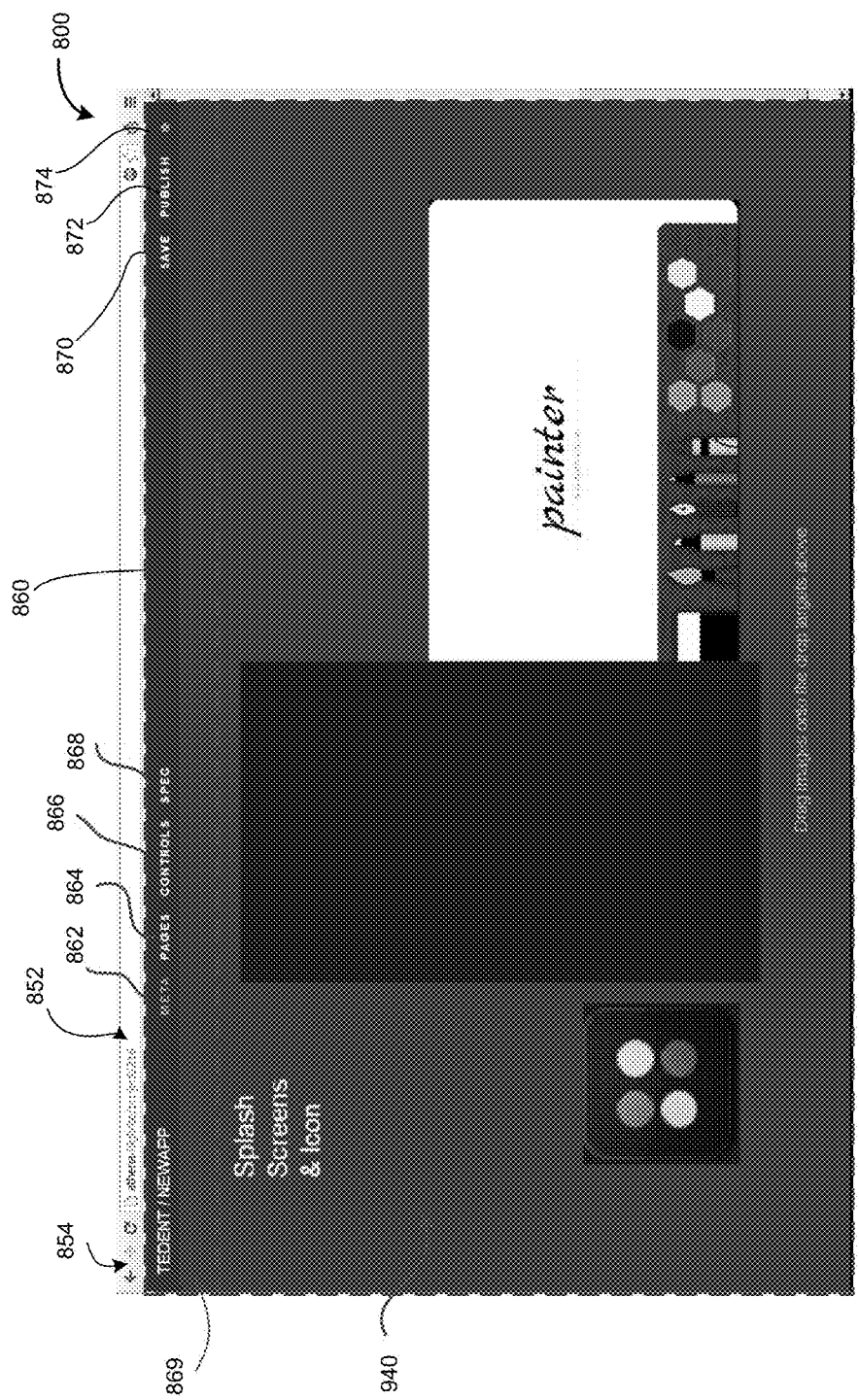
Figure 9D:
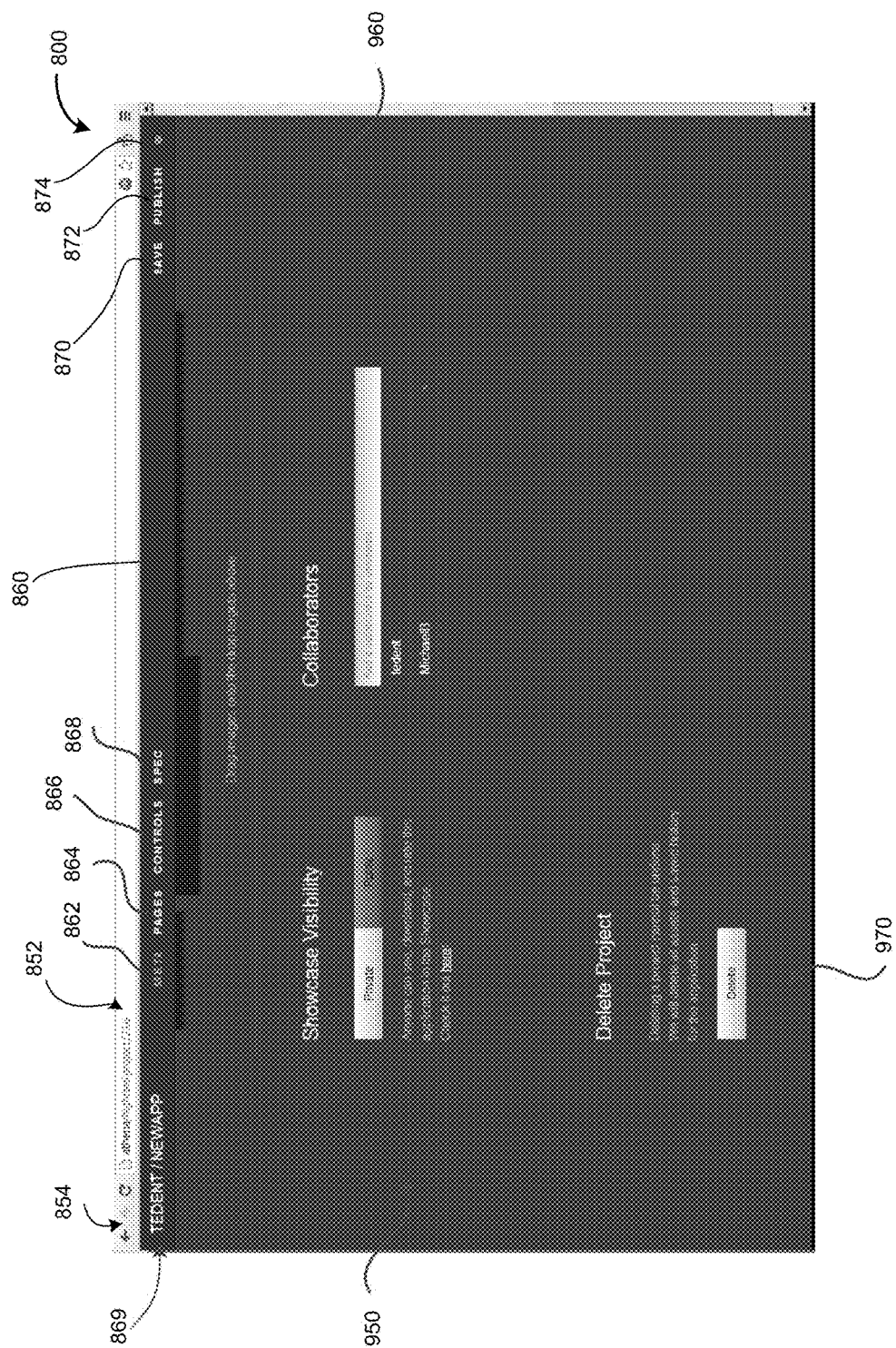

Referring now to FIGS. 8 to 12, a Web-based application development tool (tool) 800 in accordance with the present disclosure will be described. FIG. 8 shows an editor user interface screen of the tool 800 which acts as the editor user interface. The editor user interface screen allows individual application pages to be created and edited. Each application comprises a series of one or more pages which are displayed on the display 312 of a mobile device 130. Each application specifies the content and interaction between the pages. The tool 800 provides a visual user interface having a variety of tools for creating and editing applications for mobile devices 130 running a supported operating system 378. In the described embodiment, the tool 800 provides an interface for rendering and displaying applications for use the Cascades™ application framework for the BlackBerry™ 10 operating system, as well as creating and editing such applications. The tool 800 also causes application code in accordance with the Cascades™ application framework to be generated during saving, exporting or publishing of the application. The descriptive nature and properties of Qt and the Cascades™ application framework facilitates the use of a visual tool such as that provided by the present disclosure, which brings drag and drop functional to visual object creation, change and deletion in a manner which supports real-time collaboration development and "always-save" functionality. Nevertheless, it is contemplated that the tool 800 could be adapted to generate application code for use with a different application framework in other embodiments.

The tool 800 is a Web-based application which is accessed using the Web browser 282 on a computer 120. The Web browser 282 includes an address bar 452 which, when viewing or editing an application, indicates the address of the application hosted by the application development server 110, navigation buttons 854 and other controls. A user accesses the tool 800 by navigating to the application development server 110, for example at its Internet address, logging in to the application development server 110 using provided user credentials (user name and password), and requesting that a particular application under development which is hosted by the application is opened with the tool 800. Users can also register for a new account if they do not already have an account. These operations are implemented using communication protocols, such as HTTP/HTTPS communications, well known in the art.

As noted above, the tool 800 stores the application state in its own internal format on the client (e.g., computer 120). The tool 800 transcodes the QML document into JavaScript to create a hierarchy of JavaScript objects which correspond to the QML objects of the QML document using a JavaScript QML parser. The details of the transcoding need not be described for the understanding of the present disclosure. After transcoding, the computer 120 may discard the QML data. The current state of the application is maintained in memory by the computer 120 in JavaScript. In contrast, when the application is published to a mobile device 130, QML documents are processed natively with the provided QML parser.

The UI rendering engine on the computer 120 transcodes the JavaScript objects into HTML (HyperText Markup Language) objects styled using CSS (Cascading Style Sheets) so as to resemble Cascades™ UI controls written in QML. The JavaScript engine then inserts these stylized HTML objects into the active HTML page (document) and positions the UI controls with the HTML page using CSS in a manner similar to how the Cascades™ UI rendering engine would position the UI elements on a deployed mobile device 130. The transcoding operations allow the processing of a Cascades™ application in QML to be emulated within the Web browser 282 on a computer 120 which is not capable of natively processing the QML documents of the application and/or which does not support the Cascades™ application framework. It is contemplated that in other embodiments, QML documents could be processed using a combination of languages or technologies other than JavaScript, HTML, and CSS. The computer 120 causes QML application code in accordance with the Cascades™ application framework to be generated from the internal format (e.g., JavaScript) stored on the computer 120 when saving the application, exporting the application or publishing of the application to a mobile device 130. The computer 120 generates the full application code in its current state (if not already in memory), transcodes it from JavaScript to QML, and sends the QML to the ADS 110 when the application needs to be saved, exported or published to a mobile device 130. At least some of the metadata, such as the version number, associated with the application is typically exported with the application and included with the application when published to a mobile device 130. Once the application is published to a mobile device 130, the application communicates with the ADS 110 in the same or similar manner as the tool 800 with a Web browser 282 on a computer 120.

The tool 800 includes a canvas 810 in which a real-time rendering of an application under development is provided. The canvas, in the described embodiment, displays a rendered page 812 of the application. Different pages of the application can be rendered and displayed as the user navigates through the application pages activating the appropriate option in a control panel 860. Creating a new page displays a blank page and selecting an existing page causes the selected page to be rendered and displayed in the canvas 810. The canvas 810 may display gridlines or rulers other reference markings depending on the setting and may highlight a currently selected object.

The tool 800 includes a drag-and-drop object palette 820 which includes a number of objects including control UIS. The objects include core control UIs 822 which are defined by the Cascades™ application framework and Qt, such as a Button, CheckBox, ToggleButton, Slider, Label, TextField and ImageView, and optionally one or more custom control UIS. Objects from the object palette 820 can be added to the active (current) page of the application which is rendered and displayed in the canvas 810 by dragging and dropping the desired object from the object palette 820 to a desired location on the canvas 810.

When an object in the canvas 810 is selected, the tool 800 provides an attributes panel 830 which includes a number of attributes 832 for a selected object. The particular attributes 832 are context sensitive and depend on the type of the object which is selected. Similarly, the value of the various attributes 832 depend on the particular object which is selected. In the illustrated example of FIG. 8, a slider is selected so the attributes panel 830 displays attributes associated with slider. The attributes 832 for the slider include the object type, the object name, minimum, maximum and initial values for the slider, alignment properties, dimensions, padding and margins, among other properties. Similarly, the value of the various attributes 832 correspond to the selected instance of the slider. It will be appreciated that any of the panes in the tool 800, such as canvas 810, object palette 820 and attributes panel 830, may be scrollable to reveal additional content which does not fit within the pane due to the resolution of the computer 120 and the amount of content with the respective pane.

As noted above, the particular attributes 832 are context sensitive and depend on the type of the object which is selected. A TextField, for example, may include attributes 832 for font, font size, italicization, bolding, and other visual highlighting.

Other possible attributes 832, such as visual attributes, may include whether the object is visible, opacity, scale, rotation from a default position, and the like. Other possible include attributes 832 may include audio properties. Some objects can have animation properties which, for example, can define transitions which can describe when and how an object moves, appears and disappears, rotates, or changes in size.

Some attributes 832 of an object not be locked and unavailable for modification by the user. The locked attributes have the associated values "greyed out" or otherwise displayed in a manner to indicate that the attributes are currently locked and cannot be changed.

It will be appreciated that the drag-and-drop object palette 820 and attributes panel 830 may include too many elements to display on the screen at the same time. In such instances, a scrollable panel or page is provided by the Web browser 282.

The tool 800 also includes a control panel 860 which includes control tabs for navigating between different pages of the tool 800. The control tabs include Meta tab 862 for displaying a Metadata user interface screen for setting and editing application information, device, orientation, splash screens, etc., a Pages tab 864 for displaying and editing application screens/pages, a Controls tab 866 for displaying, creating and editing custom UI controls which can be reused, and a Spec tab 868 for displaying a Specification user interface screen to review and document each of the Pages and Controls in the application.

While not typically part of the control panel 860, the editor user interface screen also includes a tab 871 for creating a new page and one or more tabs 873 (only one of which is shown in FIG. 8) for selecting a different existing page. While not shown in the described embodiment, the control panel 860 could also include navigation buttons for navigating between pages of the application. The control panel 860 also includes a Save button 870, a Publish button 872 for publishing an application to a test device (e.g., to evaluate the software behaviour), a Connection Indicator 874 which indicates whether there is an active connection to a test device to which the application has been published. The Connection Indicator 874 is green when active connection exists and is red when active connection does not exist. The control panel 860 may also include a Save Indicator (not shown) which indicates whether all current changes in the current session have been saved. The Save Indicator is displayed has a first appearance when the current state of the application has been saved and is displayed in a second appearance different from the first appearance when current state of the application has not been saved.

Incremental changes made by each user having authorization to edit the application between saves are automatically stored even if the current state of the application has not been explicitly saved. The incremental changes are stored in the form of the change information associated with these changes. The change information for each incremental change, described more fully bellow, includes the type of change, the changed node (i.e., the changed user interface object or control), a timestamp which specifies the date and time of the change, the user who made the change, and information or instructions to apply and reverse the change. Saving the application, for example using the Save button 870, saves the application state at a specific state of development. Applying the incremental changes since a previous save point, if any, results in the current state of the application. The tool 800 can at any time, in response to instructions of a user, apply the instructions for reversing a change or a series of changes to restore the application state from the current state to a previous state, which may be an explicit save point or an intermediate point which represents one or more incremental changes from an explicit save point.

The tool 800 may automatically save the status of the application in response to designated types of changes. The designated types of changes for automatically saving the application may include one or more of publishing the application to a mobile device 130 (e.g., for testing) connected to a client device or the ADS 110, exporting the application in QML for input on another client device, or occurrence of a particular type of change (such as creating a new page or custom control, etc.). The designated types of changes may also include a change in the metadata of the application (such as the version number), start/stop of a user collaborating on an application and/or possibly others.

The application code representing the state of the application at explicit save points and incremental changes between save points are stored separately by the tool 800, for example, in separate database tables in memory (electronic storage) managed by the ADS 110. The database tables may be in common memory managed by the ADS 110. The memory is also used to store media assets, such as digital still images and possibly digital video used by the applications and information about the applications developed using the tool 800. The memory may be distributed among two or more physical storage devices, which may or may not be geographically distributed, depending on the embodiment. The memory could be located, for example, in internal memory 114 of the ADS 110.

The information about the applications which is stored includes save information about the various save points, such as a timestamp which specifies a date and time of the save, and the user who made the save. As noted above, the change information includes the type of change, the changed node (i.e., the changed user interface object or control), the timestamp, the user who made the change, and information or instructions to apply and reverse the change. The information required to reverse the change depends upon the type of change, examples of which are described more fully below. The change information may include some or all of the application code associated with the change, depending on the type of change and/or the specific data which is being changed.

The incremental changes which are stored also include changes to the metadata describing the application which is displayed in the Metadata user interface screen. The changes to the metadata which are stored may include, for example, version changes, author changes, dates and times at which users start or stop collaborating on the application, changes to application properties, changes to device properties, etc.

Examples of the types of changes which can be made include, but are not limited to, object creation, object deletion, object modification, page creation, page deletion, page modification, and application modification. The change information associated with various types of changes in accordance with one embodiment of the present disclosure is provided below:

(1) Node Added: the change information includes the name of the QML document that the node was added to, the unique identifier of the new node (unique within the QML document), the type of the new node (e.g. Button, Label, TextArea, etc.), the unique identifier of the new node's parent (i.e., the node that the new node was added to), and the index of the new node within the parent's list of child nodes;

(2) Node Deleted: the change information includes the name of the QML document that the node was deleted from, the unique identifier of the deleted node, the unique identifier of the deleted node's parent (before it was deleted—so it can be reinserted by a rewind/undo operation), the index of the deleted node within the parent's list of child nodes (before it was deleted—so it can be reinserted by a rewind/undo operation), and the QML code for the deleted node (in its state immediately before deletion—so it CdO be reconstructed by a rewind/undo operation);

(3) Node Moved: the change information includes the name of the QML document that contains the node, the unique identifier of the moved node, the unique identifier of the new parent of the node, the index of the node within the new parent, the unique identifier of the old parent of the node (so it can be moved back by a rewind/undo operation), and the index of the node within the old parent's list of children (before it was moved—so it CaO be moved back by a rewind/undo operation);

(4) Node Changed: the change information includes the name of the QML document that contains the node, the unique identifier of the node, the name of the QML attribute that was changed (e.g. text, opacity, etc.), the new value of the QML attribute (which could be a string, a number, a function definition, etc.), and the old value of the QML attribute (so it can be changed back by a rewind/undo the operation);

(5) QML Document Created: the change information includes the name for the QML document (unique within the application) and the type of the new document (e.g. Page, Container (for custom controls), etc.);

(6) QML Document Deleted: the change information includes the name of the QML document and the QML code for the deleted document (in its state immediately before deletion—so it can be reconstructed by a rewind/undo operation);

(7) Active QML Document Switched: the change information includes the name of the QML document that is now in the foreground within the tool 800, the name of the QML document that was previously in the foreground within the tool 800 and the unique identifier of the user who changed documents (so that a connected mobile device can change the foreground document but other users working on the application can ignore this change);

(8) QML Documents Refreshed: the change information includes a list of QML documents (used when a custom control is modified and then the tool has to notify the other clients to update any pages that contain an instance of the custom control);

(9) File Uploaded: the change information includes the name of the file, the directory of the file (possibly determined based on the file type), and the type of the file (e.g. image, XML document, etc.);

(10) File Replaced: the change information includes the name of the file, the directory of the file (possibly determined based on the file type), and the type of the file (e.g. image, XML document, etc.), and information about the old file such as a copy of the old file (in its state immediately before being replaced—so it can be replaced by a rewind/undo operation); and

(11) File Deleted: the change information includes the name of the file, the directory of the file and information about the deleted file such as a copy of the old file (in its state immediately before being replaced—so it can be reconstructed by a rewind/undo operation).

The storage of save points and incremental changes along with the change information allows a fine grained rewind/undo capability in which each change to the application can be reversed or undone. Any previous application state can be rebuilt from a previous save point and applying all of the subsequent incremental changes. Furthermore, the sending of incremental changes rather than the full application code provides a lightweight "always-save" functionality similar to "autosave" in which the ADS 110 saves all of the incremental changes made to the application.

When an object is added to the canvas 810 from the object palette 820, e.g. using a conventional drag-and-drop operation, the application state is automatically updated to add the object at the current page of the application and at the onscreen location. As noted above, in the described embodiment, when operated on a computer 120 the tool 800 stores the application state in its own internal format, such as JavaScript, the details of which need not be described for the understanding of the present disclosure. The application code for execution on a target device in QML, or possibly C++ or a combination of QML and C++, is generated and output when required, such as when the application is published, exported or saved. However, in other embodiments, the tool 800 could generate and output application code in any suitable programming language or format, such as Java™, JavaScript, HTML, XML (Extensible Markup Language), CSS, Flash or a suitable combination thereof.

The attributes of a new object may be undefined or set to a default value, depending on the type of object and the attributes 832. The attributes of the selected (e.g., active) object can be edited by changing or manipulating a corresponding field in the attributes panel 830. When the value of an attribute of an object in the page is changed (e.g., size, position, etc.), the change is immediately reflected in any affected object in the canvas 810 as appropriate and the application state is automatically updated to reflect the changed attributes. For example, if the font of a TextField is increased by changing the font size property value in the attributes panel 830, the text in the text box appearing in the canvas 810 is displayed in a larger font size as soon as the value is changed in the panel 830. The changes are typically stored in association with name or other unique identifier (ID) of the user which made the change (user name or ID), and the timestamp of the change. Conversely, if an object is manipulated in the canvas 810 (e.g., resizing or repositioning of the object within the page), any affected attributes (e.g., size, position, etc.) are automatically updated in the attributes panel 830 and the application state is automatically updated to reflect the changed attributes.

The state of the application is updated on client devices in real-time or near real-time. To obtain a real-time or near real-time changes in the state of application, the client requests the current state of the application from the ADS 110. The client receives the application code in accordance with a previous save point from the ADS 110 along with any incremental changes, renders the user interface in accordance with the received application code, and applies any incremental changes that occurred since the previous save point in the order in which the changes occurred to construct the current state of the application. The client then requests further incremental changes to the application and applies further incremental changes when received from the ADS 110. The client and server interact in the same way to provide a real-time or near real-time copy of the application regardless of whether the client is viewing a single application (e.g., in the editor user interface) or a number of applications (e.g. showcase user interface).

An example implementation of a method for detecting and reporting changes to applications which a user has access to using the tool 800 will now be described. Each application which a user has access to is identified using, for example, an application identifier (ID). Comet may be used when the persistent connection between the clients and ADS 110 is a HTTP or HTTPS connection so that the ADS 110 can "push" data to a Web browser of a computer 120 or (Web) application on a mobile device 130 without an explicitly request for the data. Comet, also known as two-way-web, HTTP Streaming and HTTP server push among other names, may use one of multiple techniques which rely on features included by default in most Web browsers such as JavaScript and which is a common or easily incorporated feature of an application on a mobile device 130.

Specific methods of implementing Comet fall into two major categories: streaming and long polling. Each client may have an open GET request which requests recent changes from the ADS 110. Using an open GET request each client connected to the ADS 110 sends a GET request to the ADS 110 and expects it to remain open until there is a change to the application. When a change in the application is detected by the ADS 110, the ADS 110 responds to the GET request with the details of the change, the client applies the change to rendered user interface, and then the client sends a new GET request to the ADS 110. This process is repeated by each client while connected to the ADS 110. The use of an open GET request or other Comet technique provides a lightweight and straightforward implementation for detecting changes to the application state stored by the ADS 110 and reporting the changes to clients. Alternatively, a web socket or other similar technology could be used or the client could poll the ADS 110 for recent changes periodically. Alternatively, a POST request with no message body data or possibly other HTTP request could be used to obtain the same result as a GET request provided the ADS 110 is configured to interpret the POST request or other HTTP request in that manner.

Referring now to FIGS. 9A to 9D, a Metadata user interface screen of the tool 800 in accordance with example embodiment of the present disclosure will now be described. The Metadata user interface screen provides a visual user interface for setting application properties and is displayed in response to selecting the Meta tab 862 described above. The Metadata user interface screen, based on the content and display configuration in the illustrated embodiment, is too large to be displayed within one screen of the Web browser 282 so a scrollable page is provided by the Web browser 282. In particular, three screens are required to display all of the Metadata user interface screen, although in other embodiments more or less screens may be required or the entire Metadata user interface screen could be displayed in a single screen.

The Metadata user interface screen displays information, settings and other properties relating to the application, many if not all of which can be set or changed by a user. The Metadata user interface screen includes a configuration section 910 in which application information such as the application name, author, version number and description can be set. The configuration section 910 also includes settings for preferred orientation, rotation options specifying whether the screen is permitted to rotate in accordance with device orientation, an entry point in the form of a page of the application at which the application is launched, a store display option for setting one or more images to be displayed in an application store (either the entry point or a one or more splash screens in the shown embodiment), as well as an export option for exporting the application code.

The Metadata user interface screen includes a device section 920 (FIG. 9B) which allows a device configuration to be selected from one or more supported mobile devices 130. The device section 920 which can include device names, device information and/or graphical representations of the mobile devices 130. In the illustrated embodiment, the following device configurations are possible: a tablet having a touchscreen, a smartphone having a touchscreen, and smartphone having a touchscreen and a keyboard, each having different screen sizes/shapes (e.g., aspect ratio) and possibly display resolutions.

When a device configuration is selected from the device section 920, device information regarding the selected device is propagated throughout the application. The page and its controls are re-rendered at a new screen orientation (canvas size) which corresponds to the newly selected device configuration. In the described embodiment, the generated application code does not contain any information about the target device although this may differ between embodiments. If the application code did contain information about the target device, the application code could be automatically updated to reflect the device configuration as required. Propagated device information may include, for example, display size, pixel density, display resolution, preferred orientation and the rotate option.

When a new application is created, the default page size (aspect ratio) and orientation will correspond to the screen size, screen resolution, and preferred orientation of the selected device configuration. If the device configuration is changed, the screen size, the default page size and preferred orientation of the new device configuration is propagated to all the pages of the application. The attributes of existing objects affected by these device properties in the application code are automatically updated, for example, by changing size, layout and rotation values, such that the object is properly sized, positioned and oriented for the new device configuration.

Other device configuration information which may be selectable in the device section 920 and which may be propagated through the application includes also information regarding other input or output devices, such as if the device has a physical keyboard, an orientation sensor, a proximity sensor, a motion sensor, a camera, a GPS, audio devices, lights, buzzers, wired or wireless communication capabilities and the like. Device information can also include processor type, memory size, operating system information, vendor, compatible programming language, available software modules and the like. It will be appreciated that the supported mobile devices 130 may vary based on the application framework implemented by the tool 800.

It is contemplated that some object attributes may be device specific and may not change when the device configuration changes. This may allow nuances of a particular device to be maintained even when developing an application for use on different mobile device configurations. It is also contemplated that some object attributes may be locked for an application so as to be common across all device configurations.

The Metadata user interface screen includes a theme section 930 (FIG. 9B) for selecting a theme. By selecting a theme, attributes associated with that theme such as color schemes, fonts, layouts, and the like, can be propagated to appropriate object attributes throughout the application. In the shown example, a light theme and a dark theme are shown. However, other themes may be shown in other embodiments.

The Metadata user interface screen includes a splash screens and icon section 940 (FIG. 9C) for setting one or more splash screens to be displayed during the boot-up or launch of the application and an application icon to be displayed in an icon menu of home screen or other screen of a device upon which the application is installed. The splash screens and application icon are represented by dark grey boxes. "Hint" text explaining the respective function of the boxes may display in response a hover on an onscreen position indicator (e.g., pointer). The hints may be displayed towards the vertical middle of the screen. A developer or designer can drag and drop images onto the disabled boxes, or otherwise select images to set the application icon, horizontal splash screen for a horizontal screen orientation, and vertical splash screen for a vertical screen orientation. The source images may be stored locally, for example on a local hard disc drive, or remotely.

The application icon box expects a square image (and has a square drop target). The application icon is typically displayed on the home screen application icon menu as well as an application storefront (which is outside the scope of the present disclosure). The icon source image is PNG and the Splash Screens are PNG or JPG/JPEG in the described embodiment, but could vary in a different embodiment.

The Metadata user interface screen includes a visibility section 950 (FIG. 9D) for viewing and setting whether the application is private or public. Private applications are only accessible by authorized users (i.e., collaborators described below), whereas public applications are accessible to all users of the application development server 110. This allows, for example, applications under development to be viewed by all users of a particular enterprise.

The Metadata user interface screen includes a collaborator section 960 (FIG. 9D) for viewing and setting users who have authorization to view and edit the application, known as a collaborators. The Metadata user interface screen includes a delete section 970 (FIG. 9D) for deleting an application from the application development server 110.

Figure 10:
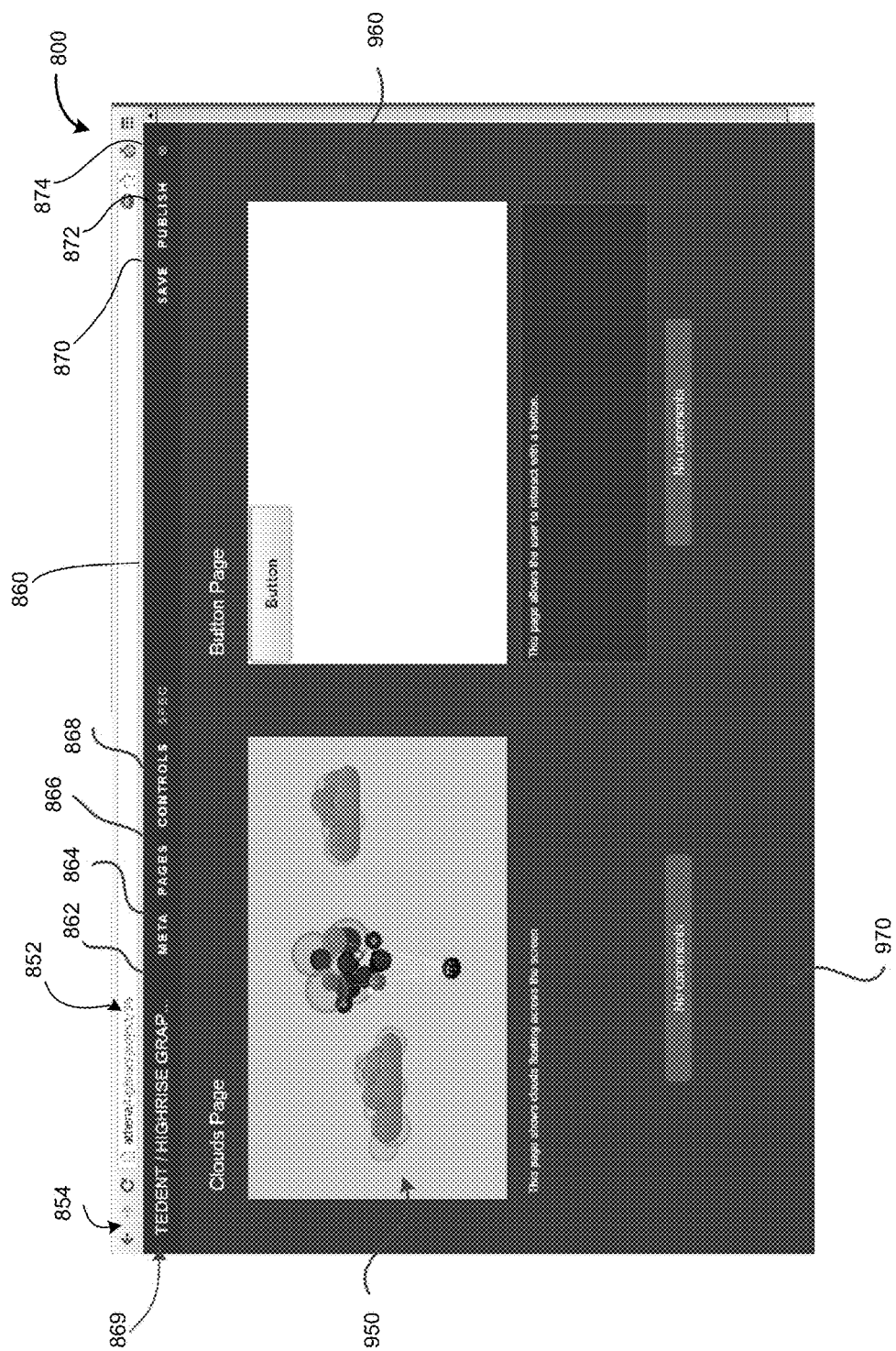
FIG. 10 is a Specification user interface screen of the application development tool in accordance with an example embodiment of the present disclosure.

Referring now to FIG. 10, a Specification user interface screen of the tool 800 in accordance with an example embodiment of the present disclosure will now be described. The Specification interface screen is displayed in response to selecting the Spec tab 868 described above. The Specification user interface screen shows a grid of all the pages (screens), panes, and controls in the application. Pages, panes and controls are all the individual document files which become QML files when exported. The Specification user interface screen renders each of the documents in a single page along with a few editable fields which a developer or designer can use to document the files. This gives developers and designers a way to provide some metadata about each file, such as its purpose. For example, "Title: Application Login Page. Description: This page is shown when the application is launched and the user has not previously logged in." The Specification user interface screen is meant to be a digital form of a "Specification document" that would typically be created in a non-development environment which can be printed and shared or discussed. In a different embodiment, the Specification interface may also include a user interface area for comments or discussion around the application, and/or user interface areas for comments or discussion around each of the application pages.

Figure 11A:
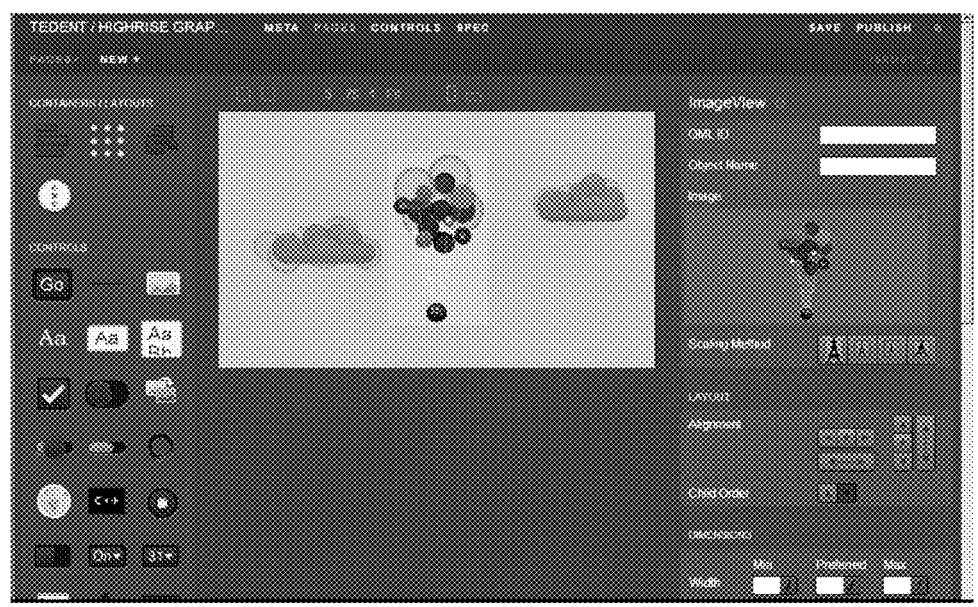
FIGS. 11A and 11B show an Image user interface screen of the application development tool in accordance with an example embodiment of the present disclosure.
Figure 11B:
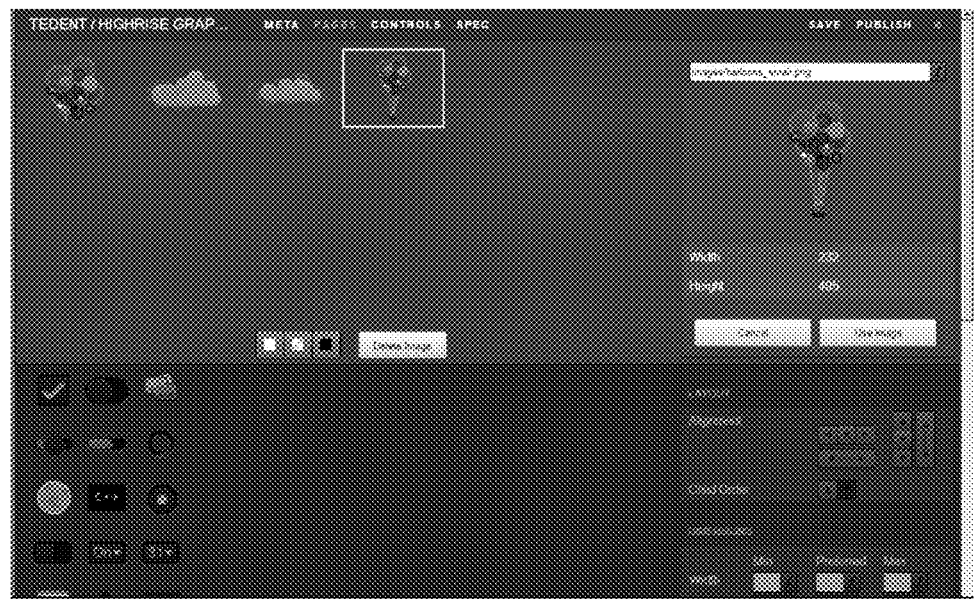

Referring now to FIGS. 11A and 11B, an Image user interface screen of the tool 800 in accordance with example embodiment of the present disclosure will now be described. The Image user interface screen provides a list of all the image assets that have been imported into the application. When an image control in an application displayed in the editor user interface screen is selected (see FIG. 11A), such as an Image View, an option to invoke the Image user interface screen, sometimes referred as the Image Picker, is provided. The option may be provided, for example, by clicking on an area in the attributes panel 830, or in a context-sensitive menu which itself may be invoked by a right-click of a mouse or other pointing device on the computer 120 or other input. Alternatively, the Image user interface screen may be displayed in response to selecting an Image tab (not shown) in the control panel 860 which is available when images are included in the application. As shown in FIG. 11B, the Image user interface screen provides a visual interface to select, delete, review and change the properties (e.g., background color) of image assets in the application.

Figure 12A:
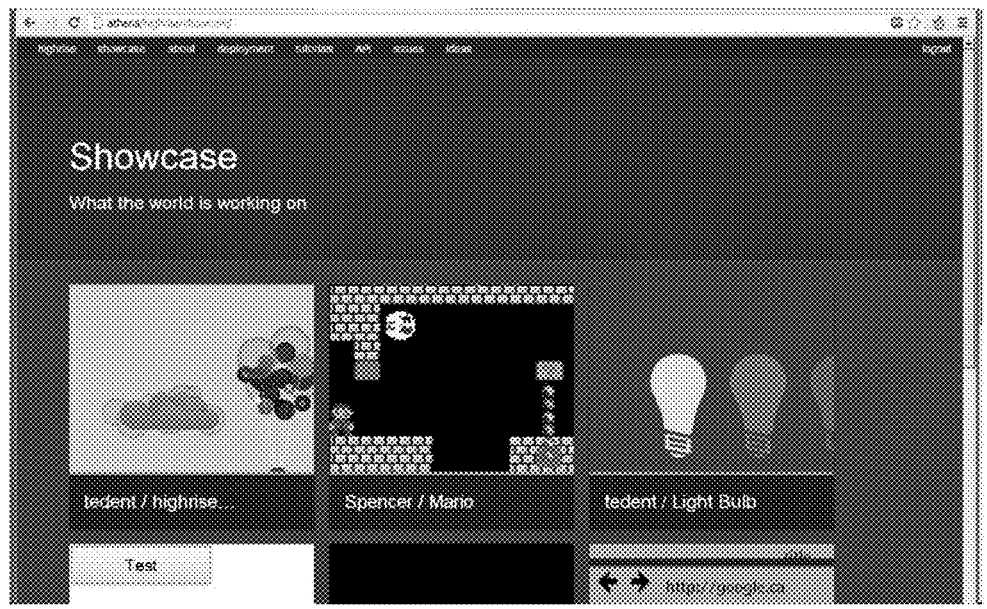
FIGS. 12A and 12B show a Showcase user interface screen of the application development tool in accordance with an example embodiment of the present disclosure.
Figure 12B:
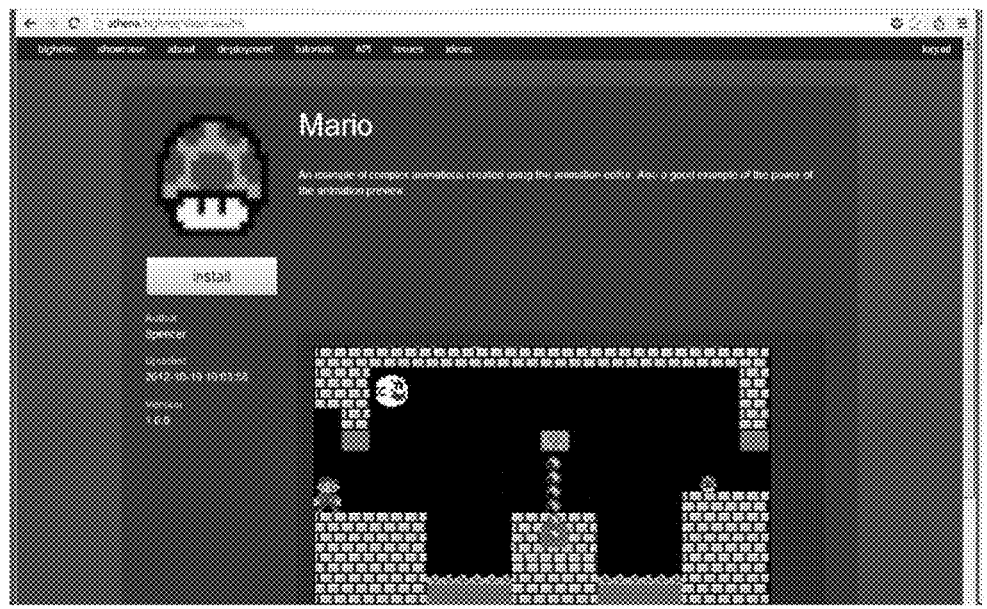

Referring now to FIGS. 12A and 12B, a Showcase user interface screen for viewing community applications in accordance with example embodiment of the present disclosure will now be described. All applications managed by the tool 800 are developed and stored on the application development server 110; however, not all applications are publicly visible. A developer or designer must choose to share their application with the community in order for other users to view the application in a community "Showcase" user interface screen, an example of which is shown in FIG. 12A. The community Showcase user interface screen displays application information for one or more applications to which a user has access. An application name and one or more pages from one or more shared applications is rendered and shown in the community Showcase user interface screen. A user has access to applications created by the user, applications explicitly shared with the user, and public applications that all users CaO access. If an application is marked "public" in the visibility section 950 (FIG. 9D) of the Metadata user interface screen, the application is available in the Showcase user interface screen. The Showcase user interface screen can be used to display a number of applications at one time, display the changes being made to the applications as the changes happen in the same fashion as changes to a particular application the user is working on is shown, and CaO be used to display who is working on which applications in real-time or near real-time. This allows collaborators to preview some of the most recent changes to applications to which a user has access.

In the shown embodiment, a single page and the application name for each accessible application is displayed in a grid or array. The page displayed may be a last edited page or a designated page in the application, among other possibilities. In other embodiments, the application information can be displayed other formats including but not limited to a list format or a slide reel format. The application information displayed in the Showcase user interface screen may also include, for example, an application version number, description, author, edit dates/times, or any other application related information.

One, some or all of the pages of the application can be rendered in the Showcase user interface depending on the application (e.g., parameters in association with the tool, number of pages, etc.) or the tool 800 (e.g., settings). The rendered applications in the Showcase user interface screen can be sorted according to most recently created, or most recently edited or other criteria. The ADS 110 detects changes made to all of the applications which a user has access to. In the described example, changes are associated with a particular application using the application ID. When a change is made to one of the applications which a user has access to, the ADS 110 reports the change information in the client so that it can be applied to the corresponding page of the corresponding application shown in the Showcase user interface screen.

In the described embodiment, each client sends an open GET request to the ADS 110 for each application which the corresponding user has access to. As noted above, the application ID is used to identify the respective applications. When the ADS 110 detects a change to an application for which there is an open GET request, the ADS 110 responds to the GET request by sending to the client the change information corresponding to the change. The client then applies the change to rendered user interface. When the client is a computer, the change information may be transcoded from QML as described above if the received change information included QML code. Finally, the client sends a new GET request to the ADS 110 in respect of the changed application so that it receives further changes to the application. This process is repeated by each client while connected to the ADS 110.

The Showcase user interface screen may identify recently modified applications, such as the most recently modified application. For example, the application which has been most recently updated may be displayed at the top of the Showcase user interface screen. The page of the application may move or "bubble" of the top of the displayed pages of the applications in the Showcase user interface screen to bring the application in view, for example, if it was below the current page scroll. Alternatively, rather than changing the position of the application, the application may be bolded, flash, displayed in a different color, or otherwise displayed in a manner that distinguishes the most recently updated application.

An identification of the user who is working in the application may also be displayed in the Showcase user interface screen in association with the page, for example, below the live-rendered page. Because the ADS 110 knows the last incremental change for each user and how long ago the change happened, the client 110 can accurately identify and display user avatars (or images) in association with the applications which users are working on.

In the shown embodiment, the number of shared applications is too large to display all of the live-rendered pages within one screen of the Web browser 282 (FIG. 2) so a scrollable page is provided by the Web browser 282 (FIG. 2). In the shown embodiment, the live-rendered pages are presented in a tiled or grid configuration. A different arrangement may be used in other embodiments. The live-rendered pages of the shared "community" applications may be a last edited page (e.g., changed or added page) or a designated page. In either case, the pages are live-renders based on the current state of the application.

As shown in FIG. 12B, a public application is accessible via a dedicated URL (uniform resource locator) and has a dedicated application page which may be displayed by selecting the application from the Showcase user interface screen, for example, by appropriately selecting the live-rendering of the application from the Showcase user interface screen or via the dedicated URL. The application page displays renderings of the application and shows some or all of the data from Specification user interface screen.

Use of Expressions to Define a Property of a Visual Object and Real-Time Evaluation of Object Properties The Cascades™ application framework supports the assignment of expressions, including complex expressions, to define one or more properties of a visual object (i.e., UI element) on a page of the application. The expression may define the property of the visual object at least partially in terms of one or more properties of one or more other objects in the displayed page. The other objects in the displayed page which are reference in the expression may be composite UI controls, which are described more fully below. It is also contemplated that the expression could define the property of the visual object at least partially in terms of one or more properties of one or more other objects in another page of the application rather than the displayed page. For example, rather than assigning the object property "xPosition" as a fixed value such as 20, a developer could assign the object property as "10+10", "yPosition" or even "otherObject.xPosition+10". When the resulting code is executed, any complex expressions are evaluated. In the above example, object is displayed at the location which results from the evaluation of the expression. However, if the developer is using a WYSIWYG (What You See Is What You Get) editor during the coding phase, the developer needs to see where the element will eventually appear. As the developer is in the process of making changes to the properties of an object (i.e., UI element, that object and others that whose property values depend on it need to be updated to reflect the new property values.

The editor user interface of the tool 800 supports the setting and evaluation of complex expressions to define a property of an object in accordance with the Cascades™ application framework. FIGS. 13A to 13D illustrate example screens of the editor user interface of the tool 800. Within the tool 800, every object has a set of properties which are displayed in the attributes (or properties) panel 830 at the right side of the editor user interface. As noted above, the attributes panel 830 includes a number of attributes (or properties) 832 which are context sensitive and depend on the type of the object which is selected. One or more of the properties in the attributes panel 830 may be assigned an expression as a value. Each property 832 in the attributes panel 830 that may be assigned an expression has a user interface element consisting of an input field and a function button for invoking a text box or other input field for inputting an expression for the value of the property. In the shown examples of FIGS. 13A and 13D, the function button includes a function symbol but could have a different appearance in other embodiments. Each property 832 in the attributes panel 830 which may not be assigned an expression has a user interface element comprising an input field but no function button.

Figure 13A:
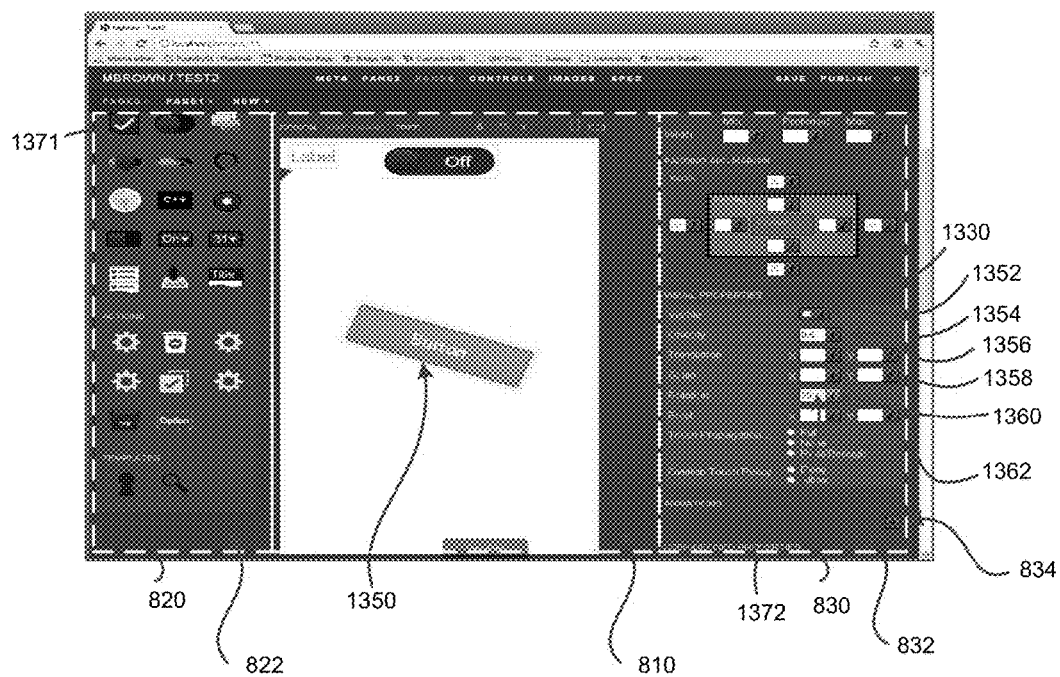
FIGS. 13A to 13D are example editor user interface screens of the application development tool illustrating a setting a property associated with a visual object as an expression.

In the example editor user interface screen shown in FIG. 13A, the attributes panel 830 includes a visual properties section 1330 which includes a "Visible" option 1352, an opacity property 1354, a translation property 1356, a scale property 1358, a rotation property 1360 and a pivot property 1362. The values of the properties in visual properties section 1330 reflect the stored properties of a selected object such as button 1350. In the example editor user interface screen shown in FIG. 13A, the button 1350 has a rotation property associated set to 20 degrees as shown in field 1372.

When a developer sets a fixed value in the input field of a property 832, the properties of the object (i.e., UI element) are immediately updated to reflect the value. In the example shown in FIG. 13A, a value of "0.5" has been set for the opacity of the button 1350 displayed in the canvas 810 and the button 1350 automatically and immediately becomes partially transparent (i.e., semi-transparent).

If an expression is set for the opacity in the input field of the property, the function button of the property 832 in the attributes panel 830 changes colour from a default colour to a second colour to reflect that the value of the property 832 is set as an expression. The expression is automatically and immediately evaluated, and the resultant value is shown in the input field of the property 832 in the attributes panel 830 in a fashion which indicates it is inapplicable or unavailable ("greyed out" in the shown example). The displayed properties of the element are also automatically and immediately updated to reflect the new value. In the shown example of FIG. 13A, a more complicated expression that evaluates to 20 has been set and the button 1350 displayed in the canvas 810 is rotated by 20 degrees.

Figure 13B:

If a user, such as a developer, clicks the button of the property 832 in the attributes panel 830, an expression editor window is displayed, an example of which is shown in FIG. 13B. The expression editor window includes a text field in which the developer may input an expression and a list of object identifiers that are available to be used in the expression. Once the developer inputs an expression and clicks "OK" or otherwise accepts the input in the text field, the expression is assigned to the corresponding property and it is immediately evaluated as above.

Figure 13C:

If the developer inputs an expression which contains an error, the code editor of the tool 800 highlights the error immediately as shown in the example screen of FIG. 13C. The developer may hover an onscreen position indicator such as arrow, carrot or cursor over the highlighted region (error) for more information about the error.

It will be appreciated that expressions in the properties of one object may refer to property values from another object. In the example shown in FIG. 13D, the developer has applied a rotation to the label element which has caused the button 1350 to rotate farther since its rotation depends on the rotation of the label.

Advantageously, the immediate evaluation and application of the property expressions allows developer to get real-time or near real-time feedback about the changes being made to the visual aspects of the application.

It is contemplated that interaction with objects within the canvas 810 of the editor user interface could evaluate code which is run in response to the interaction, for example the result when the button 1350 is clicked, to allow the developer an even more complete preview of how the application will behave when it is operating on a mobile device.

Figure 14:
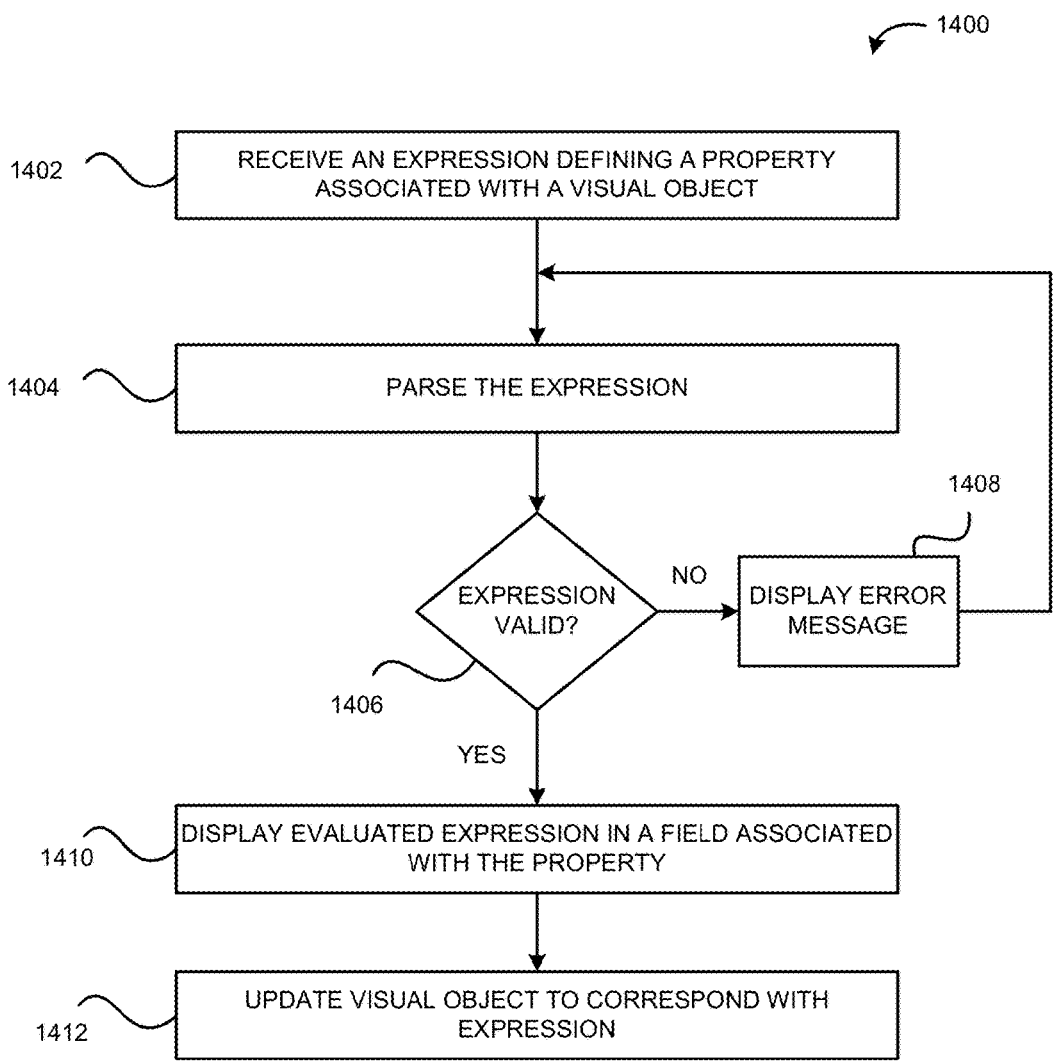
FIG. 14 is a flowchart illustrating an example method for setting a property associated with a visual object as an expression in accordance with example embodiment of the present disclosure.

Referring now to FIG. 14, a method 1400 for setting a property associated with a visual object as an expression in accordance with example embodiment of the present disclosure will now be described. The method 1400 may be carried out by software executed, for example, by a processor. Coding of software for carrying out such a method 1400 is within the scope of a person of ordinary skill in the art provided the present disclosure. The method 1400 may contain additional or fewer processes than shown and/or described, and may be performed in a different order. Computer-readable code executable by a processor to perform the method 1400 may be stored in a computer-readable medium such as the memory of a server such as a memory of a host device.

At event 1402, an expression is received as input defining a property associated with a visual object. The expression may be received in a text box or other input field invoked by clicking or otherwise selecting the function button of the corresponding property. In the example editor user interface screen shown in FIG. 13B, the expression is received in a text box 1375 invoked by selecting the function button of the rotation property 1360. In the example editor user interface screen of FIG. 13B, the expression defines the rotation property associated with the button 1350 to be the value of the rotation property of the label 1371 plus an additional 20 degrees. The expression is received as "label.rotationZ+20" as shown by 1374. Many other expressions could be received as alternative input. In one alternative example, the expression defining the position parameter (not shown) could be defined as "xPosition:20" specifying that the position of the visual object along the horizontal x-axis is 20 pixels from the left most pixel of the screen. In another alternative example, the expression defining the position parameter could be defined as "xPosition: yPosition" specifying that the position of the visual component along the x-axis is equal to the position of the visual component along the y-axis. In a further alternative example, the expression defining the position parameter could be defined as "xPosition: otherObject.xPosition+10" specifying that the position of the visual component along the x-axis is equal to 10 pixels from the left most pixel of the object named "otherObject".

At event 1404, the received expression is parsed to determine if the expression is a valid expression at event 1406. At event 1408, an error will be displayed when the received expression is invalid as shown in the example editor user interface screen of FIG. 13C. In the example editor user interface screen of FIG. 13C, the received expression 1380 is "label.rotationZ+20" and has been determined to be invalid. When the received expression is determined to be invalid, a hint 1382 regarding the expected expression may be provided. Clicking or otherwise selecting the hint 1382 causes the expected expression, such as the expression "label.rotationZ+20" received in the example editor user interface screen of FIG. 13B, to be displayed.

Figure 13D:
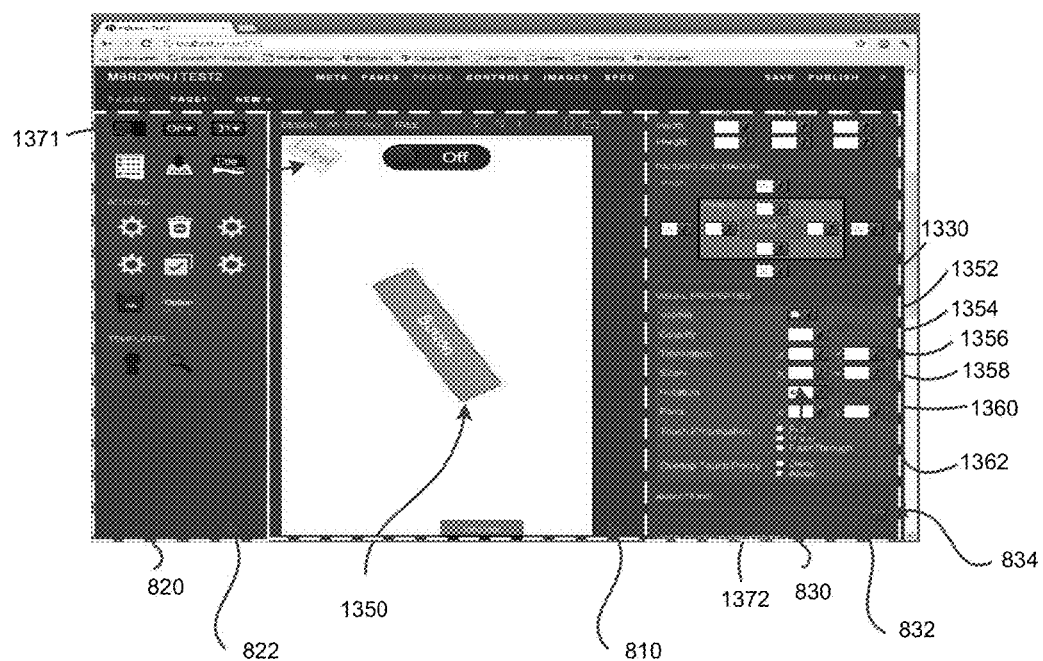

At event 1410, the expression is evaluated and the result of the evaluated expression is displayed in a field associated with the property defined in the expression if the expression is determined to be valid as shown in the example editor user interface screen of FIG. 13D. In the example editor user interface screen of FIG. 13D, the expression has been evaluated to equal a rotation of 40 degrees as shown in field 1372.

At event 1412, the visual object corresponding to the evaluated expression is displayed as shown in the example editor user interface screen of FIG. 13D. In the example editor user interface screen of FIG. 13D, the button 1350 has been rotated by 40 degrees. Anytime that a property of another object changes, the expression is re-evaluated and the user interface is updated accordingly. This process may be performed anytime any property of any object is changed, or selectively only when a property that the expression depends on is changed.

Animation Creation and Editing

When designing complex animations, it can be difficult to understand how the animation will be displayed and how multiple components will interact with each other. It can be particularly difficult to understand when each animation component will interact with the object with traditional text-based animation editing tools. This also makes it difficult to understand when each animation will play and which animations will overlap as well as the total duration of the complex animation. This CaO be particularly difficult when trying to interpret code for animations that other users have written. It becomes even more difficult to understand which animation components will run in parallel, which animation components will run in sequence, and for how long each animation component will run. Typically, this requires detailed calculations and documentation to manage the animation. It is also difficult to compose animations easily, and is particularly difficult to compose animations in a way that is easy to follow and makes sense visually.

Figure 15A:
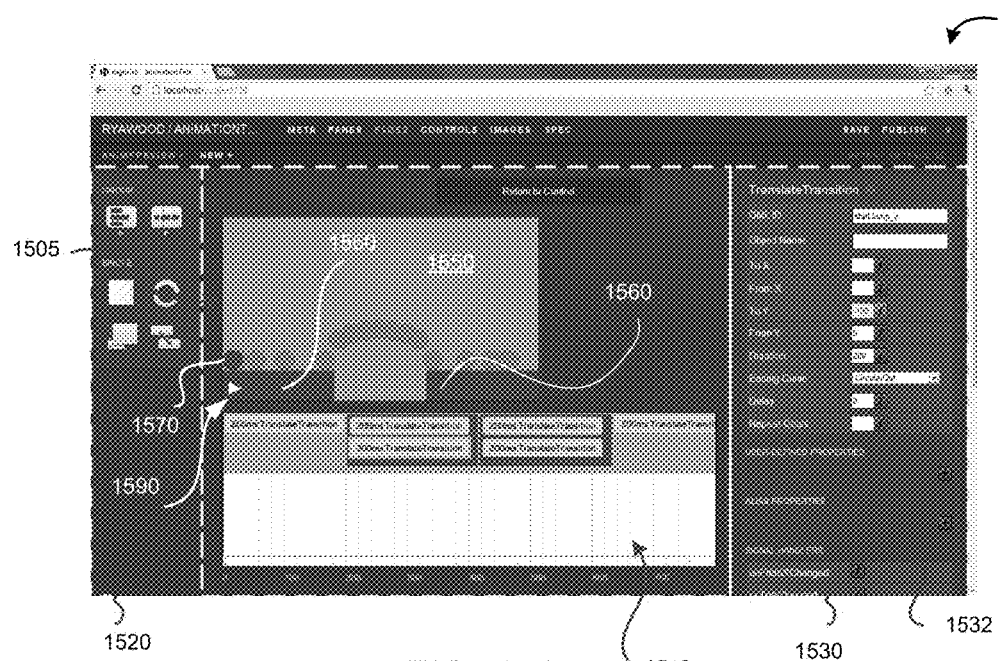
FIGS. 15A and 15B are editor user interface screens of the application development tool for creating, editing and viewing an animation in accordance with example embodiments of the present disclosure.
Figure 15B:
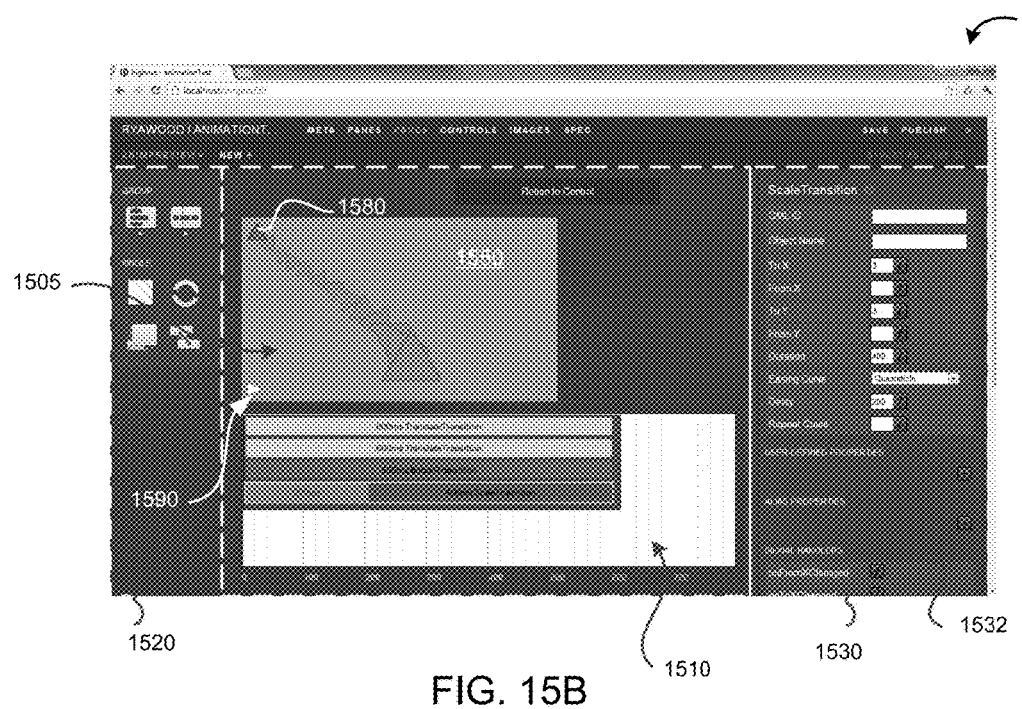

The editor user interface of the present disclosure seeks to address, at least in part, one or more of the aforementioned problems with traditional animation development. The tool 800 may be used to create, edit and play animations to provide a visual animation editor user interface as well as the page editor user interface described above. The animations may be part of an application under development or stand-alone animations. Referring now to FIGS. 15A and 15B, an example embodiment of the editor user interface 1500 in an animation mode will now be described. The editor user interface 1500 behaves similarly when editing animation as when editing pages as described above.

Each animation comprises one or more animation components. One or more animation components can be applied to an object in a canvas 1505 which is analogous to the canvas 810 described above in connection with page mode of the editor user interface. The type of animation components which can be applied to an object typically depends on the type object. Generally, the animation component may be any QML animation component which is supported for the particular object type. The types of animation components include but are not limited to fade, rotate, translate and scale. Each animation component is defined by a number of properties which vary based on the type of animation but typically all include timing parameters. The timing parameters comprise a duration of the animation component and a delay of the animation component (zero if no delay). The delay defines a time from a start of the animation which the animation component is set to occur. For example, a picture in the canvas 1505 can have a translation effect applied to the object so that it will move across the screen from position x1, y1 to position x2, y2, at set time t (for example, t seconds after the start of the animation).

An animation mode of the editor user interface 1500 can be invoked from the attributes panel 830. As shown in the FIGS. 13A and 13D, an Animations section appears in the context-sensitive attributes panel 830 when a selected object can be animated. In FIGS. 13A and 13D, the Animations section is identified using the reference 834. In the shown example, an "add" icon is provided for adding an animation. In the shown example, the add icon is button with a "+" sign inside of it. Clicking the add icon would cause a new (empty) animation for the selected user interface element (object) to be created and invoke the animation editor user interface. If the selected user interface element already has one or more animations associated with it, the existing animations would be listed under the Animations section near the Animations heading. Clicking on an existing animation would invoke the animation editor user interface for editing the existing animation.

When in the animation mode, the editor user interface 1500 includes an animation timeline 1510 which provides a visual representation of the one or more animation components in an animation, when the animation components occur, and how the animation components occur (e.g., whether in parallel or in sequence/series). In the shown embodiment, the animation timeline 1510 is displayed below the canvas 1505. The editor user interface 1500 also includes a drag and drop control panel 1520 is analogous to the drag and drop object palette 820 described above in connection with page mode of the editor user interface but with single and group animation components. The drag and drop control panel 1520 allows different animation components to dragged and dropped in to the animation timeline 1510. The canvas 1505 provides a live preview of the animation, as described more fully below, but cannot be manipulated directly.

The animation components can also be manipulated by dragging the animation components around in the animation timeline 1510, for example, to change when (i.e., the start time or delay) and how (i.e., in series or parallel) the animation components occur. The properties of the animation components are displayed in a properties panel 1530 at the right side of the editor user interface. When the properties of the animation components are edited in the animation timeline 1510, the properties of the animation components displayed in the properties panel 1530 are updated accordingly. The properties of the animation components can also be edited in the properties panel 1530. When the properties of the animation components are edited, the animation timeline 1510 is updated accordingly.

The properties panel 1530 is analogous to the attributes panel 830 described above in connection with page mode of the editor user interface. The properties panel 1530 includes a number of properties 1532 which are context-sensitive and depend on the type of the animation component which is selected. The visual representation of the animation components in the canvas 1505 is updated in real-time or near real-time based on changes in the animation components which comprise the animation. The changes may be adding one or more animation components (e.g., by drag and drop operations using the drag and drop control panel 1520, copying animation components from the animation timeline 1510), deleting one or more animation components from the animation timeline 1510, or changing the properties of one or more animation components from the animation timeline 1510 or properties panel 1530).

The editor user interface 1500 decomposes animations into one or more editable animation components for each object being animated and visually represents the one or more animation components within the animation timeline 1510. This allows even complex animations to be represented as basic visual animation components which hold programmatic significance. The animation timeline 1510 displays information about the animation components including timing parameters, such as duration and delay, of each animation component. The timing parameters may be displayed in a fixed pixel to time ratio. This allows the editor user interface 1500 to more easily convey to users which animation components run in parallel and which animations run in sequence/series. In shown examples, a 1:1 pixel to millisecond ratio is provided by the animation timeline 1510.

The drag and drop control panel 1520 of the editor user interface 1500 also allows users to more easily create animations using drag and drop containers (i.e., drag and drop animation components) which stack either vertical in the animation timeline 1510 (for animations which run in parallel) or horizontal in the animation timeline 1510 (for animations which run in sequence).

The editor user interface 1500 allows animation to be easily edited with each of the animation components being movable and scalable via interacting with the animation components within the animation timeline 1510. The animation components in the animation timeline 1510 automatically move and shift to accommodate newly dropped or moved animation objects. The properties panel 1530 of the editor user interface 1500 presents all of the editable properties of a selected animation component. Through the animations dropped on the animation timeline 1510 and all of the specified properties of the animation components in the properties panel 1530, the editor user interface 1500 generates code for the resultant animation. The animation may be used in applications, such as games, and can be deployed onto a connected mobile device 130, as described above, so that the animation can be played or previewed during the animation process. Playing or previewing the application on a connected mobile device 130 may assist in optimizing an animation for a target device to accommodate for variances between different target devices.

Previewing an Animation Applied to a UI Object

As noted above, when writing code to animate visual objects it is often difficult to visualize what the animation will look like when deployed to a target device. This typically results in a designer writing code to animate a visual object, saving and compiling the code, deploying the code to the target environment in which it is designed to operate (e.g., a tablet, smartphone, computer browser, etc.), viewing and evaluating the deployed animation, and making changes to the animation and repeating these steps until the designer is satisfied with the result. This process often needs to be repeated many times even for small changes such as translating the visual object a few pixels in a certain direction, making the animation duration longer or shorter, or changing the curve applied to a translation/movement of the visual object to make the animation appear more natural. Thus, animation development can be an arduous process.

The editor user interface 1500 allows animation components to be previewed with the canvas 1505, thereby obviating the need to compile the code and deploy the code to the target environment to view and evaluate the current state of the animation. Instead, a static preview of the animation components is rendered within the editor user interface 1500 and automatically updated based on changes made to the animation by the user of the client computer 120 or other collaborators having access to the animation. The animation timeline is also updated to reflect the changes in the animation components which comprise the animation. In additional, a "live" preview one or more of the animation components can be rendered within the editor user interface 1500 in response to corresponding input. Thus, designers can preview animation while remaining with the editor user interface, thereby making it easier for the designer to see how different values for varies properties change the various animation components. This provides a more efficient approach to providing a developer with an interim evaluation of the animation compared with compiling and deploying the animation in its target environment.

Each animation has two components: the foreground and the background. The foreground contains one or more visual objects which are the targets of the animation. Each target is set to its initial state (e.g., position and appearance) at the start of the animation within the canvas 1505. The background contains the rest of the animation/application, namely non-animated UI features including which are displayed along with the animation targets. The background may be faded out to reduce distracting the user from the animation target while providing context to the animation. Context may be valuable when trying to animate a target to specific positions on the screen.

Figure 17A:
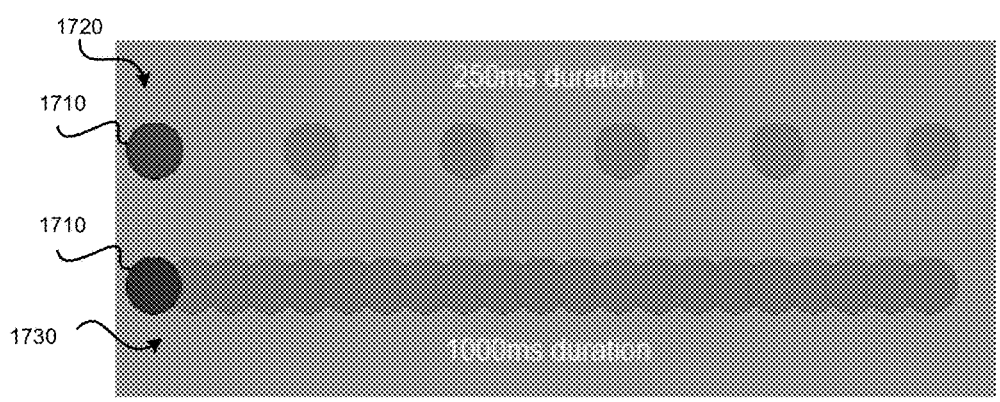
FIGS. 17A-17C are partial editor user interface screens illustrating a canvas of an editor user interface screens of the application development tool for creating, editing and viewing an animation in accordance with example embodiments of the present disclosure.

A static preview of the current state of the animation is displayed in the canvas 1505. The static preview copies an initial instance of the visual object which is the animation target and a number of additional instances (e.g., copies) of each visual object positioned over the background. The initial instance of the visual object is shown in the state defined by the animation whereas the additional instances of the visual object are displayed at higher opacity (i.e., faded) than the state defined by the animation at the position and translated to various locations of the target defined by the animation and/or transformed to various shapes defined by the animation. These translations and transformations changes attributes like position, scale, rotation and opacity. The additional instances of the animation targets may be created at a set time interval which, in some examples, is 50 milliseconds (ms). Reference will now be made to FIG. 17A which shows two examples 1720, 1730 of an animation of a circle 1710 being translated from the left side of the screen to the right side of the screen. In the top example 1720, the animation is 250 ms in duration so 6 instances of the animation target (original at animation start+5 additional instances*50 ms) is rendered in the appropriate style and position over the duration of the animation. In the bottom example 1730, the animation is 250 ms in duration so 6 instances of the animation target (original at animation start+20 additional instances*50 ms) is rendered in the appropriate style and position over the duration of the animation. The static preview assists developers with setting the pacing or speed of the animation from the spacing of the faded instances of the animation targets.

FIGS. 15A and 15B provide two example illustration of the static preview. In FIG. 15A, the background comprises a background 1550 and two rectangles 1560 located at the bottom left and bottom right corners of the canvas 1505. The animation target is a circle 1570 which moves from left to right over the animation, and which moves up and down at an intermediate portion of the animation. The animation of the circle 1570 may, for example, define the running and jumping behaviour of a character in game, which may represent the character running and jumping over a chasm represented as the space between the rectangles 1560. The various animation components which make up this animation are shown in the animation timeline 1510 below the canvas 1505. In FIG. 15B, the background comprises a background 1550 and the animation target is a triangle 1580 which moves from a region in the top left corner towards the bottom centre of the screen, while rotating and enlarged. The various animation components which make up this animation are shown in the animation timeline 1510 below the canvas 1505.

Figure 17B:
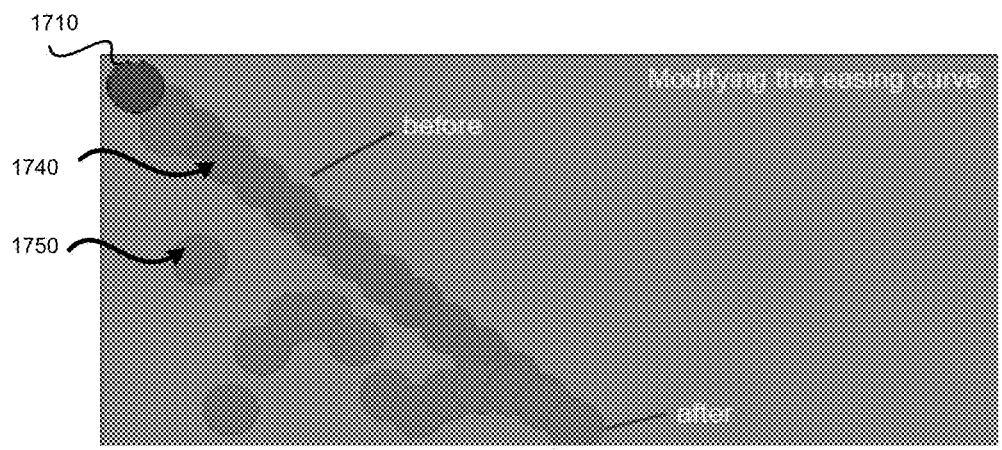

When the developer changes the animation, the static preview of the animation will update automatically to reflect the changes. For example, if a 250 ms duration animation is already plotted, changing a position curve (also known as an easing curve) of one of the animation targets will cause the 6 instances of that animation targets to be translated to new positions in accordance with the changed easing curve. The animation timeline is also updated to reflect the changes in the animation components which comprise the animation. Reference will now be made to FIG. 17B which shows two examples 1740, 1750 of an animation of a circle 1710 being translated from the left side of the screen to the right side of the screen. In the first example 1740, the circle 1710 moves diagonally from a top left corner of the screen to a bottom centre of the screen. The easing curve is modified from a diagonal line in the first example to an irregular, windy or curved path in the second example 1750.

As with UI elements of applications described above, each animation target is represented by CSS-styled HTML objects. When the developer changes the animation, the UI rendering engine re-uses these HTML objects, transforming and translating the HTML objects to the new positions. Changes to the animation changes could take the form of adding a new transition such as a translation, scale, rotation, or fade, or changing the properties of an existing transition, such as the duration, delay, easing curve, etc. The static preview provides the developer with immediate feedback as to how different values affect the overall animation, and makes it easier to fine tune animation properties to the liking of the designer.

Figure 17C:
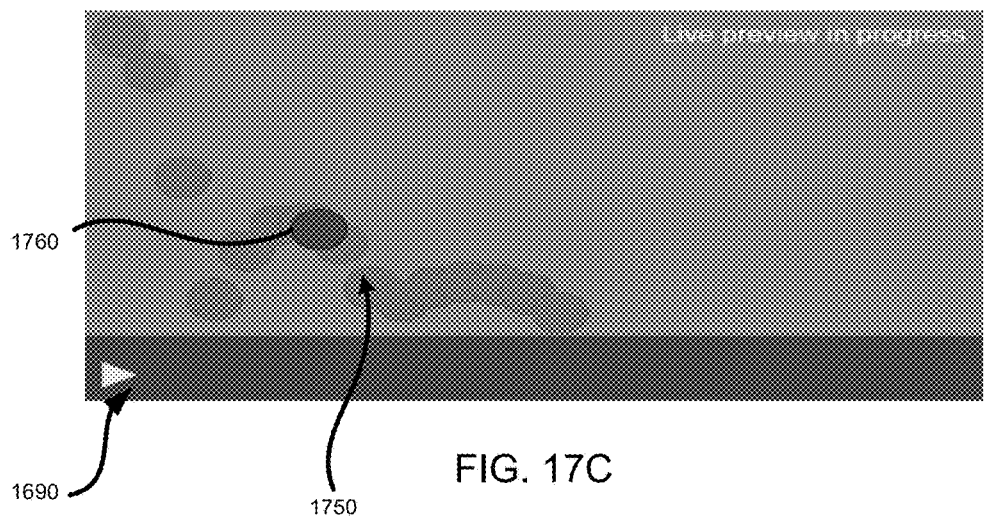

A "live" preview can also be played in the editor user interface without having to compile and deploy the animation to the target environment. In FIGS. 15A and 15B, a play button 1590 in the form of a "Play" arrow is provided. Clicking or otherwise selecting the play button 1590 cause a live preview of the animation to be performed without the editor user interface. A different UI element or input may be used to trigger a live preview in other embodiments. Reference will now be made to FIG. 17C which shows a live preview of the animation of the circle in the second example 1750 of FIG. 17B in which the easing curve is an irregular, windy path in the second example 1750. The current position 1760 of the circle in the animation during the live preview is shown in the state defined by the animation (e.g., un-faded) like the initial state of the circle at the start of the animation whereas the prior and previous additional instances of the circle in the animation are displayed at higher opacity (e.g., faded) compared to the current position in the animation.

During a live preview, a CSS key frame animation is dynamically created that transforms the animation target(s) in the manner specified by the various animation components of the animation. Since the CSS is derived from the animation itself, the CSS key frame animation is able to emulate the durations, delays, and easing curves to create an accurate preview of how the animation will appear on a target device.

Figure 16:
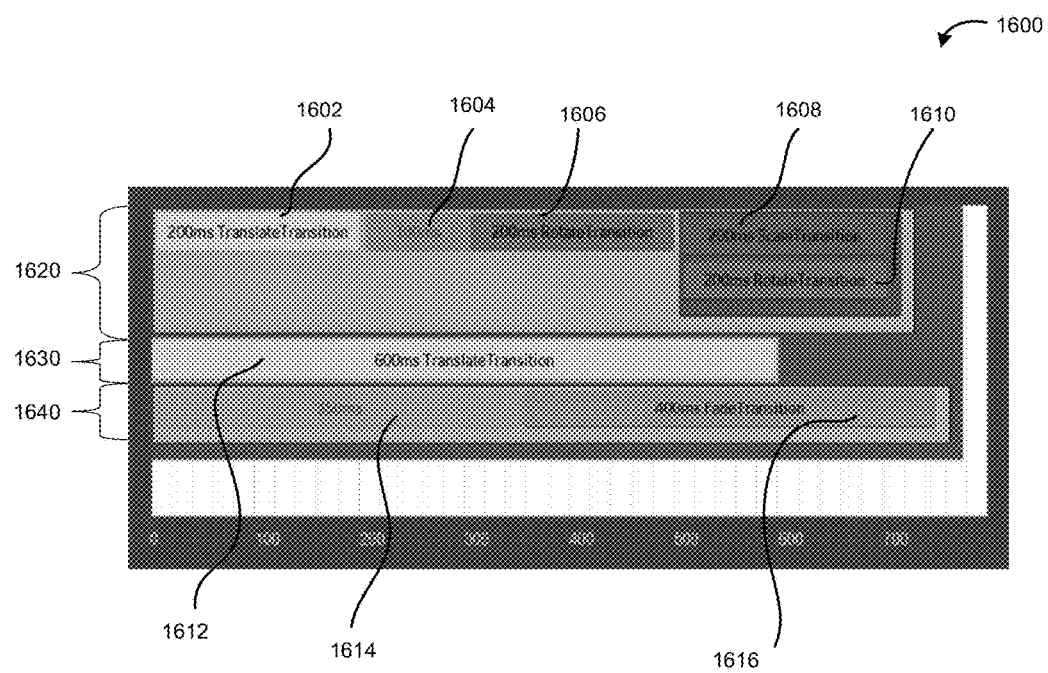
FIG. 16 is a partial editor user interface screen illustrating an animation timeline in accordance with example embodiments of the present disclosure.

Referring now to FIG. 16, the animation timeline will be described in more detail. FIG. 16 illustrates an animation timeline 1600 includes a number of visual elements 1602, 1604, 1606, 1608, 1610, 1612, 1614 and 1616 which represent animation components which comprise an animation. The visual elements are arranged in chronological order of the animation components and are spaced apart in accordance with the duration of the animation components along a time axis (the horizontal axis). The type and duration of each animation component is displayed in the respective visual elements of the animation timeline. The animation components can be separated into three groups indicated by the references 1620, 1630 and 1640, each represent animation components associated with a different visual object. In the shown example, the visual object 1620 is translated for 200 ms, followed by a delay of 100 ms, rotated for 200 ms and then scaled and rotated at the same time for 200 ms.

Group 1620 includes animation components 1602, 1604, 1606, 1608 and 1610. Animation components 1602, 1604, 1606 and 1608/1610 are performed in sequence/series with respect to each other (i.e., one after the other) as indicated by the horizontal stacking of the animation components. However, the animation components 1608 and 1610 are performed in parallel (i.e., at the same time) as indicated by the vertical stacking of the animation components. Group 1630 includes animation component 1612 only. Group 1640 includes animation components 1614 and 1616. Animation components 1614 and 1616 are performed in sequence/series as indicated by the horizontal stacking of the animation components. Comparing animation components in the different groups 1620, 1630 and 1640, it can be seen that some animation components are performed in sequence/series while others are performed in parallel. For example, the animation components 1602, 1612 and 1614 each related to a different visual object, but all start at that the same time (at the start of the animation) and are performed in parallel.

Composite UI Controls

Figure 18A:
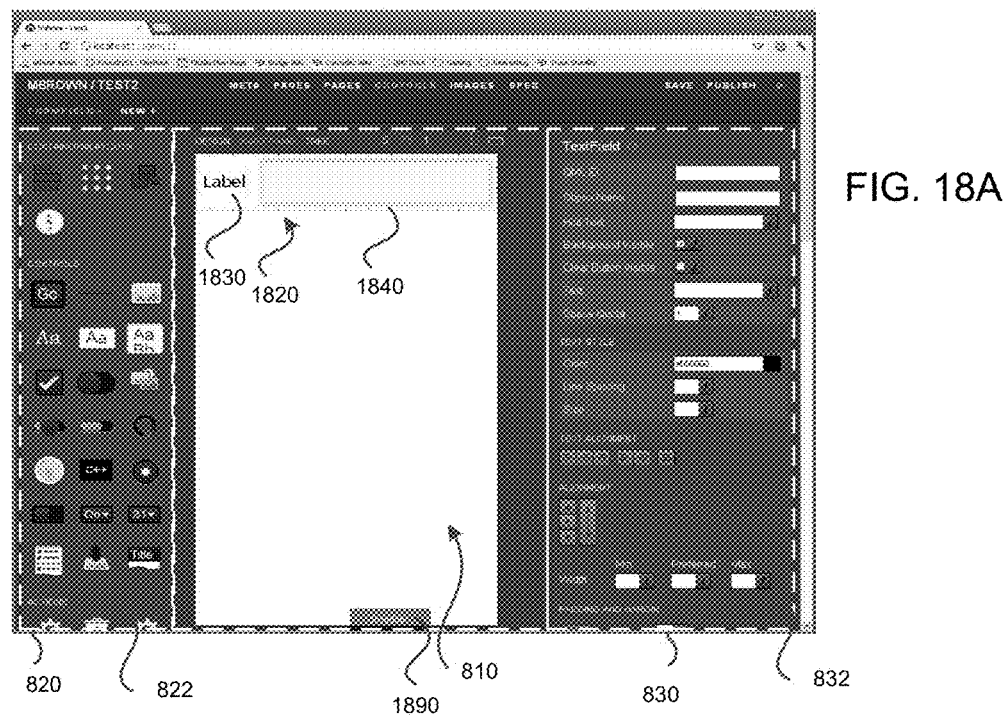
FIGS. 18A-18C are editor user interface screens of the application development tool displaying a controls page for creating, editing and viewing a custom control in accordance with example embodiments of the present disclosure.

The tool 800 and the Cascades™ application framework allows developer to create custom composite UI controls which are comprised of a number of visual objects controls, which may be the same or different from each other. Reference in now made to FIG. 18A which shows a controls view (or tab) of an example editor user interface screen which allows a designer to create, edit and view a custom UI control. In the shown example, a composite UI control 1820 is shown which consists of a label 1830 and text field 1840 which represent a labelled text entry area which may be included in a application. The editor maintains a "master copy" of the composite UI control 1820 which is sent to the ADS 110 and stored by the ADS 110 in a composite UI control database. The creation of a composite UI control is typically treated in the same manner as a change to an application.

Designing a composite UI control is similar to designing a full application page. The user can drag and drop visual objects from the drag-and-drop object palette 820, located on the left side of the editor user interface in the shown example, into the canvas 810. Similar, properties of the composite UI control can be edited using the attributes panel 830, located on the right side of the editor user interface in the shown example, in the same way as the visual object on a full page. When a new composite UI control is created, a new drag and drop icon for the composite UI control automatically appears in the drag-and-drop object palette 820 of the page view of the editor user interface.

Each composite UI control comprises a number of visual objects (UI controls) which are positioned in a specified manner with respect to each other. Each of the visual objects has one or more properties. The visual objects are standard (e.g., core or basic) visual objects supported the Cascades™ application framework, namely QML visual objects. The visual objects in the composite UI control may be the same or different. The composite UI control may have more than one instance of the same visual object. One or more properties of one or more of the visual objects in the custom control may have a configurable value. In some examples, each of the properties (exposed or otherwise) of each of the visual object may have a configurable value.

In some examples, the configurable value of at least some of the properties of some of the visual objects which may be defined as an expression, such as a complex expression. In some examples, any property of any visual object may be defined as a complex expression. A complex expression defines a relationship between a particular property (firstObject) of one of the visual objects (e.g., xPosition) and one or more properties (e.g., yPosition) of one or more other visual objects (otherObject) in the custom control. For example, the complex expression "xPosition: otherObject.yPosition+10" defines the xPosition of a particular object as having the value of the yPosition of another object "otherObject" plus 10. The complex expressions create built-in behaviors of the composite UI controls. The built-in behaviors of the composite UI control may become quite complex as the number of visual objects increases and the number of built-in behaviors increases.

Figure 18B:
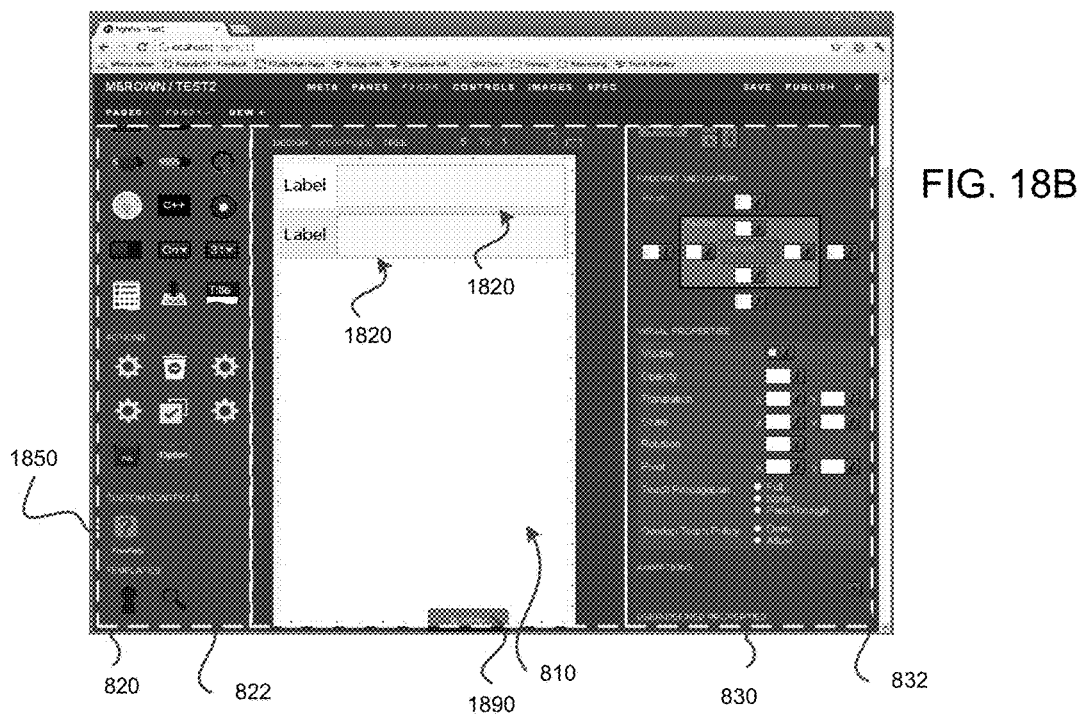

Reference in now made to FIG. 18B which shows a page view of the example editor user interface screen in which the new composite UI control 1820 is shown in Custom Controls portion of the drag-and-drop object palette 820 by reference 1850. The designer can insert one or more instances of the composite UI control 1820 into a page of the application within the page view of the editor user interface by dragging the composite UI control 1820 onto the page. This allows the developer to create and use multiple instances of the new composite UI control efficiently without a need to recreate the composite UI control each time and ensures consistency between the same the type of custom control. This can save a substantial amount of time when the composite UI control is more complex Public properties (also known as alias properties) of a composite UI control may also be provided. Public properties are properties of various instances of the core visual objects which comprise a composite UI control which are exposed as editable properties. The values of public properties can be set or changed within the page view of the editor user interface. Non-public properties of the one or more core visual objects which comprise the composite UI control are protected or locked and cannot be set or changed within the page view of the editor user interface. For example, the developer may wish to expose the text of the label of the composite UI control 1820 as an editable property so that each instance of the composite UI control 1820 may have a different label. Other properties of the label may be locked. Similarly, one or more, or even all of the properties of the text field 1840 may be locked.

Figure 18C:
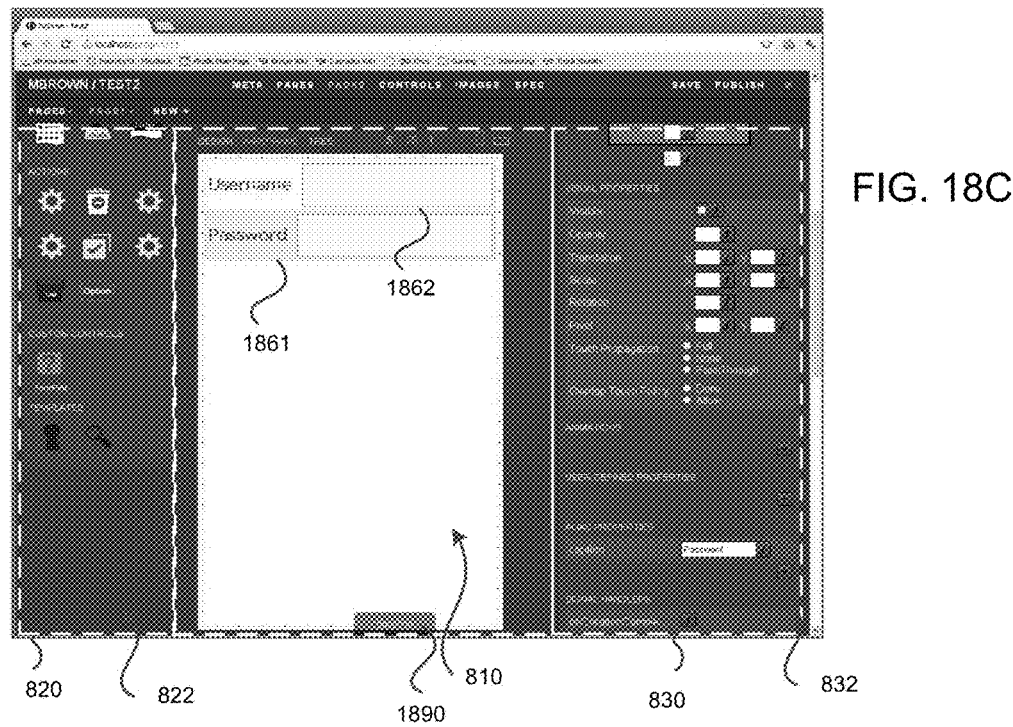

FIG. 18C shows two instances of the new composite UI control 1861 and 1862 with the current page of the application shown in the page view of the example editor user interface. In the first instance, the label of the composite UI control 1861 has been assigned the value "Password" whereas in the second instance, the label of the composite UI control 1862 has been assigned the value "Username". As with other properties of the visual objects in the page, alias properties are evaluated in real-time or near real-time so that all instances of the composite UI control are immediately updated to reflect the alias properties.

It is contemplated that a composite UI control could be locked by a user, such as the user which created the composite UI control, so that the properties of the visual objects which are exposed as editable properties, i.e. which are Alias properties, cannot be changed by other users. A username and password could be used to lock the composite UI control.

A visual timeline for the application, which comprises one or more visual elements each representing an action performed in respect of the application, can be invoked by interacting with a button 1890, for example by clicking or otherwise selecting the button 1890. Each visual element in the visual timeline represents an action performed in respect of the application with the visual elements are arranged in a chronological order in which the actions occurred. Each action corresponding to a save point or an incremental change to the application. Incremental changes include changes in relation to composite UI controls (such as the addition, deletion, or modification of a master copy of the composite UI control or the addition, deletion, or modification of one or more instance of a composite UI control in an application page).

The application code associate with each instance of the composite UI control in the application includes a dynamic link to the master copy of the composite UI control. Changes which are made to the master copy of the composite UI control in the controls view of the editor user interface are immediately propagated to each instance of the composite UI control which is displayed on the current page of the application shown in the page view of the example editor user interface.

Figure 19:
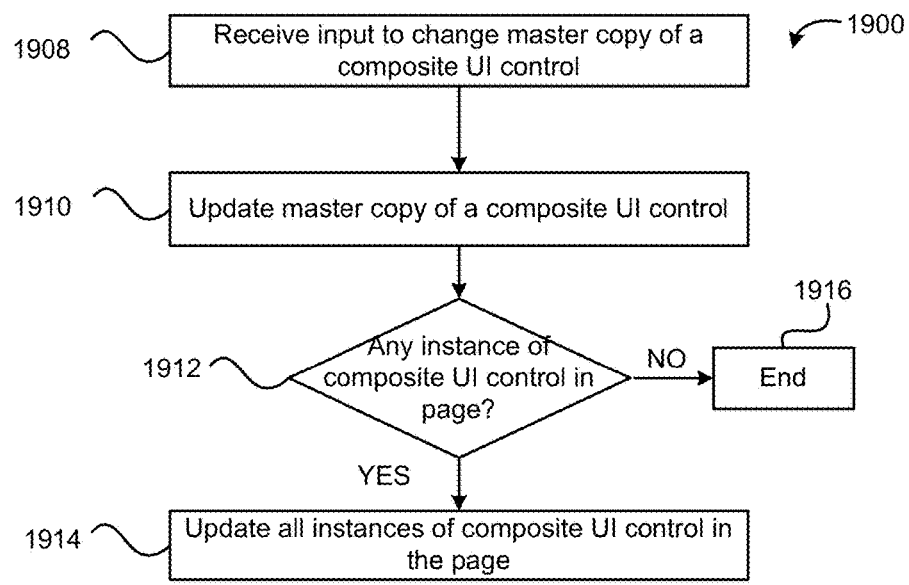
FIG. 19 is a flowchart illustrating a method for updating a composite UI control in accordance with example embodiment of the present disclosure.

Referring now to FIG. 19, a method 1900 for updating a composite UI control in accordance with example embodiment of the present disclosure will now be described. The method 1900 may be carried out by software executed, for example, by a processor. Coding of software for carrying out such a method 1900 is within the scope of a person of ordinary skill in the art provided the present disclosure. The method 1900 may contain additional or fewer processes than shown and/or described, and may be performed in a different order. Computer-readable code executable by the processor 102 to perform the method 1900 may be stored in a computer-readable medium such as the memory of a server such as a memory of a host device. The method 1900 presumes that the tool 800 is running on a suitable computer 120.

At event 1908, input to change a master copy of a composite UI control is received by the processor 202 of the computer 120 running the tool 800, for example, from the controls tab of the editor user interface. The input may be an addition of a visual object, a deletion of a visual object, or a change in the property of a visual object in the composite UI control.

At event 1910, the master copy of a composite UI control is updated locally and a change request including change information describing the change to the composite UI control is sent from the computer 120 to the ADS 110. The ADS 110 then sends the change to other collaborating devices as described above.

At event 1912, it is determined whether any instances of the composite UI control are presented in the active page of the application. This typically automatically when the editor user interface is returned to the page view from the controls view where the master copy of the composite UI control is edited.

At event 1914, if any instance of the composite UI control is present in the active page of the application, all instances of the composite UI control are updated to reflect the change. Instances of the composite control on other collaborating devices will be also be updated using a change request as described elsewhere in the present disclosure. At event 1916, if no instance of the composite UI control is present in the active page of the application, the method 1900 ends.

Library and Online Storefront for Composite UI Controls

It will be appreciated that custom controls may become quite complex as the number of internal controls increases and the developer adds built-in behaviour. This presents the possibility that other developers may be interested in similar custom controls. This creates the opportunity for developers to share or sell custom controls.

The present disclosure proposes a library of shared custom controls which permits the use and purchase of custom controls, thereby saving developers the time and effort of creating new custom controls from scratch. The provision of a library for application code, such as custom controls, presents the problem of allowing another developer to experiment with the shared controls to appreciate the utility of such controls while enforcing restrictions on the use of the shared custom controls from the library to ensure payment should the developer want to use the custom control in an application. The present disclosure provides an online storefront which seeks to address this balance between allowing developers to test custom controls, restricting the use of shared customs controls with the library, and ensuring payment.

To add a custom control the library of custom controls, a developer marks the custom control as a "shared" custom control. A QML package containing the application code for the custom control in QML and any media assets, such as images, is created and added in a common storage for the custom controls library. This may be a copy of a QML package for the control stored with the application code for the application in which the custom control was developed. Alternatively, a pointer to the QML package stored in associated with the application in which the custom control was developed may be added to a library.

The developer may optionally provide documentation about the behavior of the custom control, about its API, etc. The documentation could be generated in response to designated input such as input to "share" the custom control or input to "add" the custom control to the library, for example, by clicking or otherwise selecting a corresponding button in the editor user interface. For example, the controls view of the editor user interface may provide buttons to "share" the custom control or "add" the custom control to the library. Alternatively, the documentation about the custom control could be provided in the specification tab of the editor user interface in which the custom control was created and exported to the library in response to designed input such as input to "share" the custom control or other input to "add" the custom control to the library. It is contemplated that a user may be provided with the option to share the custom control with all users, individual users and/or individual user groups.

The documentation may be generated by the tool 800 in an assisted manner because the tool 800 is aware of the public properties and behaviors (methods) exposed by the custom control. For example, the editor user interface may automatically generate a documentation form including a list of each of the exposed properties and methods of the customer control along with an input field for developer to enter information about each of public properties and behaviors of the custom control. The tool 800 receives input in the various input fields, and in response to designated input, such as clicking or otherwise selecting a "Share" button or similar user interface element, the automatically generated data and input data are merged to create a custom control documentation document which is sent to the ADS 110, and stored in association with the custom code by the ADS 110. The custom control documentation may also be stored with an application in which the custom control was created. The documentation form may also include a summary portion which allows the author to add a brief summary of the custom control, or the summary may be extracted from the specification tab.

The developer may optionally provide one or more images of the custom control and/or one or more suggested applications or uses of the custom control within the context of an application. The tool 800 may assist in generating the images of the custom control because it has the ability to renders the custom control visually. Lastly, the developer may set a price for the custom control which may include the custom control being "free".

As with the QML package including the QML code and any media assets associated with the custom control, a description about the custom control which includes the documentation for the custom control and possibly one or more suggested applications or uses and/or the price of the custom control may be stored by the ADS 110 in the common storage for the library or a pointer to the description may be provided. The one or more images of the custom control may be static images, or they may be live rendered by the tool 800 when the shared custom control is accessed.

The developer may optionally provide other data about the custom control, like assigning it to a "category" of controls, etc. For example, a number of predefined categories may be defined for the custom controls and each custom control which is "shared" may have a category assigned thereto. Examples categories include custom list views, data entry forms, etc. The date created or added and author of the custom control can be determined automatically by the ADS 110 using the user information and date information when the custom control was added, last modified or shared, as the case may be. The category, date and author information allows for easier identification and selection of custom controls which may be of interest to developers.

Native C/C++ code, such as native C/C++ APIs, may be created by the author to supplement the QML and media assets of the custom control. The native C/C++ code provides application logic which defines the manner in which the visual objects of various applications pages interact. The native C/C++ code could also be provided within the custom control library/storefront in the same manner as a custom control. The native C/C++ code could be distributed along with the QML and media assets of the associated custom control.

Referring now to FIG. 20, an example user interface screen 2000 of a custom control library or a custom control storefront will be described. The custom control may be provided on a specific page within the tool 800, or may be accessed via a dedicated URL. The online storefront user interface screen 2000 includes a listing of custom controls 2010 which are available identified individually by references 2010A, 2010B, 2010C and 2010C. The custom controls 2010 are controls which have been marked as "shared". Each of the custom controls 2010 are identified by a name and one or more images which are live renderings of the custom control which are generated in the same manner as the live renderings in the canvas 810 of the editor user interface and the showcase page.

Each of the custom controls 2010 includes a short description of the custom control. In the shown embodiment, the description of the custom control may include short version or small part of the custom control summary, documentation for the custom control, and/or suggested applications or uses of the custom control. The category of the custom control and the price for the custom control are also shown. In the shown embodiment, the online storefront user interface screen 2000 also includes a search field 2050 for searching the descriptions of the custom controls in the library/storefront. In response to the results of the input in the search field 2050, the listing of custom controls in the online storefront user interface screen 2000 is filtered to display only custom controls having a description which matches the search term input in the search field 2050. The listing of custom controls may also be stored by category, by author, by date, by price, etc., for example, by selecting (e.g., clicking) the corresponding column name.

Unlike conventional online libraries or storefronts, the content of the custom control library or storefront is dynamically determined "on demand" when a developer or other user access it in accordance with which custom controls have been marked as "shared". In particular, only users with whom the custom control has been shared will see the custom control within the listing of custom controls in the custom control library or storefront. As noted above, it is contemplated that a user may be able to share the custom control with individual users and/or individual user groups with which to share the custom control. Moreover, the assets in the custom control library or storefront are dynamically determined. The QML package of the custom control may be modified by the author over time so the version of the custom control which is available in the library is typically the most recent version of the custom control.

When a user selects a custom control from the custom control library or storefront via corresponding input, such as clicking or other selection of a particular custom control 2010 from the listing of custom controls 2010, the long version of the custom control summary, documentation for the custom control, the suggested applications or uses of the custom control. The user is then given an option to acquire the custom control. For example, the user may be given the option to buy the custom control or test the custom control. If the user chooses to buy the custom control, an unencrypted copy of the custom control, comprising a QML package including the QML code and any media assets associated with the custom control, is sent to the client computer 120. Any native C/C++ code could be distributed along with the application code (QML) of the associated custom control at this time. The documentation associated with the application may also be provided. The documentation could be merged into the specification tab of the application into which the custom control was added.

If the user chooses to test the custom control, a preview phase is provided and an encrypted copy of the custom control is sent to the client computer 120 of the user along with a decryption key which is protected from user access so the user cannot decrypt the custom control code. In some examples, the decryption key is embedded in the tool 800 in a way which makes it difficult for the user to extract the decryption key. The decryption key is also embedded in the application compiled on the ADS 110 that is distributed to a connected mobile device 130. This allows the tool 800 and the connected mobile device 130 to decrypt and render the custom control while making it difficult for a user to obtain access to the custom control code and copy it without purchasing the custom control from the storefront. The preview phase allows developers to test the custom control so that they can determine whether the custom control meets their specific needs before purchasing while at the same time attempting to ensure that a developer cannot distribute an application utilizing the custom control.

In the preview phase, the custom control would appear in the custom control toolbox of the editor user interface screen as described above. The user could drop and drag instances of custom control into the application and edit exposed properties. The custom control can be published to a connected mobile device 130, and the behavior of the custom control would be intact in the application running on the connected mobile device 130. This allows users to interact with the custom control in some detail to test out the functionality of the custom control so that users CaO determine whether the custom control meets their specific needs while at the same time ensuring that developer is not allowed to distribute an application utilizing the custom control.

The QML and media assets for the custom control are deployed to the user's client computer 120 may be deployed to the user's connected mobile device 130 for live publishing. In the described embodiment, the ADS 110 generates a decryption key, such as a symmetric encryption key for the application, which it uses to encrypt the QML code and optionally any media assets, and sends the symmetric encryption key to the client computer 120 as part of the JavaScript deployed to the user's client computer 120 and in the application deployed to a connected mobile device 130 during live publishing (if applicable). The encrypted QML code and any encrypted media assets are decrypted in real-time on the user's client computer 120 in real-time using the symmetric encryption key and within the application running on a connected mobile device 130 during live publishing (if applicable) using the symmetric encryption key. This seeks to prevent the user from copying the QML from the file system of client computer 120 or within the application running on a connected mobile device 130 during live publishing, or from sniffing traffic over the persistent connection (e.g., HTTP connection) between the ADS 110 and the client computer 120 (via the Web Browser 282) or the persistent connection (e.g., HTTP connection) between the ADS 110 and connected mobile device 130.

The user may choose to return to the custom control library or storefront at any time to purchase a custom control. The first time the user decides to export an application which includes a custom control from the shared library which has not been purchased, the user is prompted to pay for any custom controls used in the application. The tool 800 could redirect the user to a payment server, which could be part of the ADS 110. After confirmation of payment from the payment server is received by the ADS 110, an unencrypted copy of the custom control is sent from the ADS 110 to the client computer 120 and connected mobile device 130 (if applicable).

While a symmetric encryption key solution is described in the embodiment described above, other encryption methods may be used in other embodiments.

The custom control library or storefront described above allows a user (consumer) to try the custom control before buying it in a preview phase in a manner in which the user is prevented from accessing the underlying QML and media assets during the preview phase. It is only after the user has paid for the custom control that the underlying QML and media assets are provided.

Figure 21:
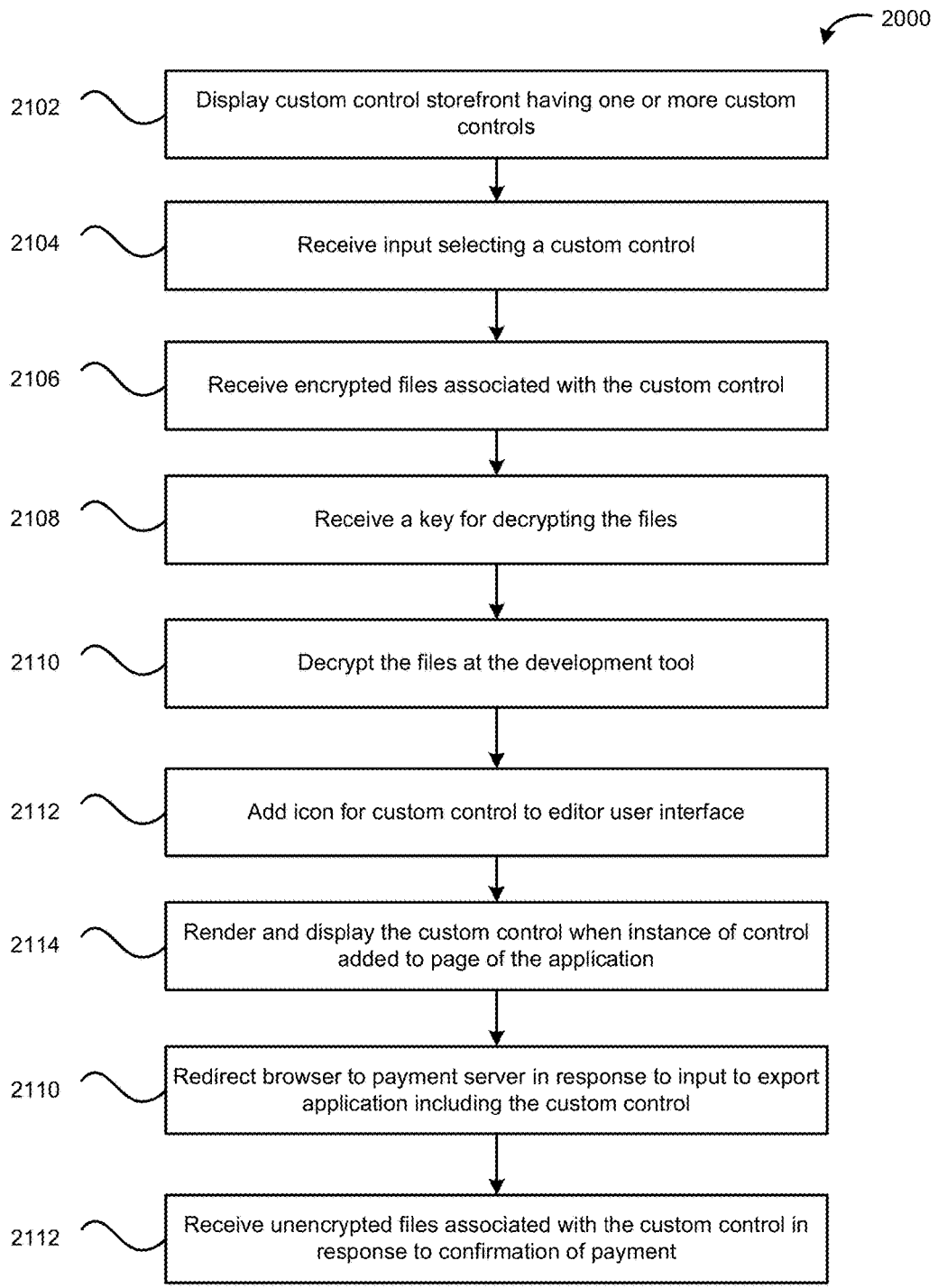
FIG. 21 is a flowchart illustrating a method for providing a custom control storefront in accordance with example embodiment of the present disclosure.

Referring now to FIG. 21, a method 2100 for sharing a custom control, such as a composite UT control, in accordance with example embodiment of the present disclosure will now be described. The method 2100 may be carried out by software executed, for example, by a processor. Coding of software for carrying out such a method 2100 is within the scope of a person of ordinary skill in the art provided the present disclosure. The method 2100 may contain additional or fewer processes than shown and/or described, and may be performed in a different order. Computer-readable code executable by the processor 102 to perform the method 2100 may be stored in a computer-readable medium such as the memory of a server such as a memory of a host device. The method 2100 presumes that the tool 800 is running on a suitable computer 120.

At event 2102, a user on a client computer 120 accesses the custom control library or storefront, for example, via a specific page within the tool 800, such as custom control store page, or a dedicated URL using a browser, such as the Web Browser 282. The browser displays the storefront. The storefront includes a listing of one or more custom controls as shown, for example, in FIG. 20.

At event 2104, input selecting test a custom control to test from the listing of one or more custom controls in the storefront is received.

At event 2106, in response to the input to test the custom control an encrypted form of the custom control is received by the browser. As noted above, the custom control comprises a number of QML objects which are positioned in a specified manner with respect to each other and in which each of the QML objects has one or more properties. The custom control may also comprise one or more media assets, such as image assets, in addition to the QML files.

At event 2108, in response to the input to test the custom control a decryption key, such as symmetric encryption key, is received by the browser. In other embodiments, the events 2106 and 2108 may occur in reverse order or may occur simultaneously. Alternatively, the decryption key may have already been provided, for example, when the tool 800 was loaded. For example, the decryption key may be delivered along with the JavaScript code for the tool 800 when the user first accesses the tool 800 on the ADS 110 in an editing session.

At event 2110, the Web browser 282 decrypts the encrypted custom control using the decryption key using the JavaScript engine of the Web browser 282.

At event 2112, the editor user interface within the browser is updated to include an icon representing the custom control as shown, for example, in FIG. 18C. The icon is typically added to the drag and drop object palette 820 of the editor user interface along with the standard objects in the object palette 820.

At event 2114, in response to input to add an instance of the custom control to a page displayed within an editor user interface within the browser, the decrypted custom control is rendered and displayed by the browser on a display of the client computer 120. The rendering and displaying may be performed as part of re-rendering and re-displaying the application in response to the input to add the instance of the custom control to the page. The input to add the custom control to the page may be a drag and drop action from the object palette.

As noted above, the rendering and displaying by the browser may comprise transcoding by the browser the QML objects into JavaScript objects, transcoding the JavaScript objects into HTML objects, styling by the browser the HTML objects using CSS to emulate the QML objects, and displaying by the browser the stylized HTML objects on the display of the computer.

If the application is published to a connected mobile device 130, the added instance of the custom control will also appear on the deployed application as a result of the change request associated with the input to add the instance of the custom control to the page displayed within an editor user interface within the browser. The connected mobile device 130 is provided with the encrypted custom control and the decryption key, and uses the decryption key to decrypt the encrypted custom control and render the decrypted custom control.

At event 2116, in response to input to export the application, the browser is directed to a payment server.

At event 2118, in response to receiving confirmation of payment from the payment server, the browser receives an unencrypted form of the custom control. The unencrypted form of the custom control can be used in the application without limits, including exporting the application.

It is contemplated that rights to use the custom control may be granted on a per application basis or a perpetual basis using this method described herein. In the case of a perpetual license, information concerning the user rights to acquired custom controls may be assessed by the ADS 110 at login, and the unencrypted form of any previously acquired custom control is sent to the browser with the rest of the data and information for the tool 800, such as the QML parser, etc. and an icon representing each previously acquired custom control can be added to the drag and drop object palette 820 of the editor user interface along with the standard objects in the object palette 820.

While not shown, the user can navigate back to the storefront at any time and request to buy or purchase the custom control rather than request that the application be exported to buy or purchase the custom control. In response to input to purchase the custom control from the listing of one or more custom controls in the storefront, the browser is directed to the payment server. In response to receiving confirmation of payment from the payment server, the browser receives an unencrypted form of the custom control.

It will be appreciated that, when the custom control is provided for free by the author, the unencrypted form of the custom control could be provided at 2106 thereby obviating the need for decryption keys and related decryption actions.

It will be appreciated that the present disclosure provides two general approaches to distributing changes to computers and mobile devices. In the first approach, the server determines which computers or mobile devices should receive the changes based on the UserID and only sends the changes to the determined client devices. The first approach is a lightweight for the clients but creates additional processing for the server. In the second approach, the server sends the changes to all collaborating client devices and each client determines whether to apply the changes based on the UserID. The second approach is a lightweight for the server but creates additional processing for the clients.

While the described embodiments relate to a Web-based integrated development environment and tool, the teachings of the present disclosure could be applied to a private network, such as a corporate or other enterprise network, to provide similar benefits within a private network environment. Additionally, while the described embodiments refer to the Web and persistent connections using HTTP or HTTPS as example communication protocols for communications between a client computer and server and for communications between a mobile device and server, it will be understood that other communication protocols could be used in other embodiments.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

In accordance with one aspect of the present disclosure, there is provided a method implemented by a server device for collaboration on an application, the method comprising: receiving from a first client device a request for a first state of the application at a first time; identifying application code defining the application at a save point prior to the first time and any incremental changes to the application code which occurred between the save point and the first time; and sending the application code and any incremental changes to the first client device.

In some example embodiments of the first aspect of the present disclosure, the method further comprises: receiving from a second client device change information describing an incremental change to the application; storing the change information received from the second client device in a memory; and sending the change information received from to the first client device The change information may be stored in association with a user which caused the incremental change and a timestamp describing a time of the incremental change. The change information may identify a new image to be associated with a dynamic link to an image, wherein the dynamic link is included in a page of the application. When the new image file is selected from a memory of the first client device, the new image file may be provided with the change information.

In some example embodiments of the first aspect of the present disclosure, the application code and any incremental changes are separately stored in a memory of the server.

In some example embodiments of the first aspect of the present disclosure, the application code at one or more save points and incremental changes between the one or more save points are each stored individually in the memory of the server. The application code at each of the one or more save points and each of the incremental changes may be stored in association with a timestamp.

Each of the one or more save points and each of the incremental changes may be stored in association with a user associated with the respective save or change.

In some example embodiments of the first aspect of the present disclosure, the method further comprises: receiving a request to save a current application state, the request including the application code of the application at the current application state; storing the current application code of the application at the current application state in a memory of the server.

In some example embodiments of the first aspect of the present disclosure, the save point is the most recent save point.

In accordance with a second aspect of the present disclosure, there is provided a server, comprising: a processor configured for: receiving from a first client device a request for a first state of the application at a first time; identifying application code defining the application at a save point prior to the first time and any incremental changes to the application code which occurred between the save point and the first time; and sending the application code and any incremental changes to the first client device.

In accordance with a third aspect of the present disclosure, there is provided a method implemented by a client device for collaboration on an application, the method comprising: sending to a server a request for a first state of the application at a first time; receiving from the server application code defining the application at a save point prior to the first time and any incremental changes to the application code which occurred between the save point and the first time; rendering a first page of the application in accordance with the application code defining the application at the save point and any incremental changes to the application code which occurred between the save point and the first time; and displaying the rendered first page on a display of the client device.

In some example embodiments of the third aspect of the present disclosure, rendering the first page comprises: rendering the first page of the application in accordance with the application code defining the application at the save point; applying any incremental changes to the rendered first page which occurred between the save point and the first time in an order in which the incremental changes occurred.

In some example embodiments of the third aspect of the present disclosure, rendering the first page comprises: generating the first state of the application, the generating including applying incremental changes to the application code which occurred between the save point and the first time in an order in which the incremental changes occurred; and rendering the first page of the application in accordance with the first state of the application.

In some example embodiments of the third aspect of the present disclosure, the application code comprises one or more pages each defined by Qt Modeling Language (QML), wherein each page comprises one or more QML objects. In some example embodiments of the third aspect of the present disclosure, the rendering comprises: transcoding the one or more QML objects into one or more JavaScript objects; transcoding the one or more JavaScript objects into one or more HTML objects; and styling the one or more HTML objects using Cascading Style Sheets (CSS) to emulate the one or more QML objects. In some example embodiments of the third aspect of the present disclosure, the method further comprises: transcoding one or more JavaScript objects which define the current state of the application into one or more QML objects in response to a request to save, export or publish the application; and outputting the one or more QML objects to save, export or publish the application.

In some example embodiments of the third aspect of the present disclosure, the method further comprises: establishing a persistent connection between with the server; sending a request to the server which requests that the server send any incremental changes to the application subsequent to the first state of the application; receiving from the server change information describing an incremental change to the application at a time indicated by a first timestamp; applying the incremental change to the application to the rendering first page of the application; and sending a further request to the server which requests that the server send any incremental changes to the application subsequent to the time indicated by the first timestamp.

In some example embodiments of the third aspect of the present disclosure, the method further comprises: receiving a request to change the application to a previous state; reversing the incremental changes which occurred between the current state of the application and the previous state of the application in reverse order of an order in which the incremental changes occurred. In some example embodiments of the third aspect of the present disclosure, the method further comprises: when the previous state is prior to the save point, requesting from the sever the incremental changes which occurred between the save point and the previous state; and receiving from the server the incremental changes which occurred between the save point and the previous state. The request to change the application to a previous state may be an undo request or a selection of a previous state on a visual timeline.

In some example embodiments of the third aspect of the present disclosure, the save point is the most recent save point.

In accordance with a fourth aspect of the present disclosure, there is provided a method implemented by a client device for collaboration on an application, the method comprising: sending to a server a request to display a Showcase page including one or more applications which a user associated with the client device has access to; receiving from the server application code defining the one or more applications at a save point prior to a time of the request and any incremental changes to the application code which occurred between the save point and the time of the request; rendering one or more pages of the one or more applications in accordance with the application code defining the application at the save point and any incremental changes to the application code which occurred between the save point and the time of the request; and displaying the Showcase page including the one or more rendered pages of the one or more applications on a display of the client device.

In some example embodiments of the fourth aspect of the present disclosure, the one or more pages of the one or more applications are presented in an array.

In some example embodiments of the fourth aspect of the present disclosure, an indication of a most recently modified application is provided.

In some example embodiments of the fourth aspect of the present disclosure, rendering the one or more pages comprises: rendering the one or more pages of the one or more applications in accordance with the application code defining the application at the save point; applying any incremental changes to the one or more pages of the one or more applications which occurred between the save point and the time of the request in an order in which the incremental changes occurred.

In some example embodiments of the fourth aspect of the present disclosure, rendering the one or more pages comprises: generating a current state of the application, the generating including applying incremental changes to the application code which occurred between the save point and the time of the request in an order in which the incremental changes occurred; and rendering the one or more pages of the one or more applications in accordance with the current state of the application.

In some example embodiments of the fourth aspect of the present disclosure, the application code of the one or more applications each comprises one or more pages each defined by QML, wherein each page comprises one or more QML objects. In some example embodiments of the fourth aspect of the present disclosure, the rendering comprises: for each of the one or more pages of the one or more applications, transcoding the one or more QML objects into one or more JavaScript objects; transcoding the one or more JavaScript objects into one or more HTML objects; and styling the one or more HTML objects using CSS to emulate the one or more QML objects.

In some example embodiments of the fourth aspect of the present disclosure, the method further comprises: establishing a persistent HTTP connection between with the server; sending a request to the server for each of the one or more applications which requests that the server send any incremental changes to a respective application subsequent to the time of the request; receiving from the server change information describing an incremental change to one application in the one or more applications at a time indicated by a first timestamp; applying the incremental change to the one application to the one or more rendered pages of the one application; and sending a further request to the server which requests that the server send any incremental changes to the one application subsequent to the time indicated by the first timestamp.

In some example embodiments of the fourth aspect of the present disclosure, the save point is the most recent save point.

In accordance with a further aspect of the present disclosure, there is provided a method implemented by a server device for collaboration on an application, the method comprising: receiving from a first client device a request for application code defining the application at a first state of the application at a first time; sending the application code defining the application at a save point prior to the first time to the first client device; receiving from the first client device a request for any incremental changes to the application code which occurred between the save point and the first time; and sending any incremental changes to the application code which occurred between the save point and the first time.

In accordance with a fifth aspect of the present disclosure, there is provided a method implemented by a client device for collaboration on an application, the method comprising: sending to a server a request for application code defining the application at a first state of the application at a first time; receiving from the server application code defining the application at a save point prior to the first time to the first client device; sending to the server a request for any incremental changes to the application code which occurred between the save point and the first time; receiving from the server any incremental changes to the application code which occurred between the save point and the first time; rendering a first page of the application in accordance with the application code defining the application at the save point and any incremental changes to the application code which occurred between the save point and the first time; and displaying the rendered first page on a display of the client device.

In some example embodiments of the fifth aspect of the present disclosure, rendering the first page comprises: rendering the first page of the application in accordance with the application code defining the application at the save point; applying any incremental changes to the rendered first page which occurred between the save point and the first time in an order in which the incremental changes occurred.

In accordance with a sixth aspect of the present disclosure, there is provided a method of interacting with a visual timeline of an application, the method comprising: displaying on a display a visual timeline having one or more visual elements each representing an action performed in respect of the application, each action corresponding to a save point or an incremental change to the application, wherein the visual elements are arranged in a chronological order in which the actions occurred.

In accordance with a seventh aspect of the present disclosure, there is provided a method of synchronizing an application between a client computer to a mobile device, the method comprising: receiving a request from a client computer to deploy (e.g., publish) an application associated with an application identifier ApplicationID at a first application state to a mobile device, wherein the request includes a user identifier UserID associated with a current user of the client computer and an IP address of the mobile device TargetIPAddress; compiling the application in accordance with application code defining the application at a save point prior to the first application state; sending the compiled application to the mobile device at the IP address TargetIPAddress along with identifying information comprising an IP address of the server.

In some example embodiments of the seventh aspect of the present disclosure, the method further comprises: receiving an authorization request from the mobile device, the authorization request including identifying information comprising the application identifier ApplicationID, the user identifier UserID and a device identifier DeviceID associated with the mobile device; sending a device authorization request to the client computer when the combination of the application identifier ApplicationID, user identifier UserID and device identifier DeviceID do not correspond to any previously authorized mobile devices; generating a token defining an association between the application identifier ApplicationID, the user identifier UserID and the device identifier DeviceID in response to receiving a device authorization message from the client computer; and sending the token to the mobile device associated with the device identifier DeviceID. In some example embodiments of the seventh aspect of the present disclosure, the method further comprises: denying the authorization request in response to receiving a device denial message from the client computer.

In some example embodiments of the seventh aspect of the present disclosure, the method further comprises: receiving an authorization request from the mobile device, the authorization request including identifying information comprising the application identifier ApplicationID, the user identifier UserID and a device identifier DeviceID associated with the mobile device; generating a token defining an association between the application identifier ApplicationID, the user identifier UserID and the device identifier DeviceID in response to the receiving the authorization request; and sending the token to the mobile device associated with the device identifier DeviceID.

In some example embodiments of the seventh aspect of the present disclosure, the method further comprises: sending identifying information about the mobile device associated with the device identifier DeviceID to the client computer.

In some example embodiments of the seventh aspect of the present disclosure, the method further comprises: sending to the mobile device associated with the device identifier DeviceID any incremental changes to the application code which occurred between the save point and the first application state.

In some example embodiments of the seventh aspect of the present disclosure, the method further comprises: receiving a request from the mobile device associated with the device identifier DeviceID, wherein the request requests any subsequent change to the application made to the application by the user associated with the user identifier UserID, wherein the request is associated with the token.

In some example embodiments of the seventh aspect of the present disclosure, the method further comprises: receiving from the client computer a change request including change information describing one or more change(s) to the application, wherein the change request is associated with the user identifier UserID; and sending the change request to the mobile device associated with the device identifier DeviceID when an open request requesting any subsequent change to the application made to the application by the client computer associated with the user identifier UserID exists for the mobile device. The change request may change a current state of the application on the client computer associated with the user identifier UserID from the first application state to another application state. The change request may change an active page of the application displayed on the client computer associated with the user identifier UserID. The change request may add, delete or modify an object in the active page of the application displayed on the client computer associated with the user identifier UserID.

In some example embodiments of the seventh aspect of the present disclosure, the method further comprises: receiving from the mobile device associated with the device identifier DeviceID a change request including change information describing one or more change(s), wherein the change request is associated with the user identifier UserID; sending the change request to the client computer associated with the user identifier UserID. The one or more change(s) comprises one or more of a change in device state or a change to the application.

In some example embodiments of the seventh aspect of the present disclosure, the method further comprises: receiving a request from the mobile device associated with the device identifier DeviceID requesting any subsequent change to the application made to the application by the user associated with the user identifier UserID; rejecting the request when not associated with the valid token; accepting the request when associated with the token.

In some example embodiments of the seventh aspect of the present disclosure, the method further comprises: receiving a request from the client computer associated with the user identifier UserID to acquire sensor data from the mobile device associated with the device identifier DeviceID; sending an instruction to acquire the sensor data to the mobile device associated with the device identifier DeviceID; receiving the sensor data from the mobile device associated with the device identifier DeviceID; and sending the sensor data to the client computer associated with the user identifier UserID. The sensor data may be stored in memory. The sensor data may be stored as a change, wherein the method further comprises sending the sensor data to all collaborating devices currently accessing the application associated with the application identifier ApplicationID. In some example embodiments of the seventh aspect of the present disclosure, the sensor data comprises an image captured by a camera of the mobile device associated with the device identifier DeviceID.

In some example embodiments of the seventh aspect of the present disclosure, the save point is the most recent save point.

In accordance with an eighth aspect of the present disclosure, there is provided a method for synchronizing changes between an application between a client computer and a mobile device, the method comprising: receiving from a client computer a first change request including first change information describing one or more change(s) to the application, wherein the first change request is associated with a user identifier UserID associated with a current user of the client computer; storing the first change request in memory in association with the user identifier UserID; and sending the first change request to a mobile device associated with the device identifier DeviceID and the user identifier UserID.

In some example embodiments of the eighth aspect of the present disclosure, the method further comprises: receiving from the mobile device associated with the device identifier DeviceID a second change request including second change information describing one or more change(s), wherein the second change request is associated with the user identifier UserID; storing the second change request in memory in association with the user identifier UserID; and sending the second change request to the client computer associated with the user identifier UserID. The second change request may include second change information describing one or more of a change in device state or a change to the application.

In accordance with a ninth aspect of the present disclosure, there is provided a method for synchronizing changes between an application between a client computer and a mobile device, the method comprising: receiving from a mobile device associated with the device identifier DeviceID a second change request including second change information describing one or more change(s), wherein the second change request is associated with a user identifier UserID; storing the second change request in memory in association with the user identifier UserID; and sending the second change request to a client computer associated with the user identifier UserID.

In accordance with a tenth aspect of the present disclosure, there is provided a method for acquiring sensor data from a mobile device, the method comprising: receiving a request from a client computer associated with a user identifier UserID to acquire sensor data from a mobile device associated with a device identifier DeviceID; sending an instruction to acquire the sensor data to the mobile device associated with the device identifier DeviceID; receiving the sensor data from the mobile device associated with the device identifier DeviceID; and sending the sensor data to the client computer associated with the user identifier UserID.

In accordance with an eleventh aspect of the present disclosure, there is provided a method for a client computer of sharing a custom control, comprising: receiving by a browser an encrypted custom control comprising a number of user interface elements which are positioned in a specified manner with respect to each other, wherein each of the user interface elements has one or more properties; receiving by the browser a decryption key; and decrypting by the browser the encrypted custom control using the decryption key.

In accordance with a twelfth aspect of the present disclosure, there is provided a method for a server of sharing a custom control, comprising: receiving by a browser a custom control comprising a number of user interface elements which are positioned in a specified manner with respect to each other, wherein each of the user interface elements has one or more properties; and updating an editor user interface within the browser to include an icon representing the custom control.

In accordance with a thirteenth aspect of the present disclosure, there is provided a method for a client computer of providing a custom control, comprising: receiving an instruction to create a custom control comprising a number of user interface elements which are positioned in a specified manner with respect to each other, wherein each of the user interface elements has one or more properties; and updating an editor user interface within the browser to include an icon representing the custom control.

In some example embodiments of the thirteenth aspect of the present disclosure, the method further comprises sending to a server a change request including change information which defines the custom control.

In some example embodiments of the thirteenth aspect of the present disclosure, the method further comprises: receiving input to add an instance of the custom control to a page displayed within an editor user interface within the browser; and rendering and displaying by the browser the custom control in response to the received input.

In accordance with a fourteenth aspect of the present disclosure, there is provided a method for a server of providing a custom control, comprising: receiving from a client computer a change request including change information which defines a custom control comprising a number of user interface elements which are positioned in a specified manner with respect to each other, wherein each of the user interface elements has one or more properties; and storing a master copy of the custom control in memory.

In some example embodiments of the fourteenth aspect of the present disclosure, the method further comprises: receiving from the client computer a change request to change a page of the application, the change adding an instance of the custom control to the page of the application; storing the change request in memory.

In some example embodiments of the fourteenth aspect of the present disclosure, the method further comprises: receiving a change request to change the custom control, the request including change information describing the change to the custom control; and updating the master copy of the custom control in memory in accordance with the change information describing the change to the custom control.

In accordance with a fifteenth aspect of the present disclosure, there is provided a method for providing a custom control, comprising: receiving by a client computer an instruction to create a custom control comprising a number of user interface elements which are positioned in a specified manner with respect to each other, wherein each of the user interface elements has one or more properties; updating by the client computer an editor user interface within a browser to include an icon representing the custom control in response to the instruction; sending by the client computer to a server a first change request including change information which defines the custom control in response to the instruction; and storing by the server a master copy of the custom control in response to the first change request.

In some example embodiments of the fifteenth aspect of the present disclosure, the method further comprises: receiving by the client computer input to add an instance of the custom control to a page displayed within an editor user interface within the browser; and rendering and displaying by the client computer the custom control within the browser in response to the received input to add an instance of the custom control to a page.

In some example embodiments of the fifteenth aspect of the present disclosure, the method further comprises: receiving by the client computer input to change the custom control; rendering and displaying by the client computer the custom control within the browser in accordance with the change; sending by the client computer to the server a second change request including change information which defines the change to the custom control; receiving by the server the second change request; and updating the master copy of the custom control in memory in accordance with the change information describing the change to the custom control.

In accordance with other aspects of the present disclosure, there is provided an electronic device including a communication interface and a processor configured to perform methods described herein.

In accordance with other aspects of the present disclosure, there is provided a server including a communication interface and a processor configured to perform methods described herein.

In accordance with other aspects of the present disclosure, there is provided a computer readable medium having stored thereon computer program instructions for causing an electronic device or a server to perform methods described herein.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the described embodiments set forth in the examples, but should be given the broadest interpretation consistent with the description as a whole.

The invention claimed is:

1. A method of delivering custom user interface (UI) controls for use in mobile device application development, comprising: displaying on a display of a client device an editor user interface for mobile device application development, wherein the editor user interface from comprises a webpage provided in an Internet browser; receiving by the client device a request to evaluate a custom UI control; sending a request for the custom UI control to a server; in response to the request: changing the editor user interface from an edit mode to a preview mode; receiving an encrypted custom UI control and a decryption key for decrypting the encrypted custom UI control from the server, the encrypted custom UI control comprising a number of UI user interface elements which are positioned in a specified manner with respect to each other, wherein each of the user interface elements has one or more properties; receiving a decryption key; embedding the decryption key in the editor user interface to protect the decryption key from user access; updating a control panel of the editor user interface to include an icon representing the custom UI control; in response to receiving input to add an instance of the custom UI control to a page of a mobile device application under development displayed within the editor user interface: decrypting the encrypted custom UI control using the decryption key in real-time, and rendering and displaying the decrypted custom UI control within the page of the mobile device application under development displayed within the editor user interface in real-time, wherein interaction with the custom UI control within the page of the mobile device application and publishing of the mobile device application is permitted but exporting of the mobile device application under development is prevented in the preview mode, wherein access to code defining the custom UI control and any media assets is prevented while in the preview mode displaying a prompt to purchase the custom UI control in response to input to export the mobile device application under development; and in response to a successful transaction purchasing the custom UI control, changing the editor user interface from an edit mode to a preview mode; and receiving an unencrypted custom UI control from the server including full access to the code defining the custom UI control and any media assets.

2. The method of claim 1, wherein the input to add the instance of the custom UI control is a drag and drop action.

3. The method of claim 1, wherein the user interface elements are Qt Modeling (QML) objects, wherein rendering and displaying by the browser comprises:
transcoding by the browser the QML objects into JavaScript objects;
transcoding the JavaScript objects into HyperText Markup Language (HTML) objects;
styling by the browser the HTML objects using Cascading Style Sheets (CSS) to emulate the QML objects; and
displaying by the browser the stylized HTML objects.

4. The method of claim 1, further comprising:
displaying by the browser a storefront including a listing of one or more custom UI controls, wherein the receiving and decrypting occur in response to receiving input to evaluate the UI custom control from the listing of one or more custom UI controls in the storefront.

5. The method of claim 1, wherein one or more properties of one or more of the user interface elements has a configurable value which may be defined as a complex expression, wherein each complex expression defines a relationship between a particular property of one of the user interface elements and one or more properties of one or more other user interface elements in the custom UI control.

6. The method of claim 5, wherein each complex expression defines a behavior of the custom UI control.

7. The method of claim 1, wherein some of the properties to the user interface elements are exposed as editable properties and the remainder of the properties to the user interface elements are locked.

8. The method of claim 1, wherein the user interface elements are QML objects.

9. The method of claim 1, wherein the user interface elements are the same or different.

10. The method of claim 1, wherein the user interface elements comprise a number of instances of the same user interface element.

11. An electronic device, comprising: a processor; a memory coupled to the processor, the memory storing executable instructions that, when executed by the processor, cause the processor, to: display on a display of a client device an editor user interface for mobile device application development, wherein the editor user interface from comprises a webpage provided in an Internet browser; receive by the client device a request to evaluate a custom UI control; send a request for the custom UI control to a server; in response to the request: chance the editor user interface from an edit mode to a preview mode; receive an encrypted custom UI control and a decryption key for decrypting the encrypted custom UI control from the server, the encrypted custom UI control comprising a number of UI user interface elements which are positioned in a specified manner with respect to each other, wherein each of the user interface elements has one or more properties; receive a decryption key; embed the decryption key in the editor user interface to protect the decryption key from user access; update a control panel of the editor user interface to include an icon representing the custom UI control; in response to receiving input to add an instance of the custom UI control to a page of a mobile device application under development displayed within the editor user interface: decrypt the encrypted custom UI control using the decryption key in real-time, and render and display the decrypted custom UI control within the page of the mobile device application under development displayed within the editor user interface in real-time, wherein interaction with the custom UI control within the page of the mobile device application and publishing of the mobile device application is permitted but exporting of the mobile device application under development is prevented in the preview mode, wherein access to code defining the custom UI control and any media assets is prevented while in the preview mode display a prompt to purchase the custom UI control in response to input to export the mobile device application under development; and in response to a successful transaction purchasing the custom UI control, change the editor user interface from an edit mode to a preview mode; and receive an unencrypted custom UI control from the server including full access to the code defining the custom UI control and any media assets.

12. A non-transitory machine readable medium having tangibly stored thereon executable instructions for execution by a processor of an electronic device, wherein the executable instructions, when executed by the processor of the electronic device, cause the processor to: display on a display of a client device an editor user interface for mobile device application development, wherein the editor user interface from comprises a webpage provided in an Internet browser; receive by the client device a request to evaluate a custom UI control; send a request for the custom UI control to a server; in response to the request: change the editor user interface from an edit mode to a preview mode; receive an encrypted custom UI control and a decryption key for decrypting the encrypted custom UI control from the server, the encrypted custom UI control comprising a number of UI user interface elements which are positioned in a specified manner with respect to each other, wherein each of the user interface elements has one or more properties; receive a decryption key; embed the decryption key in the editor user interface to protect the decryption key from user access; update a control panel of the editor user interface to include an icon representing the custom UI control; in response to receiving input to add an instance of the custom UI control to a page of a mobile device application under development displayed within the editor user interface: decrypt the encrypted custom UI control using the decryption key in real-time, and render and display the decrypted custom UI control within the page of the mobile device application under development displayed within the editor user interface in real-time, wherein interaction with the custom UI control within the page of the mobile device application and publishing of the mobile device application is permitted but exporting of the mobile device application under development is prevented in the preview mode, wherein access to code defining the custom UI control and any media assets is prevented while in the preview mode display a prompt to purchase the custom UI control in response to input to export the mobile device application under development; and in response to a successful transaction purchasing the custom UI control, change the editor user interface from an edit mode to a preview mode; and receive an unencrypted custom UI control from the server including full access to the code defining the custom UI control and any media assets.

* * * * *